(12) United States Patent
Walker

(10) Patent No.: US 11,492,796 B2
(45) Date of Patent: Nov. 8, 2022

(54) FRAMELESS CONSTRUCTION METHOD USING SINGLE AND DOUBLE PLENUM PANELS

(71) Applicant: James Walker, Franconia, NH (US)

(72) Inventor: James Walker, Franconia, NH (US)

(73) Assignee: INNOVATIVE STRUCTURAL BUILDING PRODUCTS, LLC, Franconia, NH (US)

( * ) Notice: Subject to any disclaimer, the term of this patent is extended or adjusted under 35 U.S.C. 154(b) by 6 days.

(21) Appl. No.: 17/088,087

(22) Filed: Nov. 3, 2020

(65) Prior Publication Data

US 2021/0189715 A1  Jun. 24, 2021

Related U.S. Application Data

(60) Division of application No. 16/357,825, filed on Mar. 19, 2019, now Pat. No. 10,822,790, which is a
(Continued)

(51) Int. Cl.
*E04B 1/10* (2006.01)
*E04B 1/12* (2006.01)
(Continued)

(52) U.S. Cl.
CPC ............ *E04B 1/38* (2013.01); *B29D 24/002* (2013.01); *E04B 1/10* (2013.01); *E04B 1/7069* (2013.01);
(Continued)

(58) Field of Classification Search
CPC ........... E04D 13/00; E04D 3/17; E04D 3/178; E04D 3/152; E04D 3/34; E04D 3/357; E04D 3/3606; E04D 3/3608; E04B 9/02; E04B 9/04; E04B 9/0421; E04B 9/0457; E04B 2/42; E04B 2/7425; E04B 2002/0202; E04B 5/48; E04B 2001/327; E04B 2001/3276; E04B 2001/6187; E04B 2001/12415; E04B 1/10; E04B 1/38; E04B 1/40; E04B 1/61; E04B 1/70; E04B 1/7069; E04B 1/7076; E04B 2103/04; E04F 17/04
USPC .... 52/91.1, 95, 96, 198, 199, 261, 262, 270, 52/271, 272, 284, 302.1, 302.3, 745.1, 52/745.13, 745.21, 747.1, 787.1, 783.17,
(Continued)

(56) References Cited

U.S. PATENT DOCUMENTS 1,086,031 A  *  2/1914  Davis .................. E06B 1/58
                                                            454/339
1,131,437 A  *  3/1915  Stockmann .......... E04B 1/7069
                                                            52/198
(Continued)

FOREIGN PATENT DOCUMENTS

CA  2715551 A1 *  3/2012  .......... E04B 1/7069
GB  2271585 A  *  4/1994  .......... E04D 13/143
(Continued)

*Primary Examiner* — Robert Canfield
(74) *Attorney, Agent, or Firm* — Holoubek Patent Law, LLC; Charlotte Holoubek

(57) ABSTRACT

A method of constructing a building comprising the steps of attaching a first panel to a second panel. The first panel is one of a single plenum panel and a multi-plenum panel and the second panel is one of a single plenum panel and a multi-plenum panel.

20 Claims, 47 Drawing Sheets

Related U.S. Application Data continuation-in-part of application No. 15/795,306, filed on Oct. 27, 2017, now abandoned, which is a division of application No. 15/459,620, filed on Mar. 15, 2017, now abandoned, and a continuation-in-part of application No. 14/988,065, filed on Jan. 5, 2016, now abandoned, and a division of application No. 14/711,943, filed on May 14, 2015, now Pat. No. 9,604,428, which is a continuation-in-part of application No. 14/099,100, filed on Dec. 6, 2013, now Pat. No. 9,091,049, and a continuation-in-part of application No. 13/782,406, filed on Mar. 1, 2013, now Pat. No. 9,050,766, and a continuation-in-part of application No. 13/539,919, filed on Jul. 2, 2012, now Pat. No. 8,615,945, which is a continuation-in-part of application No. 13/016,320, filed on Jan. 28, 2011, now Pat. No. 8,534,018, which is a continuation-in-part of application No. 12/987,832, filed on Jan. 10, 2011, now Pat. No. 8,490,355.

(60) Provisional application No. 62/210,616, filed on Aug. 27, 2015, provisional application No. 62/100,660, filed on Jan. 7, 2015, provisional application No. 61/376,333, filed on Aug. 24, 2010.

(51) Int. Cl.
*E04B 1/38* (2006.01)
*B29D 24/00* (2006.01)
*E04B 1/70* (2006.01)
*E04D 3/36* (2006.01)
*E04F 17/04* (2006.01)
*F16B 35/06* (2006.01)
*F16B 25/10* (2006.01)
*E04D 3/35* (2006.01)
*E04B 5/48* (2006.01)
*E04D 13/16* (2006.01)
*E04B 2/70* (2006.01)
*E04B 9/02* (2006.01)
*E04D 13/17* (2006.01)
*E04F 13/00* (2006.01)
*E04C 2/52* (2006.01)
*E04C 2/34* (2006.01)
*E04B 1/32* (2006.01)
*E04G 9/02* (2006.01)

(52) U.S. Cl.
CPC ............ *E04B 1/7076* (2013.01); *E04B 2/709* (2013.01); *E04B 5/48* (2013.01); *E04B 9/02* (2013.01); *E04C 2/523* (2013.01); *E04D 3/357* (2013.01); *E04D 3/3606* (2013.01); *E04D 3/3608* (2013.01); *E04D 13/16* (2013.01); *E04D 13/17* (2013.01); *E04F 13/007* (2013.01); *E04F 17/04* (2013.01); *F16B 25/103* (2013.01); *F16B 35/06* (2013.01); *F16B 35/065* (2013.01); *B32B 2419/00* (2013.01); *B32B 2607/00* (2013.01); *E04B 2001/3276* (2013.01); *E04C 2002/3488* (2013.01); *E04G 2009/028* (2013.01); *Y10T 29/49963* (2015.01)

(58) Field of Classification Search
USPC ............. 52/784.14, 793.1, 506.05, 508, 837; 454/185
See application file for complete search history.

(56) References Cited

U.S. PATENT DOCUMENTS

| | | | | |
|---|---|---|---|---|
| 1,925,769 | A * | 9/1933 | McAvoy | E04B 1/14 52/459 |
| 2,071,666 | A * | 2/1937 | Sylvan | E04B 1/08 52/592.4 |
| 2,140,772 | A * | 12/1938 | Slayter | E04B 1/10 425/DIG. 129 |
| 3,196,499 | A * | 7/1965 | Houvener | E04B 1/6108 52/794.1 |
| 3,452,498 | A * | 7/1969 | Kinsey | E04B 7/20 52/262 |
| 3,665,668 | A * | 5/1972 | Maddan, Jr. | E04B 1/12 52/436 |
| 3,803,786 | A * | 4/1974 | Schneider | E04B 1/12 52/631 |
| 4,372,089 | A * | 2/1983 | Akesson | E04B 7/04 52/404.3 |
| 4,805,357 | A * | 2/1989 | Aleixo | E04B 2/86 52/282.1 |
| 5,083,410 | A * | 1/1992 | Watson | E04B 2/72 52/481.1 |
| 5,245,803 | A * | 9/1993 | Haag | E04B 1/12 52/95 |
| 5,274,974 | A * | 1/1994 | Haag | E04B 1/12 52/92.1 |
| 5,274,975 | A * | 1/1994 | Haag | E04B 1/12 52/239 |
| 5,493,839 | A * | 2/1996 | Sax | E04C 2/36 52/592.1 |
| D371,210 | S * | 6/1996 | De Zen | D25/124 |
| 5,561,958 | A * | 10/1996 | Clement | E04B 1/7612 52/220.1 |
| 5,640,812 | A * | 6/1997 | Crowley | E04B 7/225 52/643 |
| 5,706,620 | A * | 1/1998 | De Zen | E04C 3/30 52/270 |
| 5,729,944 | A * | 3/1998 | De Zen | E04C 2/34 52/439 |
| 6,314,704 | B1 * | 11/2001 | Bryant | E04B 1/12 52/745.1 |
| 6,591,558 | B1 * | 7/2003 | De Zen | E04B 1/12 52/91.1 |
| 6,780,099 | B1 * | 8/2004 | Harper | E04D 3/357 52/95 |
| 6,804,925 | B1 * | 10/2004 | McCulloch | E04B 1/12 52/586.1 |
| 6,901,710 | B1 * | 6/2005 | Cooper | E04B 1/12 52/270 |
| 7,797,897 | B2 * | 9/2010 | Roth | E04B 1/12 52/270 |
| 8,534,018 | B2 * | 9/2013 | Walker | E04D 13/17 52/302.1 |
| 8,615,945 | B2 * | 12/2013 | Walker | F24F 7/02 52/302.1 |
| 8,769,904 | B1 * | 7/2014 | Brandt | E04C 2/46 52/177 |
| 9,050,766 | B2 * | 6/2015 | Walker | B29D 24/002 |
| 9,896,842 | B2 * | 2/2018 | Clouse | E04C 2/46 |
| 2003/0167714 | A1 * | 9/2003 | Jandl | E04C 2/16 52/302.1 |
| 2004/0062600 | A1 * | 4/2004 | Jackson | F16B 12/20 403/382 |
| 2004/0226238 | A1 * | 11/2004 | Haapiainen | E04B 1/0023 52/302.1 |
| 2006/0218869 | A1 * | 10/2006 | Ellis | E04D 13/1637 52/309.9 |
| 2006/0242920 | A1 * | 11/2006 | Griffner | E04B 1/0023 52/302.1 |
| 2007/0204541 | A1 * | 9/2007 | Sade | E04B 2/707 52/302.1 |
| 2008/0028704 | A1 * | 2/2008 | Cooper | F24S 10/73 52/302.1 |

(56) References Cited

U.S. PATENT DOCUMENTS

| | | | | |
|---|---|---|---|---|
| 2008/0163565 A1* | 7/2008 | Toas | | E04D 13/172 52/95 |
| 2008/0196355 A1* | 8/2008 | Williams | | E04B 1/14 52/794.1 |
| 2009/0038262 A1* | 2/2009 | Marschke | | E04C 2/284 52/745.19 |
| 2009/0293396 A1* | 12/2009 | Porter | | E04C 2/246 52/309.3 |
| 2010/0212241 A1* | 8/2010 | Holroyd | | E04B 1/12 52/309.4 |
| 2010/0300026 A1* | 12/2010 | Candiracci | | E04B 2/847 52/309.4 |
| 2011/0072746 A1* | 3/2011 | Dagher | | E04B 7/20 52/302.1 |
| 2011/0258943 A1* | 10/2011 | De Zen | | E04B 7/20 52/43 |
| 2012/0047844 A1* | 3/2012 | Walker | | B32B 21/02 428/105 |
| 2012/0144763 A1* | 6/2012 | Antonic | | F24F 7/02 52/302.1 |
| 2014/0345219 A1* | 11/2014 | Button | | E04B 7/22 52/745.19 |
| 2014/0373472 A1* | 12/2014 | Plummer | | E04F 15/185 52/302.3 |
| 2015/0259897 A1* | 9/2015 | Carroll | | A63H 33/107 52/582.1 |
| 2021/0355672 A1* | 11/2021 | Bryant | | E04B 1/02 |

FOREIGN PATENT DOCUMENTS

| | | | | |
|---|---|---|---|---|
| WO | WO-0011280 A1 * | 3/2000 | | E04B 1/12 |
| WO | WO-03031740 A1 * | 4/2003 | | E04B 2/8629 |

\* cited by examiner

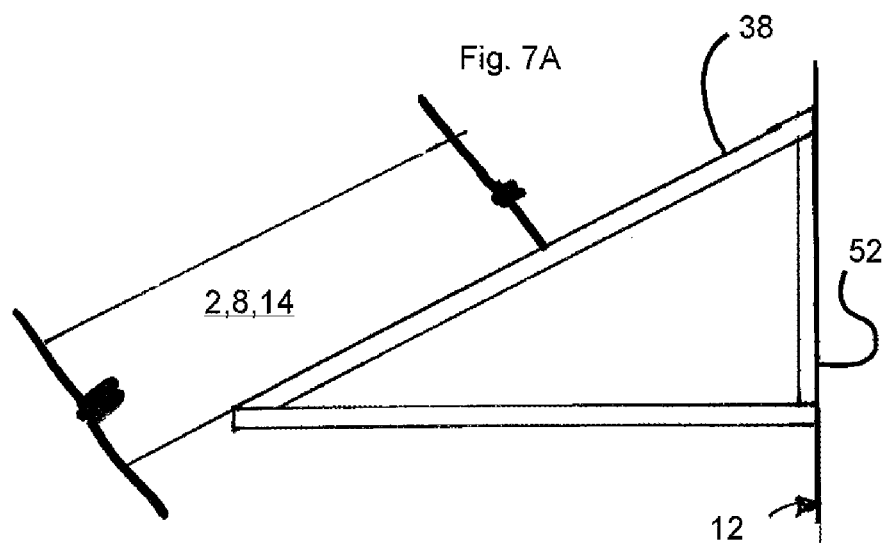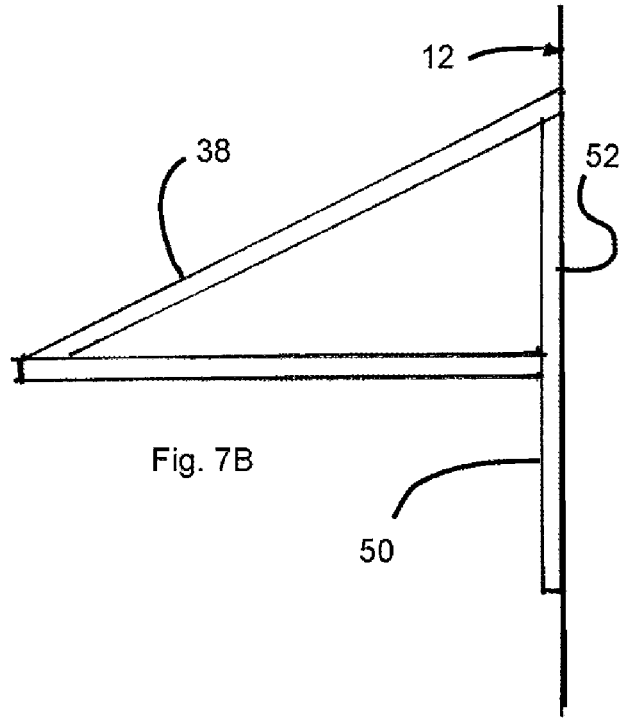

114

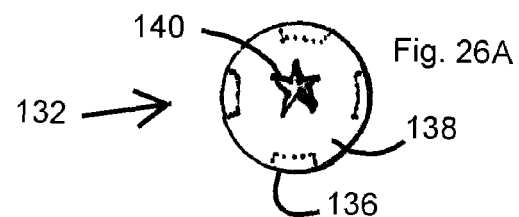
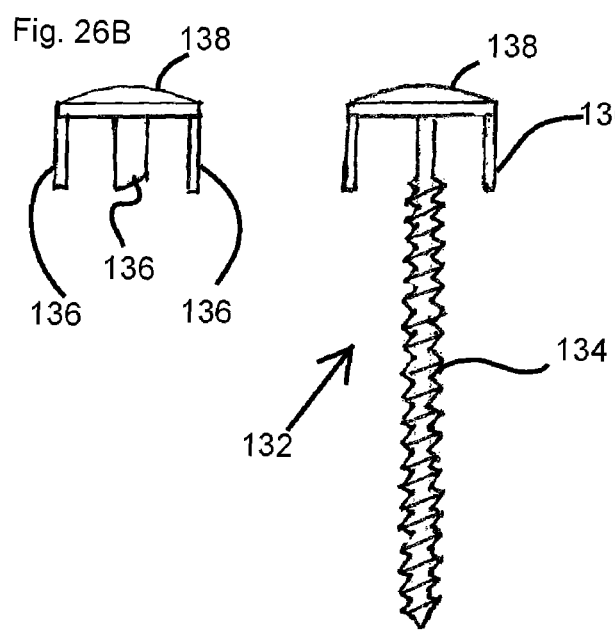
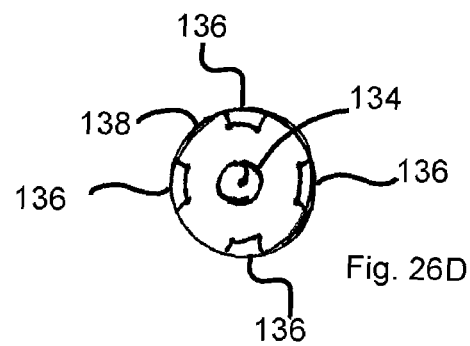

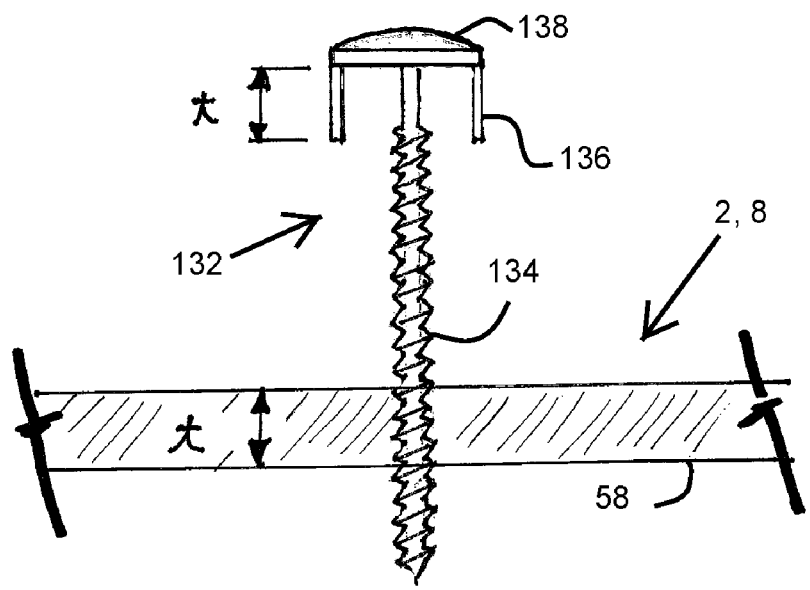
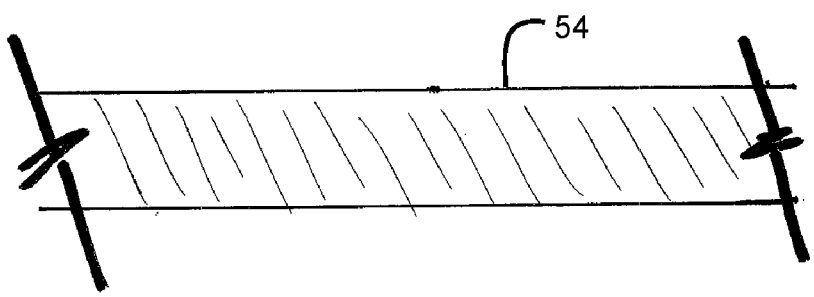
Fig. 27

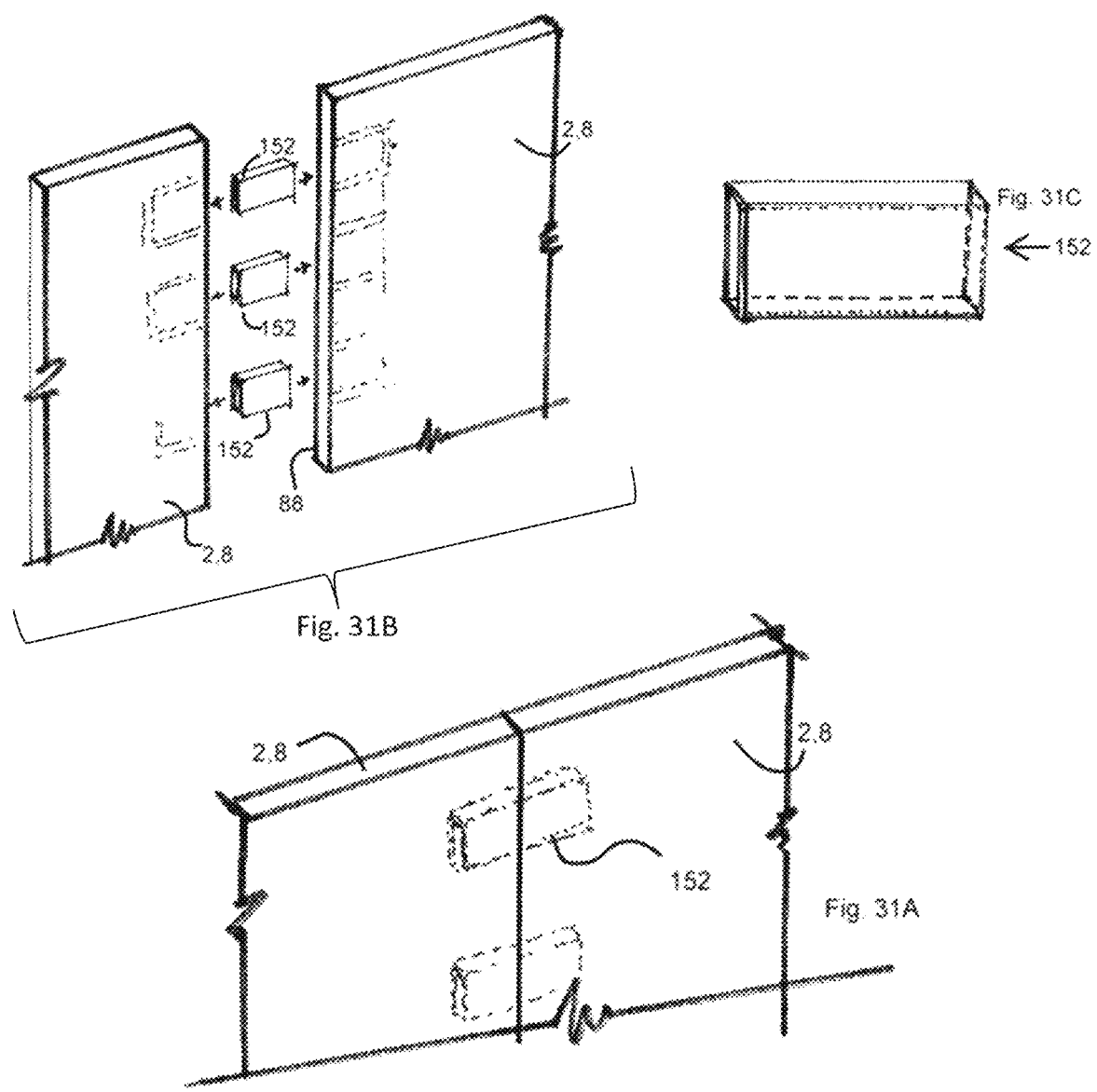

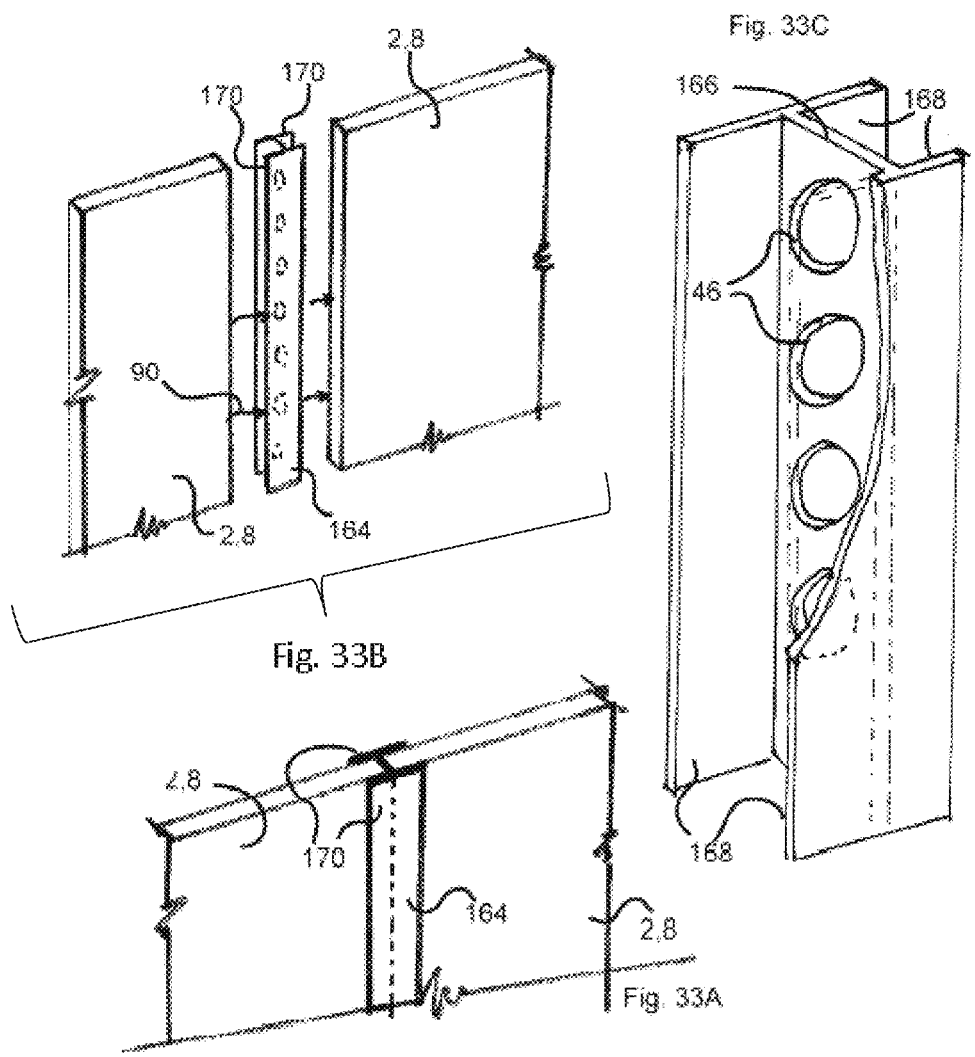

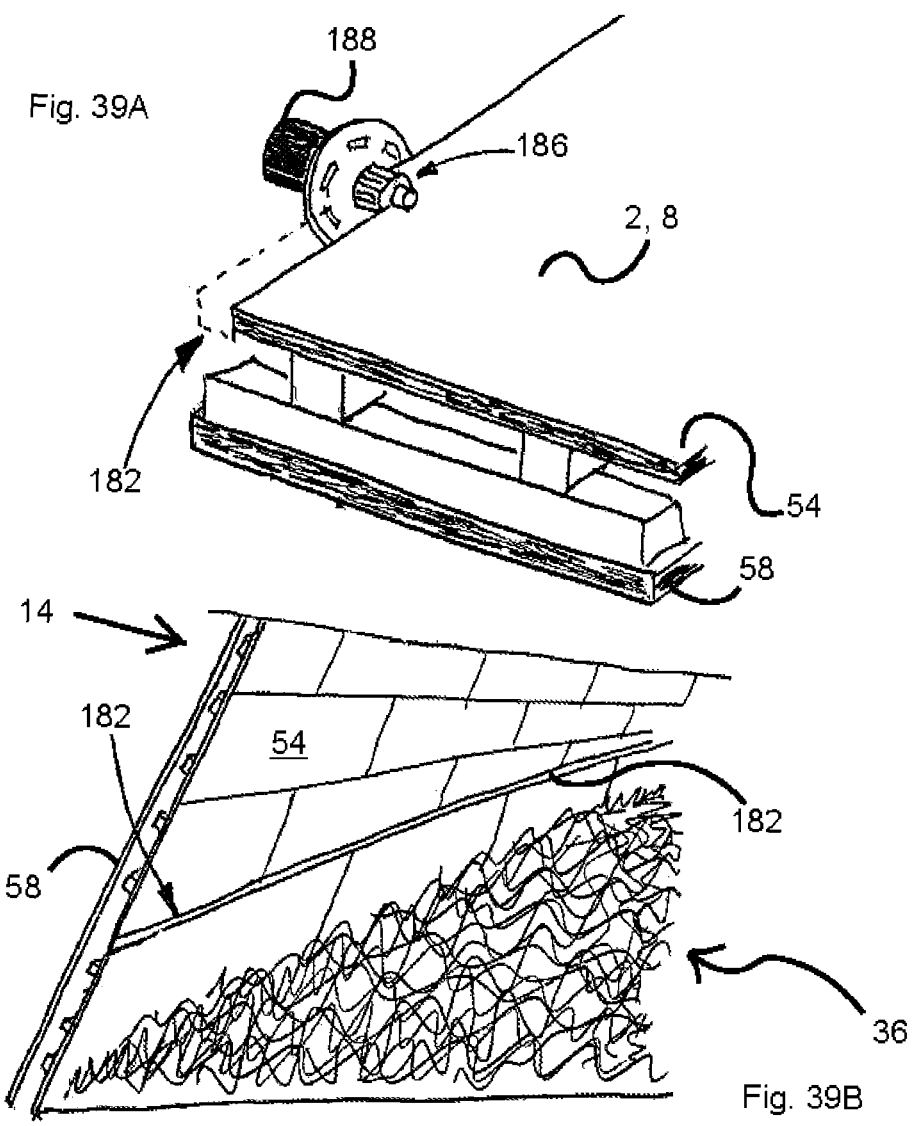

FRAMELESS CONSTRUCTION METHOD USING SINGLE AND DOUBLE PLENUM PANELS

CROSS REFERENCE TO RELATED APPLICATIONS

This application claims priority to U.S. Ser. No. 16/357,825, U.S. Ser. No. 14/988,065, U.S. Ser. No. 15/795,306, U.S. Ser. No. 15/459,620, U.S. Ser. No. 14/711,943, U.S. Ser. No. 13/782,406, U.S. Ser. No. 14/099,100, U.S. Ser. No. 13/539,919, U.S. Ser. No. 13/016,320 and U.S. Ser. No. 12/987,832, which are incorporated by reference into the present disclosure as if fully restated herein. Any conflict between the incorporated material and the specific teachings of this disclosure shall be resolved in favor of the latter. Likewise, any conflict between an art-understood definition of a word or phrase and a definition of the word or phrase as specifically taught in this disclosure shall be resolved in favor of the latter.

FIELD OF THE INVENTION

This invention relates to methods and devices for frameless building construction utilizing single and multi-plenum panels with various spacing structural elements.

BACKGROUND OF THE INVENTION

Conventional wood homes and structures are built in stages, with wood framing erected first, and sheathing attached at a later date. Usually, homes and other wooden structures are built using "2 by" framing, normally from the ground up. For example, 2×10's are normally used for joists for floors, typically 16 inches on center, and are covered with sheathing for a floor deck, typically in 4'×8' sheets of OSB or plywood.

Walls are then constructed using 2×4 or 2×6 lumber with a continuous sill plate, a double top plate, and vertical studs every 16 inches. Openings for windows and doors require double studs and jack studs to hold headers and sills.

Once the wall frames are erected, they are then usually sheathed with an OSB or plywood product typically in 4'×8' sheets. Sometimes this sheathing is also utilized in the resistance of shear force. Holes must be cut for windows and doors. For two story homes, this floor and wall framing/sheathing process is repeated.

A roof structure is then constructed using 2× lumber for rafters—typically 2×8's or 2×10's or 2×12's depending on snow load. The rafters are typically 16 inches on center. The roof is then covered with sheathing of ⅜" thickness to ⅝" thickness, typically in 4'×8' sheets of OSB or plywood. Waterproof roofing material can then be applied to the roof deck.

Ceiling joists must also be installed to support interior finishes. Ceiling joists are typical 2×6 or 2×8 and installed at 16 inches on center.

The framing of a building involves cutting, nailing, erecting and attaching studs, headers, jack studs, joists, rim joists, trusses, and rafters. All of this framing incurs costs of time, labor, materials, and extended exposure of the interior building materials to the elements while the building remains uncovered.

And although traditional modular construction results in an expedited house once the modular pieces are at the construction site, modular homes still use stick framing at the factory and still has the associated time, labor, materials and cost as stick built or conventionally framed buildings. Additionally, modular homes incur extra costs and special requirements for transporting the modular pieces to the construction site.

Similarly, manufactured housing, whether single wide, double wide or triple wide, is also constructed using traditional use stick framing at the factory and still has the associated time, labor, materials and cost as stick built or conventionally framed buildings. Additionally, manufactured homes incur extra costs and special requirements for transporting the modular pieces to the construction site.

In all cases, insulation is typically applied around the existing framing members. The framing members cause a thermal short in the thermal envelope and also allows for incomplete insulation installation because of framing members and the many of corners, blocking, headers, as well as the many hap-hazard holes drilled for the installation of plumbing, mechanical and electrical systems. The result with conventional framing is an insulating layer that is incomplete with leaks and thermal breaks at the studs; all reducing thermal performance.

SUMMARY OF THE INVENTION

Wherefore, it is an object of the present invention to overcome the above mentioned shortcomings and drawbacks associated with the prior art.

The disclosed inventive methods and devices allow construction of primarily and/or substantially wooden structures of sufficient strength such that conventional framing with lumber is not necessary. This will save time, cost, and resources in constructing structures while providing for better insulation. The disclosed methods and devices utilize single and multi-plenum structural panels as described in U.S. Pat. Nos. 8,490,355, 8,534,018, 8,635,822, 8,615,945, 9,091,049, and 9,050,766. All six patents are incorporated by reference herein. Any conflict between any document incorporated herein and the specific teachings of this specification shall be resolved in favor of the latter. Likewise, any conflict between an art-understood definition of a word or phrase and a definition of the word or phrase as specifically taught in this specification shall be resolved in favor of the latter.

The single plenum panels comprise two parallel and substantially overlapping sheets connected to one another by spacing structural elements. The spacing between the two sheets forms a plenum that air may pass through. The combined strength of the single plenum panel is typically greater than the sum of the strength of the two individual sheets. The spacing structural elements are typically blocks or matrix members and are arranged to provide a plurality of unobstructed passageways through the plenum from one edge of the panel to another. The single plenum panels have a height and width typically around 4 feet by 8 feet in measurement, but can be larger depending on manufacturing ability and structural need. The depth of the single plenum panels is typically between one and six inches.

The multi-plenum panels comprise three parallel and substantially overlapping sheets. A first sheet is connected to a first surface of the second sheet by spacing structural elements creating a first plenum, similar to a single plenum panel. The third sheet is connected to a second opposite surface of the second sheet by spacing structural elements creating a second plenum. As the second sheet is connected to both the first and the third sheet, a combined multi-plenum panel is created. The height and width of the multi-plenum panel is comparable to that of the single plenum panel. The depth of the multi-plenum panel is typically between two and eight inches.

The inventive methods and devices described herein provide a method of constructing homes and similar wood framed structures without conventional framing. Because the disclosed single and multi-plenum panels have very high inherent strength, they are able to span considerable distances and carry significant loads. As such, conventional framing is not necessary in most situations.

The walls of a building constructed of single plenum panels, without framing, have more bearing area than conventionally framed walls. For example, a ½" inside bearing sheet of a single plenum panel wall has more bearing area than conventional 2×4 studs at 16" on center, and has approximately the same area as 2×6 framing at 16" on center. Single plenum panels can also be used for a roof without framing and providing similar strength. Similarly, multi-plenum panel flooring has considerable and typically even greater span and load carrying capacity than single plenum panels.

In addition to the inherent ventilation attributes of single plenum panels and air distribution capabilities of multi plenum panels, these panels can be constructed in large continuous panels allowing a home to be assembled in about a day. The panels may be preassembled in a factory, transported to the build site, and assembled with a crane. A crane at construction sites is becoming a more common piece of equipment that is used for a variety of purposes and sometimes a crane is at the site throughout the construction period.

These panels are strong and offer more potential than just a normal sheathing panel. With continuous manufacturing mills, it is possible to use full undivided continuous sheets to construct single plenum panels and multi plenum panels that span an entire face of a building, or span of a wall, floor, ceiling, or roof. The Single plenum panel load-bearing walls could be a single, long panel with perforations for windows and doors. Additionally, the windows and doors themselves could be constructed in the factory and added in the factory or at the building site.

The single plenum panels are very strong. Long span panels can be used for roofing together with the roof connecting device and/or in conjunction with conventional framing.

Continuous panel ceilings are also possible with either single plenum panels or multi-plenum panels.

The benefits of frameless single and multi-plenum panel construction include easy transportation of materials to the field, especially compared to modular homes, and providing a home that can be assembled in the field in one day. The savings associated with just these two benefits are significant in materials, time and labor.

Additionally, using exterior weatherproof sheathing on the exterior sheet of the panels, such as the Zip System (a product and trademark of Huber), or applying weather-tight materials to one or more sheets of the panel in the factory and having the windows and doors pre-installed means the structure can be erected and closed to the weather in one day.

Having the home closed in one day means the trades can start the next day. This is again a significant savings in time and money.

This technology is ideally suited for the modular and manufactured home industries with immediate benefits. Of course, it is also suitable and valuable for everyday home construction, as well as other currently conventionally framed structures such as apartments, schools, motels, hotels, restaurants, churches, etc.

Single plenum panels can have an EI value per foot exceeding 15,000,000 lb-in$^2$, and can be easily double that value depending on spacing structural members, sheet thickness and makeup, and methods of attachment. Multi-plenum panels are significantly greater. This allows significant loads and spans, which means most walls, roofs, ceilings and floors can be spanned with one continuous panel. The limiting factor is the manufacturing width.

The inherent configuration of single plenum panels with two sheets and an interior matrix for use as a load bearing wall has the additional feature of stabilizing the load-bearing sheet from buckling so that it can bear its capacity in compression and with little concern for instability.

The disclosed frameless construction method also substantially eliminates thermal breaks which always exist with conventional framed construction. There are no studs making a thermal short-cut to the outside. Nor are there rafter's shortcutting an occupied upper space. The disclosed method provides a full thermal envelope with full exterior ventilation. A significant benefit in building safety, comfort, and stability.

Ventilation is assured for code compliance where applicable and health and energy efficiency in the walls and roofs. Air distribution with multi-plenum panels eliminates the need for ductwork.

There are various devices described herein such as roof connectors and insulation gauges. It is intended, though not required, that these devices be constructed from extruded, formed or folded or otherwise constructed from a material including, but not limited to aluminum, other metals, plastics, wood fiber, carbon fiber, fiberglass, magnesium oxide, sheet metal or composites of a combination of any of the above.

BRIEF DESCRIPTION OF THE DRAWINGS

The accompanying drawings, which are incorporated in and constitute a part of the specification, illustrate various embodiments of the invention and together with the general description of the invention given above and the detailed description of the drawings given below, serve to explain the principles of the invention. It is to be appreciated that the accompanying drawings are not necessarily to scale since the emphasis is instead placed on illustrating the principles of the invention. The invention will now be described, by way of example, with reference to the accompanying drawings in which:

FIGS. 7A and 7B are side sectional views of two further additional embodiments of roof connectors according to the present invention;

FIGS. 26A to 26D are a top, a first partial side omitting the screw shaft, a second partial side omitting front and back cutting teeth, and a bottom view of a two layer self-seating toothed screw according to the present invention;

FIG. 27 is a first partial sectional view of the self-seating toothed screw according to FIGS. 26A to 26D being seated in a single plenum panel;

FIGS. 31A to 31C are partial see through and exploded partial perspective views of insertion connecting blocks connecting two adjacent single plenum panels and a perspective view of the insertion connecting block;

FIGS. 33A to 33C are partial see through and exploded partial perspective views of perforated H connectors connecting two adjacent single plenum panels and a partial cut-out perspective view of the perorated H connector;

FIG. 39A is an isomeric view of a single plenum panel with a ventilation strip being cut or formed into the interior sheet of the panel according to one embodiment;

FIG. 39B and is an isomeric view of an interior of an attic constructed with single plenum panels and including a ventilation strip;

DETAILED DESCRIPTION OF THE INVENTION

The present invention will be understood by reference to the following detailed description, which should be read in conjunction with the appended drawings. It is to be appreciated that the following detailed description of various embodiments is by way of example only and is not meant to limit, in any way, the scope of the present invention. In the various Figures, single plenum panels 2 and multi-plenum panels 4 are depicted. Such panels 2, 4 are disclosed and described in detail in the incorporated patents and briefly in the Summary section above.

Figure 1:
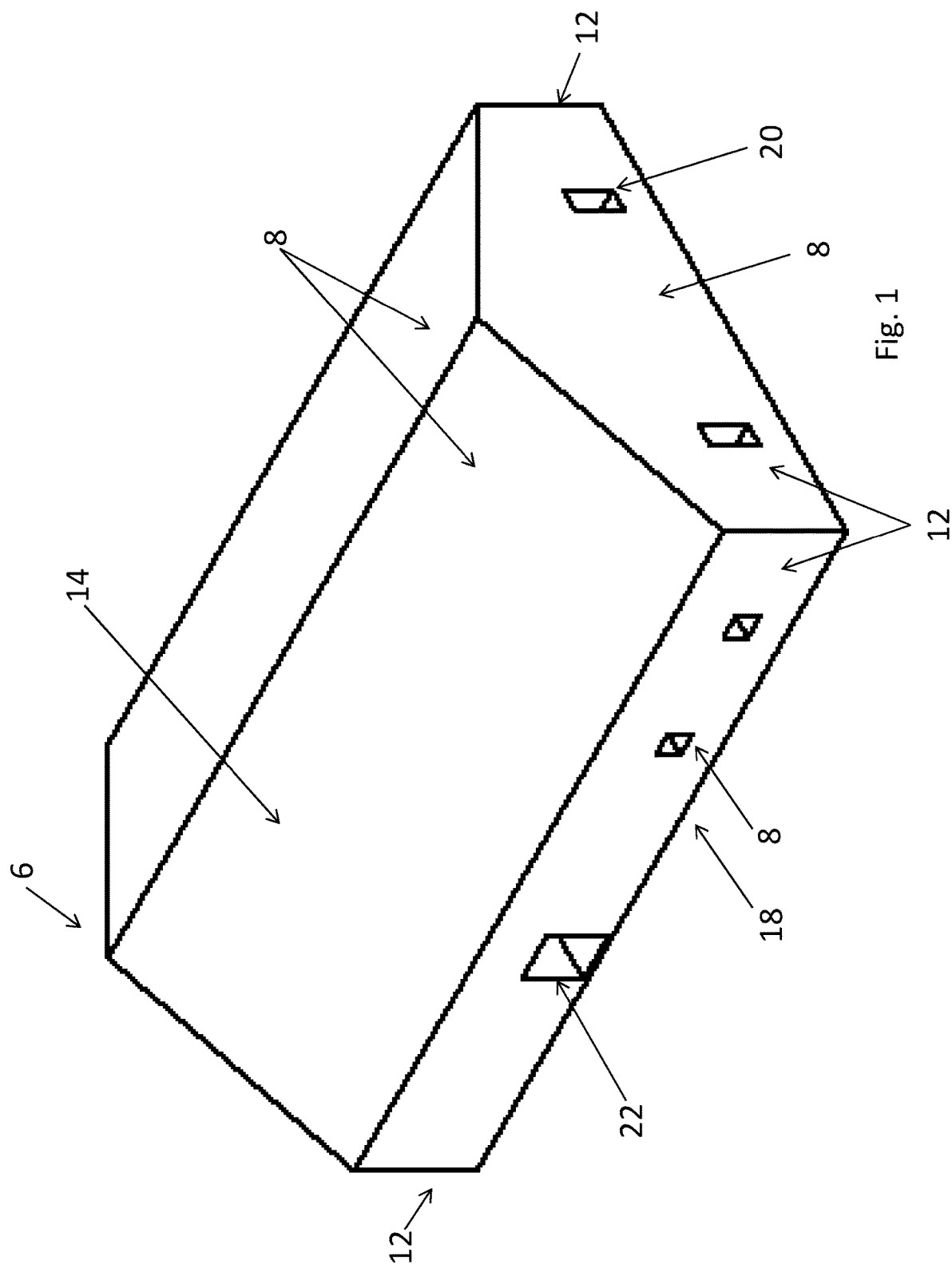
FIG. 1 is a partial see through perspective view of a building constructed according to the invention with each of the walls, roof spans, floor, and ceiling panels constructed of continuous single or multi-plenum panels.

Turning now to FIG. 1, a brief description concerning the various components of the present invention will now be briefly discussed. As shown in this embodiment, a whole house or building 2 is constructed using continuous single plenum panels 8 and continuous multi plenum panels 10 for construction. This typical home 6 has a front and first/left side wall 12 shown, each constructed of continuous single plenum panels 8, back and second/right side wall 12 (partially visible in background) are also each constructed of continuous single plenum panels 8. The left sloping portion and right sloping portion of the roof 14 are also each constructed of continuous single plenum panels. The front and back vertical triangular portions of the roof 14 are each also constructed of single plenum panels, with could be the same continuous single plenum panel as the vertical front and back wall 12 beneath each vertical roof 14 section or could be separate continuous single plenum panels. The ceiling 16 and the floor 18 are each constructed of multi plenum panels.

This is the preferred embodiment, but other arrangements are possible within the scope of this invention. For example, all of the walls 12, roof 14, ceiling 16, and floor 18 can be constructed of a continuous single plenum panel 8, or all could be constructed of a continuous multi-plenum panel 10, or some other combination thereof in addition to that described in the preferred embodiment, as desired to fulfill particular space and cost constraints of the building 6.

As shown in FIG. 1, holes are cut where desired for openings for windows 20, doors 22, and other necessary penetrations as for utilities, vents, etc. Further embodiments addressing the installation of doors 22 and windows 20 is discussed below.

Advantageously, because of the multiple connection points between and distributed across the areas of the two opposing sheets 24 of the single and multi-plenum panels 2, 4, 8, 10, which are provided by the numerous spacing structural elements 26, placement of a window 20 or door 22 hole does not substantially decrease the strength of a wall 12. The load is distributed to the multiple connection points surrounding the hole.

Typically, a single plenum panel 2, 8 has an outer or exterior sheet 58 of ¼" to ½" and an interior or inner load bearing sheet 54 of ⅜" to 1", but more commonly ½" to ¾". The spacing structural elements 26 for the single plenum panel 2, 8 are typically matrix members 60, which are typically elongated rectangular prisms formed of wood extending from one edge of the panel to an opposite or an adjacent edge of the panel and having a with cross sections measuring preferably ¾"×¾".

Typically, a multi-plenum panel 4, 10 has a top 62, a middle 64, and a bottom 66 sheet, each measuring between ¼" to 1 inch in thickness. It is not uncommon for one or two of the sheets 62, 64, 66 to be thicker or thinner than the other two, but all three sheets may be the same thickness or of different thicknesses also, based on construction strength and weight and size requirements, for example. The spacing structural elements 26 for multi-plenum panels are typically spacing blocks 68, preferably sized between 2.5" and 4.5" in length and width, and between 1" and 2.5" in height.

Figure 2:
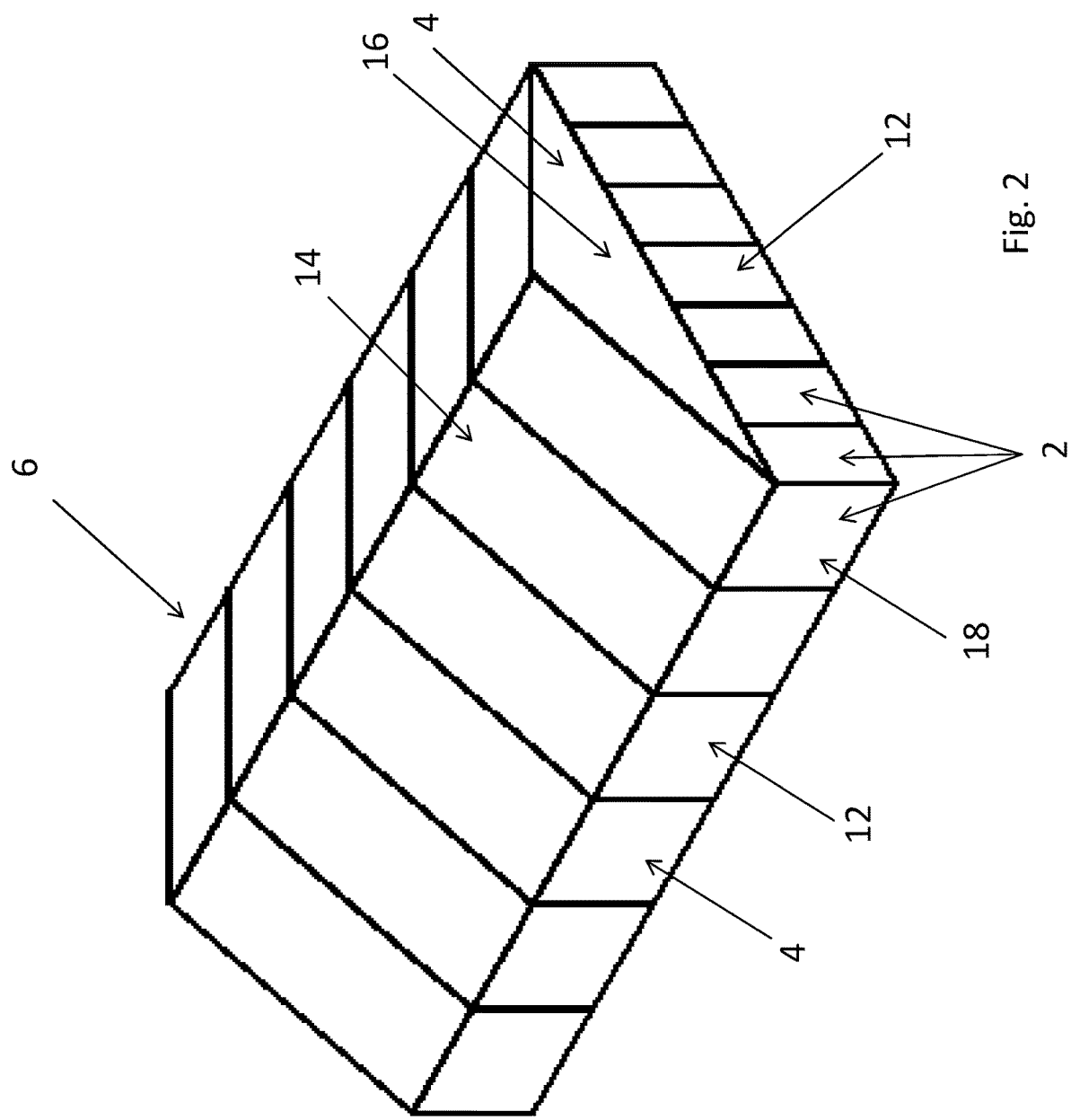
FIG. 2 is a partial see through perspective view of a building constructed according to the invention with each of the walls, roof, floor, and ceiling panels constructed of multiple single or multi-plenum panels.

Turning next to FIG. 2, a second embodiment is shown. In this embodiment, the house 6 is also built without a frame, but instead of continuous panels 8, 10, its walls 12, floor 18, ceiling 16, and roof 14 are built of smaller single and multi-plenum panels 2, 4—typically sized 8 feet by 4 feet, and herein referred to as unit panels 2, 4. These unit panels 2, 4 are each easier to handle and individually are faster to erect. But, because of the many number of unit panels necessary, the total installation time can be longer than the house in FIG. 1 utilizing continuous panels.

It should also be noted that an embodiment (not shown) utilizing a combination of both unit 2, 4 and continuous 8, 10 panels in a single building 6 construction falls within the scope of this invention. As just one example, the building may have walls 12 with unit panels 2, 4 as shown in FIG. 2, and floors 18, ceiling 16, and roof 14 with continuous panels 8, 10 as shown in FIG. 1.

Figure 3:
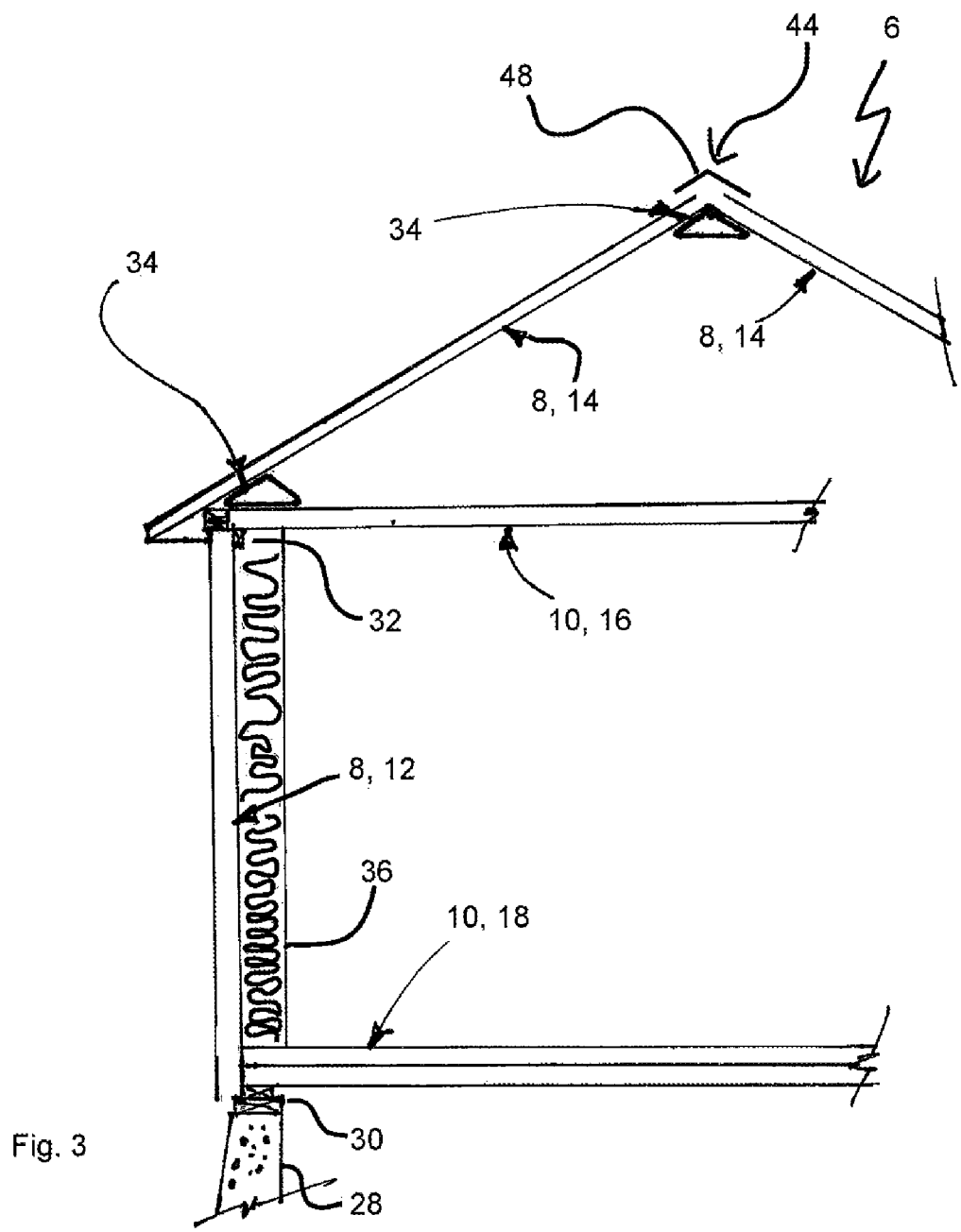
FIG. 3 is a sectional view of a building according to FIG. 1 also showing two roof connectors.

Turning next to FIG. 3, a cross section of a house 6 such as the house 6 of FIG. 1 is shown. This house 6 utilizes continuous single plenum panels 8 for the walls 12 and for the roof 14. The floor 18 is a constructed of a continuous multi plenum panel 10. The ceiling 16 may be constructed of a single plenum panel 8 (shown) or a multi plenum panel 10 (not shown) as desired. As can be seen, no framing in present in this building 10. Because of the inherent strength in the single and multi-plenum panels 2, 4, 8, 10—in bending, compression, shear, and stability against buckling with compressive loads—there is no need for conventional framing.

This method of construction is ideally suited for manufactured housing as well as conventional site built housing, and any construction built with conventional wood framing, including light construction such as apartment buildings, motels, hotels, restaurants, schools, shopping centers, etc.

As is described in further detail below, a continuous single plenum panel 8 wall 12 would be installed on the foundation 28 sill plate 30 and be temporarily braced. Once two continuous single plenum panel 8 walls 12 are installed on the foundation 28 and joined to one another at an approximately ninety degree angle (for example, the front and first left side wall 12 of the house 6 in FIG. 1) the two walls 12 will be substantially stable. However, it is advisable to retain the bracing until the ceiling panel 16 is installed.

Preferably before all the walls 12 are erected, a continuous multi-plenum panel 10 flooring 18 is installed and joined to the single plenum panel 8 walls 12 currently erected. Then the remaining wall(s) 12 are attached to the foundation 28 sill plate 30, the floor panel 18, and the adjacent walls 12.

A continuous single plenum panel 8 or multi-plenum panel 10 is then installed for the ceiling 16. As described in greater detail below, the ceiling panel 16 will ideally be attached to wall blocking 32 which will have been previously installed adjacent to the top of the single plenum panel 8 walls 12. After this step, the structure 6 will be quite stable, and the temporary wall bracing can be removed.

The roofing 14 is then attached to the structure 6. Ideally, roof connectors 34 will have been pre-installed to the roofing panels 14. The roof connector 34 is a preferably continuous structural member having preferably the same length as the roof panel 14 for continuous panels 8, 10 or the same length as the entire roof edge when used with unit panels 2, 4. The roof connector 34 will be described in greater detail below. If the roof 14 is installed in two continuous panels 8, 10 with a joint at the top, the first roof panel 14 will preferably be braced or suspended until the second roof panel 14 is assembled and attached.

The structure and sheathing is now complete. The home 6 is a sound structure constructed without conventional framing.

A weather barrier can now be applied, as needed. The roofing (e.g., shingles, felt, etc.) and the wall covering (e.g., siding) can be installed. If not done before hand, penetrations must be cut and finished for windows 20 and doors 22. Insulation 36 can also be installed.

The savings in time, materials, and labor is significant.

Figure 4:
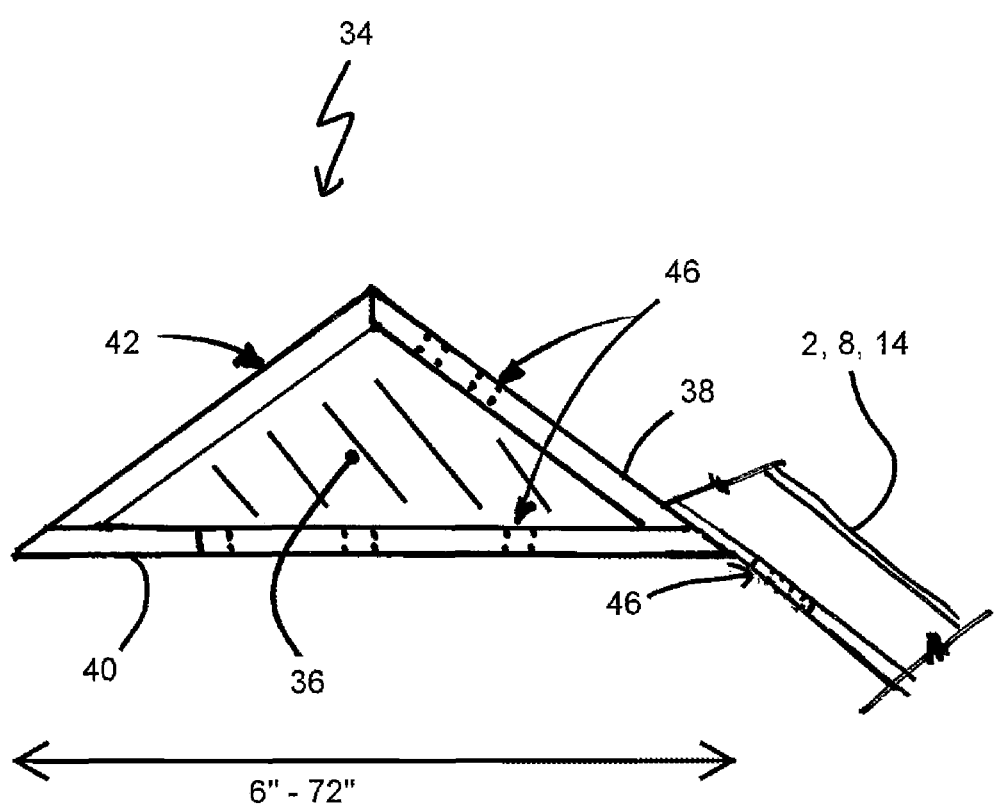
FIG. 4 is a sectional view of a roof connector according to the present invention.

Turning now to FIG. 4, a first embodiment of the roof connector 34 is shown. The roof connector 34 is anticipated to be continuous hollow triangular prism, most likely formed of the same material along each side. The roof connectors are designed to resist downward and upward forces as well as lateral or horizontal sheer forces and bending forces or moments. The roof connectors 34, via mechanical and/or adhesive connections to adjacent single and/or multi plenum panels, are designed to be an integral part of the structural system increasing the structural strength of the building.

This is a typical roof connector 34 made of wood. It is anticipated that it would be constructed of long strips of plywood or OSB with staggered joints, and/or finger-jointed material. The roof connector 34 could also be constructed from typical "2×" lumber of 1½" thickness.

The roof connector 34 will typically have at least one roof adjacent surface 38 that attaches to the roof panel 14. For roof connectors 34 used at the roof 14/ceiling 16 connection, there will also be a ceiling adjacent surface that attaches to the ceiling panel 16 and an inner building facing surface 42 that faces the interior of the building, typically an attic space. An angle formed by the roof adjacent surface 38 and the ceiling adjacent surface 40 will preferably have the same desired slope as the roof 14.

For the roof connector 34 used at the ridge 44 of the roof 14 in addition to a first roof adjacent surface 38 there will be a second roof adjacent surface 38 and an inner building facing surface 42. The roof ridge 44 roof connector 34 would have an apex (top most) angle formed by the two roof adjacent surfaces 38 that matches the interior angle formed by the two roof panels 14 joining one another. The same roof connector 34 can be used for both the roof 14/ceiling 16 eve location as well as the ridge 44 location if the slope is the same on both sides of the roof 14. Salt-box style homes 6—with roofs 14 of different angle in the front and back of the house 6, would use roof connectors 34 of different angled measurements.

Though the roof connector 34 is shown as an isosceles triangle, other triangle cross sections could be used. For example, in instances where the roof 14 is steep, an isosceles triangle would cause the ceiling adjacent surface 40 base to be narrower than may be desired. In such an instance, a non-isosceles triangle with a larger apex angle may be desired, causing the non-adjacent inner building facing surface 42 to extend further into the interior of the building, causing the base to be wider. Alternatively, a lateral extension extending from the ceiling adjacent surface 40 base past a point where the inner building facing surface 42 intersect the base may be provided, to allow for a larger base while maintaining a smaller apex angle. Conversely, with a very low sloping roof 14, a more acute apex angle than would be present for an isosceles triangle may be desired to keep the ceiling adjacent surface 40 base from being longer than necessary. However, if a non-isosceles triangle is used for the roof connectors 34 at a location where the roof 14 connects to the ceiling 16, a different angled roof connector 34 will most likely be required at the roof ridge 44.

Ideally, the roof connector 34 is attached to the adjoining panels 14, 16 with both mechanical and adhesive fastening. This preferably includes attaching to the single plenum panel 2, 8 roof 14 and either the single or multi plenum panel 2, 4, 8, 10 ceiling 16 or the single plenum panel 2, 8 walls 12. In some embodiments, the roof connector may be at least mechanically fastened to each of the wall, ceiling, and roof panels.

It is anticipated that the roof connector 34 for the roof 14/ceiling 16 connection would be filled with insulation 36, foam or fiberglass or other typical insulating material. However, the roof connector 34 for the roof 14/roof 14 ridge 44 connection could be hollow and/or have perforations 46 to enhance the escape of hot attic gasses to a continuous ridge vent 48.

Additionally, or alternatively, perforations 46 can be made in the single plenum 2, 8 roof panels 14 near the roof connector 34 to facilitate a ventilation flow to the ridge vent 48.

The bottom/ceiling adjacent surface 40 dimension of the roof connector 34 is anywhere between 6" and 72" as required for strength. Wider bottom lengths are anticipated where the bottom of the roof connector 34 is also serving as the ceiling 16 for the upper level of a "cape cod" style home 6.

Figure 5:
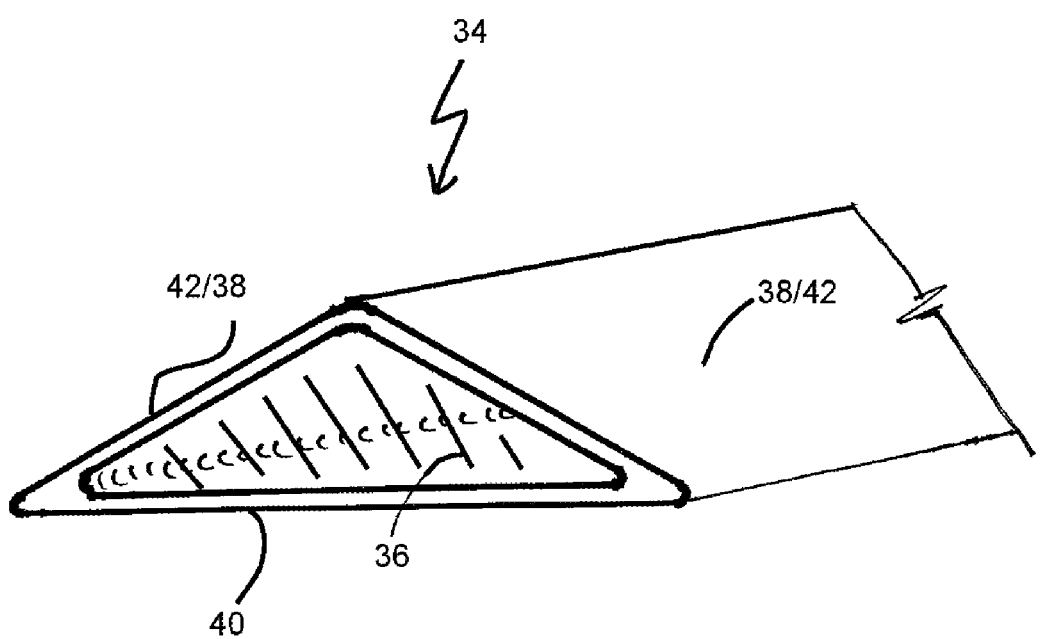
FIG. 5 is a partial perspective view of a roof connector according to the present invention.

Turning next to FIG. 5, another embodiment of the roof connector 34 is shown. In this embodiment, the roof connector 34 is formed from an extrusion or mold of, for example, aluminum, plastics, wood fiber, fiberglass, composites, or carbon fiber. Additionally, the roof connector 34 could also be formed of bent sheet metal, plastics, fiberglass, and carbon fiber.

The roof connector 34 is ideally a continuous structural member and has the same length as the roof panel 14 or roof 14/ceiling 16 edge. Similar to the embodiment shown in FIG. 4, the roof connector 34 of this embodiment would preferably have the same desired slope as the roof 14, and the same roof connector 34 would be able to be used for both the roof 14/ceiling 16 eve location as well as the roof ridge 44 location. However, just as in the previous embodiment, there are instances where roof connectors 44 having non-isosceles triangle sections may be preferable.

Ideally, as in the previous embodiment, the roof connector 34 is attached to the adjoining panels 12, 14, 16 with both mechanical and adhesive fastening. This preferably includes attaching to the single plenum panel 2, 8 roof 14 and either the single or multi plenum panel 2, 4, 8, 10 ceiling 16 or the single plenum panel 2, 8 walls 12. In some embodiments, the roof connector 34 may be at least mechanically fastened to each of the wall 12, ceiling 16, and roof 14 panels.

As in the previous embodiment it is anticipated that the roof connector 34 shown in FIG. 5 for the roof 14/ceiling 16 connection would be filled with insulation 36, foam or fiberglass or other typical insulating material. However, the roof connector 34 for the roof ridge 44 connection could be hollow and/or have perforations 46 to enhance the escape of hot attic gasses into a continuous ridge vent 48.

Additionally, or alternatively, as in the previous embodiment, perforations 46 can be provided in the single plenum 2, 8 roof panels 14 near the roof connector 34 to facilitate a ventilation flow into the ridge vent 48.

As in the previous embodiment, the bottom/ceiling adjacent surface 40 dimension of the roof connector 34 is anywhere between 6" and 72" as required for strength. Wider bottom lengths are anticipated where the bottom of the roof connector 34 is also serving as the ceiling 16 for the upper level of a "cape cod" style home 6.

Figure 6A:
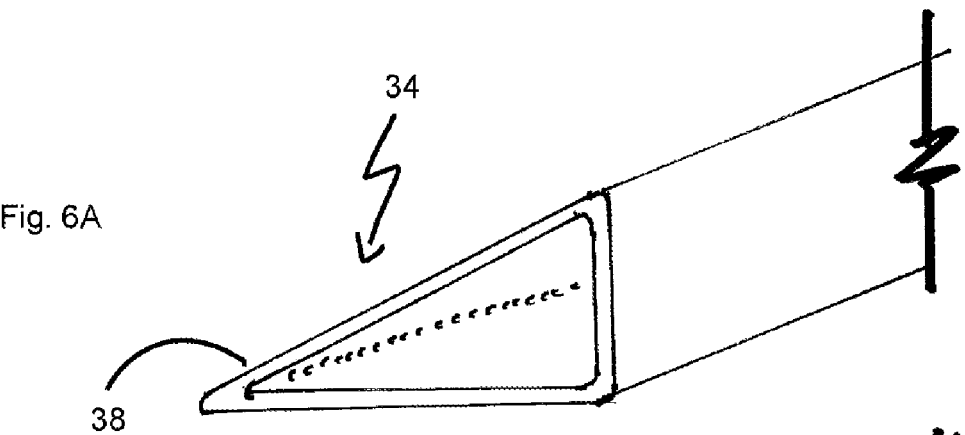
FIGS. 6A and 6B are partial perspective views of two additional embodiments of roof connectors according to the present invention.
Figure 6B:
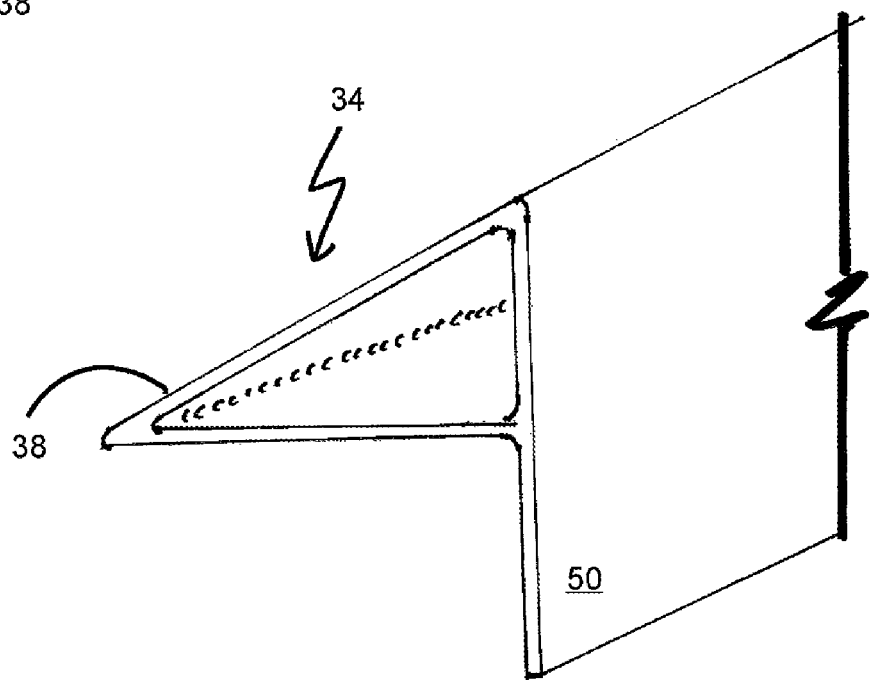

Turning next to FIGS. 6A and 6B, two further embodiments of the roof connector 34 are shown. These embodiments are ideal for attaching inclined single plenum panels 2, 8 (likely roof panels 14) to vertical surfaces (likely single plenum 2, 8 wall panels 12). These embodiments of the roof connector 34 are essentially a "half roof connector" as previously described. That is, they are hollow triangular prisms, but they have a cross section shaped like one half of an isosceles triangle, or a right triangle. Both embodiments in FIGS. 6A and 6B are formed or extruded from aluminum, plastics, wood fiber, carbon fiber, fiberglass, composites, sheet metal, etc.

In the embodiment shown in FIG. 6B, a vertical flange 50 extends below the main body to allow for easier connection of the roof connector to the adjacent vertical surface. This flange can also extend upwards onto a vertical wall for a better connection where the adjacent vertical wall extends further upward.

These two embodiments allow the roof connector 32 to be attached to the single plenum 2, 8 roof panel 14 on the exterior portion of the building, or, for example, with a soffit the interior of an attic space. Additionally, these embodiments allow the roof connector 34 to be directly adhesively and mechanically attached to the exterior sheet 58 of the single plenum 2, 8 wall panels 12, especially the embodiment with the vertical flange 50. It is understood that if desired, both a roof connector 34 as shown in FIG. 5 and a roof connector 34 as shown in one of the embodiments of FIGS. 6A and 6B could be used at a single wall 12/roof 14/ceiling 16 connection—a roof connector 34 from FIG. 5 where the roof 14 is adjacent to the ceiling 16/edge blocking 70 (see FIG. 13), and a roof connector from FIGS. 6A and 6B where the roof is adjacent to the wall 12/edge blocking 70.

Turning next to FIGS. 7A and 7B, another two additional embodiments of the roof connector 34 are shown. These two embodiments are essentially the same as the two roof connectors previously described in FIGS. 6A and 6B, but the roof connectors in FIGS. 7A and 7B are made of wood.

Figure 8:
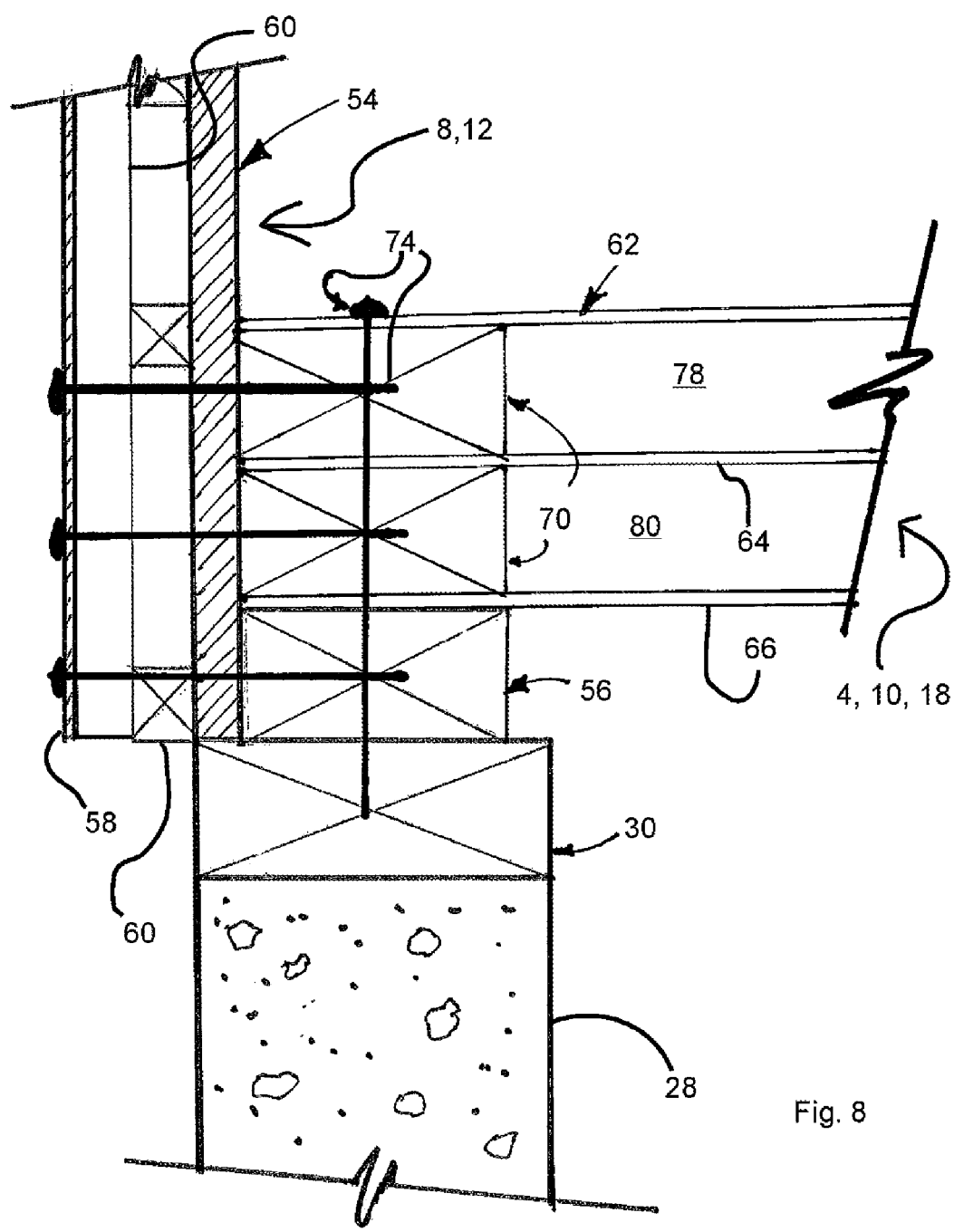
FIG. 8 is a partial sectional view of a floor, wall, and foundation of a building according to the present invention, were the wall is a single plenum panel and the floor is a multi-plenum panel.

Turning now to FIG. 8, one embodiment of the connection between the wall 12, the floor 18, and the foundation 28 of a building 6 according to the invention is shown. In this embodiment the walls 12 are constructed of continuous single plenum panels 8 and the floor 18 is constructed of multi-plenum panels 4, 10. The load bearing single plenum wall panels 8 would have as their main structural compressive member the inside facing interior sheet 54. The interior sheets 54 would bear on a top surface of the sill plate 30, adjacent to an outer edge of the sill plate 30. The inside sheets 54 would be located adjacent a 2×4 sill plate blocking 56 installed on top of the sill plate 30. The sill plate blocking 56 would preferably be installed in the field.

Connections would then be made between the single plenum 8 wall panel 12 and the 2×4 sill plate blocking 56. Ideally, this would be both a mechanical and adhesive connection. Mechanical connectors 74 such as screws can penetrate the full single plenum panels 2, 8, or connector holes 76 came be provided in the exterior sheet 58 of the single plenum panels 2, 8 to facilitate installation of screws 74 directly into the interior sheet 54 (as shown in later figures) at desired locations.

Next, the flooring 18 system would then be installed on the 2×4 sill plate blocking 56. The flooring 18 shown in this embodiment is a multi-plenum panel 4, 10. The multi plenum panel 4, 10 has a 2×4 edge blocking 70 installed along its outer edge in the top plenum 78 and bottom plenum 80 to facilitate attachment to the wall 12 and the sill plate 30 and sill plate blocking 56. The height of the edge blocking 70 in this embodiment matches the height of the respective plenums 78, 80, though other heights are possible. The length of the edge blocking 70 in this embodiment is along the entire outer edge of the floor panel 18 adjacent to the wall 12, but it may be shorter and/or in multiple spaced units. The edge blocking 70 in this embodiment is present in both the top and bottom plenum 78, 80, though could be in just one or the other. The edge blocking 70 may be larger or smaller in height, width, and length as required by strength.

The single plenum panel 2, 8 is then attached to the flooring system 18, ideally with both adhesive and mechanical means. As shown, screws 74 can be driven through the entire single plenum panel 2, 8 wall 12, directly mechanically fastening both the interior and exterior sheets 54, 58 to the sill plate blocking 56 and/or the floor panel 18 edge blocking 70. Additionally or alternatively, as described below, connector holes 76 can be provided in the outer exterior sheet 58 to facilitate screws 74 driven directly through the load bearing interior sheet 54 of the single plenum panel 2, 8 into the sill plate blocking 56 and/or the floor panel 18 edge blocking 70, with the head of the screw 74 adjacent the load bearing interior sheet 54.

Although it is anticipated that screws 74 will be primarily used in fastening, it should be noted that unless the text states "only screws," the term screw used in this disclosure is not meant to be limiting, and shall include other mechanical fasteners 74 including, for example, nails, bolts and braids, as would be apparent to one of skill in the art.

Figure 9:
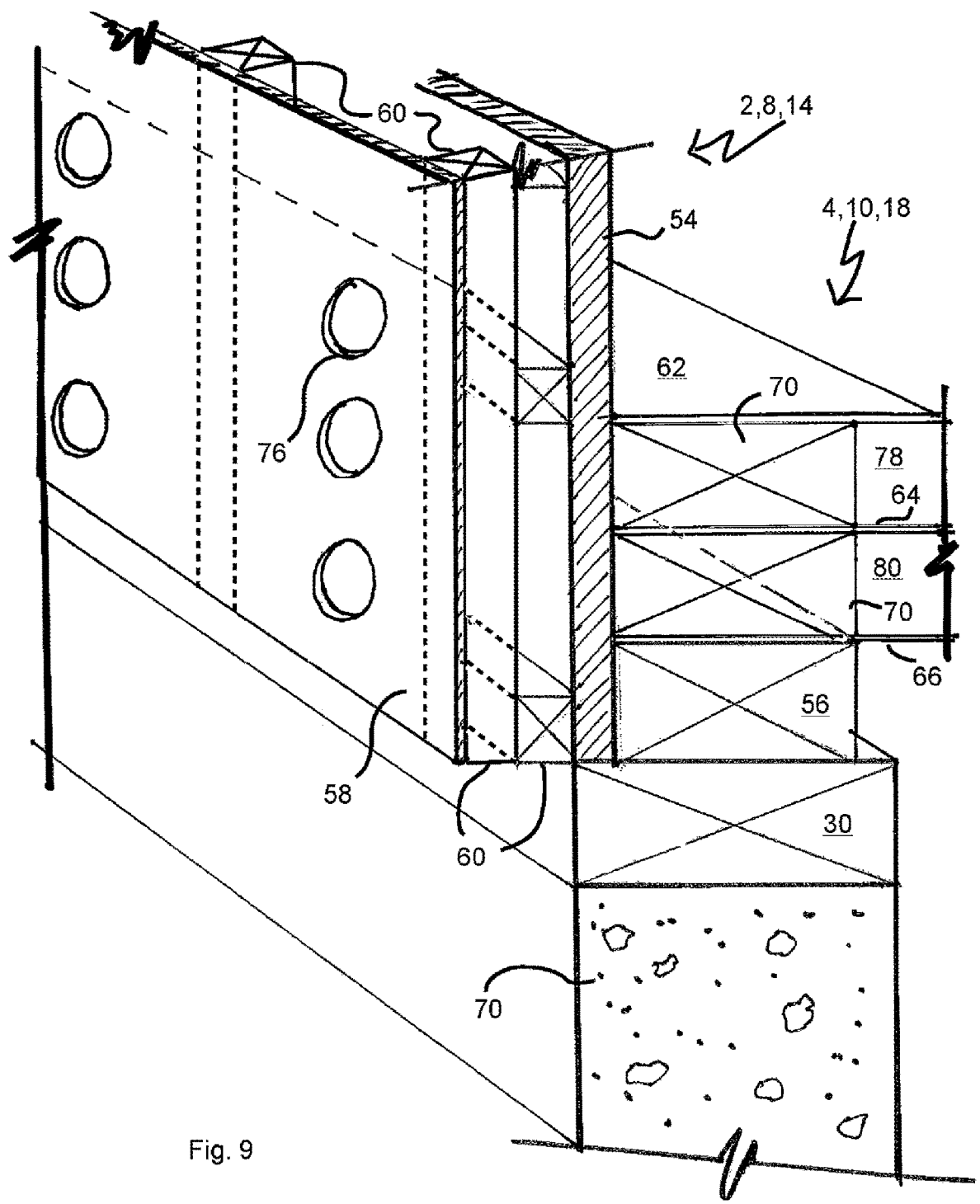
FIG. 9 is a partial perspective sectional view of a floor, wall, and foundation of a building according to the present invention, were the wall is a single plenum panel and the floor is a multi-plenum panel and holes are present in the exterior sheet of the single plenum panel.

Turning now to FIG. 9, a further embodiment of the floor 18/wall 12/foundation 28 connection of FIG. 8 is shown. This Figure shows perforations or through connector holes that can be provided in the exterior sheet 58 of the single plenum panel 2, 8 to facilitate the connection of the single plenum panel 2, 8 wall 12 to the flooring 18 and foundation 28 system. The connector holes 76 can be provided either in the factory or field. The screws 74 used to mechanically attach the various elements to one another are not shown in this Figure to show greater detail.

Additionally, a bottom portion of the exterior sheet 58 of the single plenum panels 2, 8 can be removed in the factory or field to facilitate directly connecting the load bearing interior sheet 54 to the interior structure 6, especially the flooring 18 and foundation 28 system.

Figure 10:
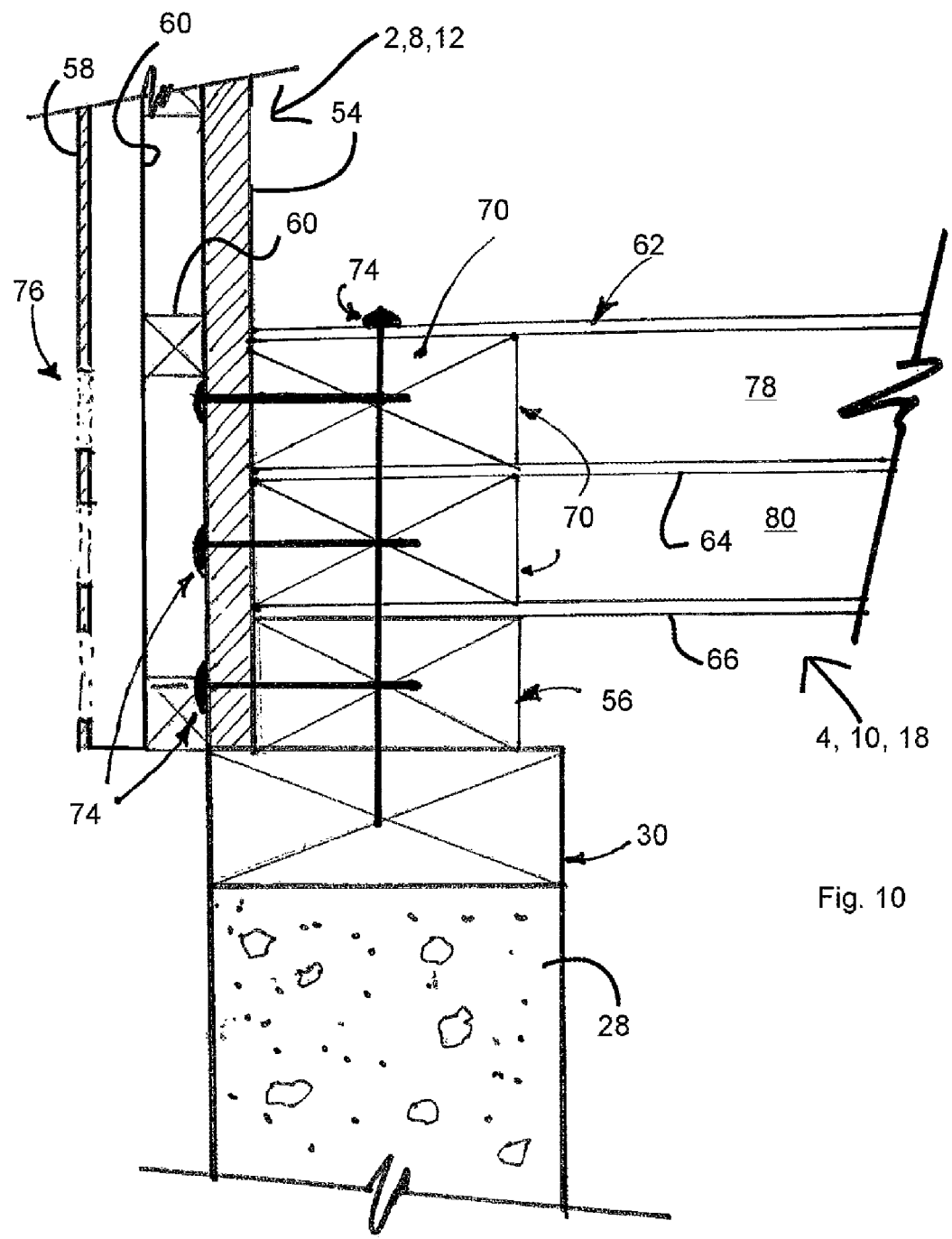
FIG. 10 is partial sectional view of a of a floor, wall, and foundation of a building according to the present invention, were the wall is a single plenum panel and the floor is a multi-plenum panel and holes in the exterior sheet of the single plenum panel allow for fasteners to be attached directly from the interior sheet of the single plenum panel.
Figure 12:
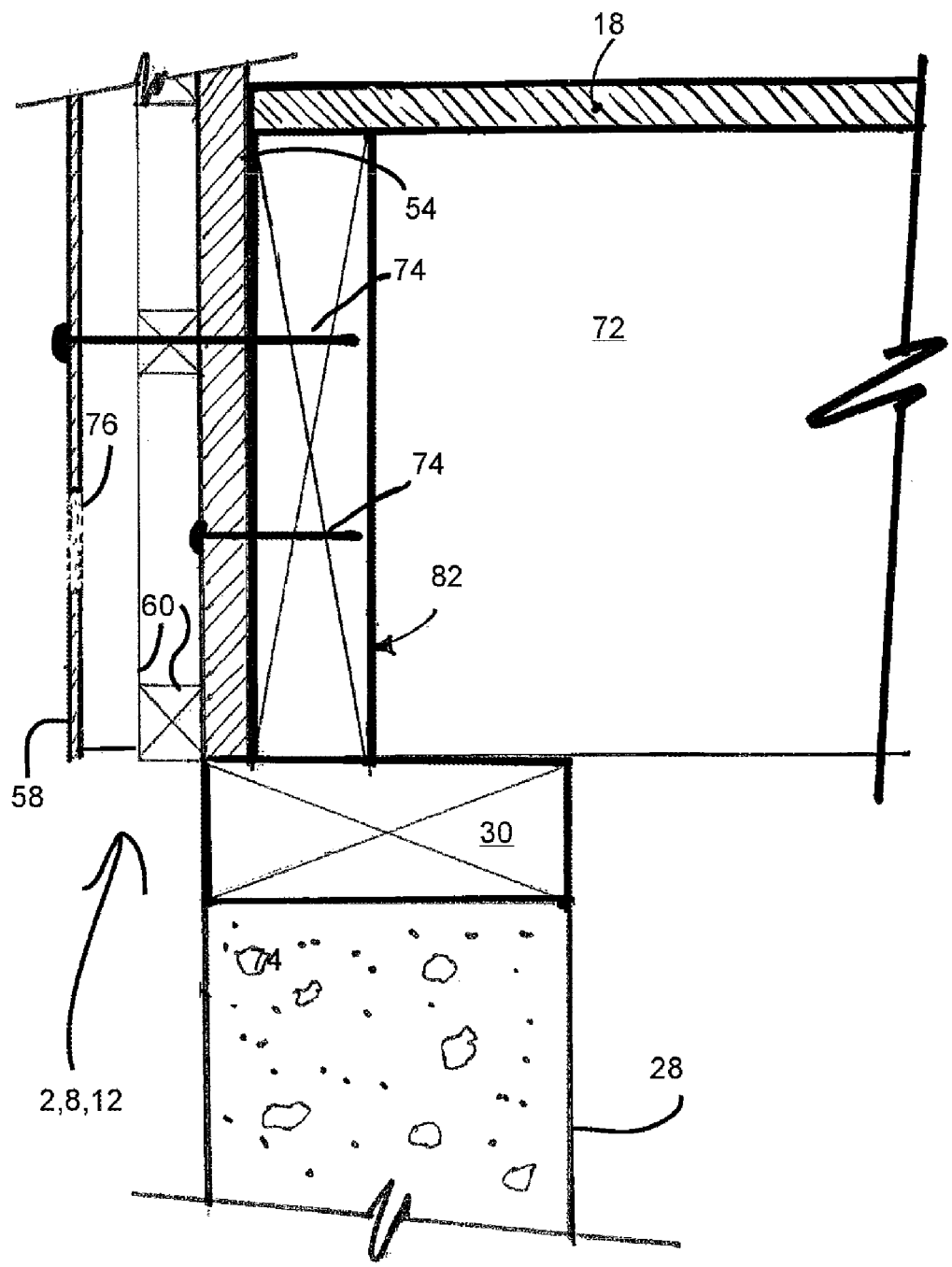
FIG. 12 is a partial sectional view of an another alternate embodiment of FIG. 8, where the wall is a single plenum panel and the floor is conventional flooring with floor joists.

Turning now to FIG. 10, this figure shows a side view of the embodiment shown in FIG. 9. As can be seen the connector holes 76 allow for easy access to directly screw the screws 74 into the interior sheet 54 of the single plenum panel 2, 8 wall 12. This facilitates the connection of the single plenum panel 2, 8 wall 12 to the flooring 18 and foundation 28 system. The connector holes 76 can be provided either in the factor or field. Additionally, as shown in FIG. 12, in the same wall 12, screws 74 can be driven both through the exterior and interior sheets 58, 54 of the single plenum panel 2, 8 wall 12 and into the sill plate blocking 56 and also through connector holes 76 directly into the load bearing interior sheet 54 and into the sill plate blocking 56.

Figure 11:
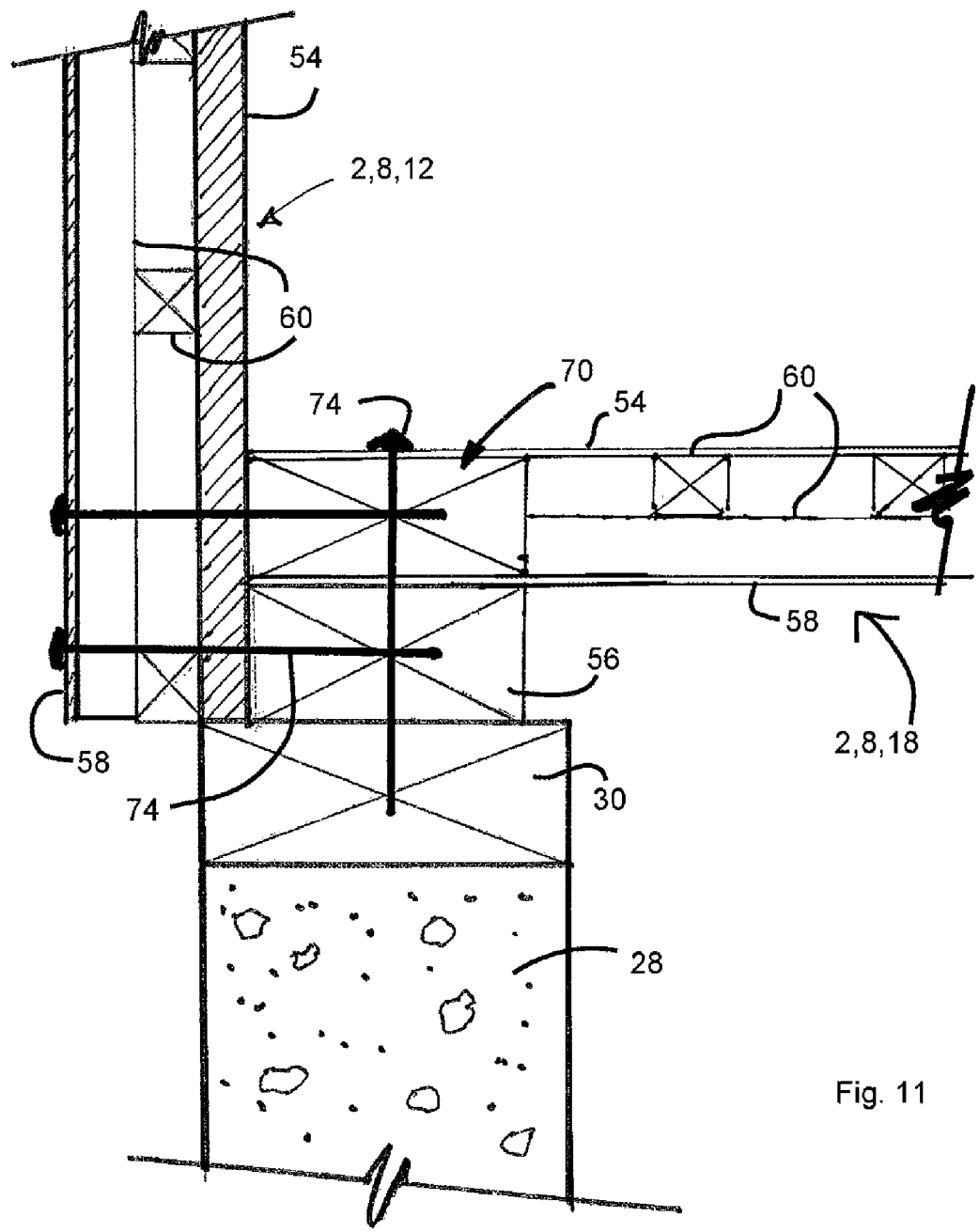
FIG. 11 is a partial sectional view of an alternate embodiment of FIG. 8, where both the wall and the floor are single plenum panels.

Turning now to FIG. 11, an additional embodiment of a floor 18/wall 12/foundation 28 connection of a building 6 according to this invention is shown. In this embodiment a load bearing single plenum panel 2, 8 wall 12 is attached to a single plenum panel 2, 8 floor 18 system, instead of the multi plenum panel 4, 10 floor 18 system shown in FIGS. 6-8.

The single plenum panel 2, 8 wall 12 is located with a 2×4 sill plate blocking 56 attached to the preferably pressure treated sill plate 30. The connection is ideally both mechanical and adhesive. In the shown embodiment screws 74 are driven through the both sheets 54, 58 of the single plenum panel 2, 8 and into both the floor 18 edge blocking 70 and sill plate blocking 56 in the single plenum panel 2, 8 flooring 18.

As with the previous embodiments the size and continuity of the floor 18 edge blocking 70 may vary based on strength need. Also as with the previous embodiments, connector holes 76 may be provided in the exterior sheet 58 of the single plenum panel 2, 8 wall 12 or a lower portion of the exterior sheet 58 of the single plenum panel 2, 8 wall 12 may be removed to allow for direct screwing of screws 74 into the load bearing interior sheet 54 of the single plenum panel 2, 8 wall 12.

Turning now to FIG. 12 a still further embodiment of the floor 18/wall 12/foundation 28 attachment is shown. In this embodiment a frameless load bearing single plenum panel 2, 8 wall 12 is attached to a conventionally framed flooring system made of 2×10 joists 72. In this embodiment there would be a rim joist 82 to which the single plenum panel 2, 8 would be attached, preferably with both mechanical and adhesive means.

This embodiment also shows screws 74 being driven both through the entire single plenum panel 2, 8 into the rim joist 82, and via provided connector holes 76 being driven directly into the load boarding interior sheet 54 and into the rim joist 82.

Figure 13:
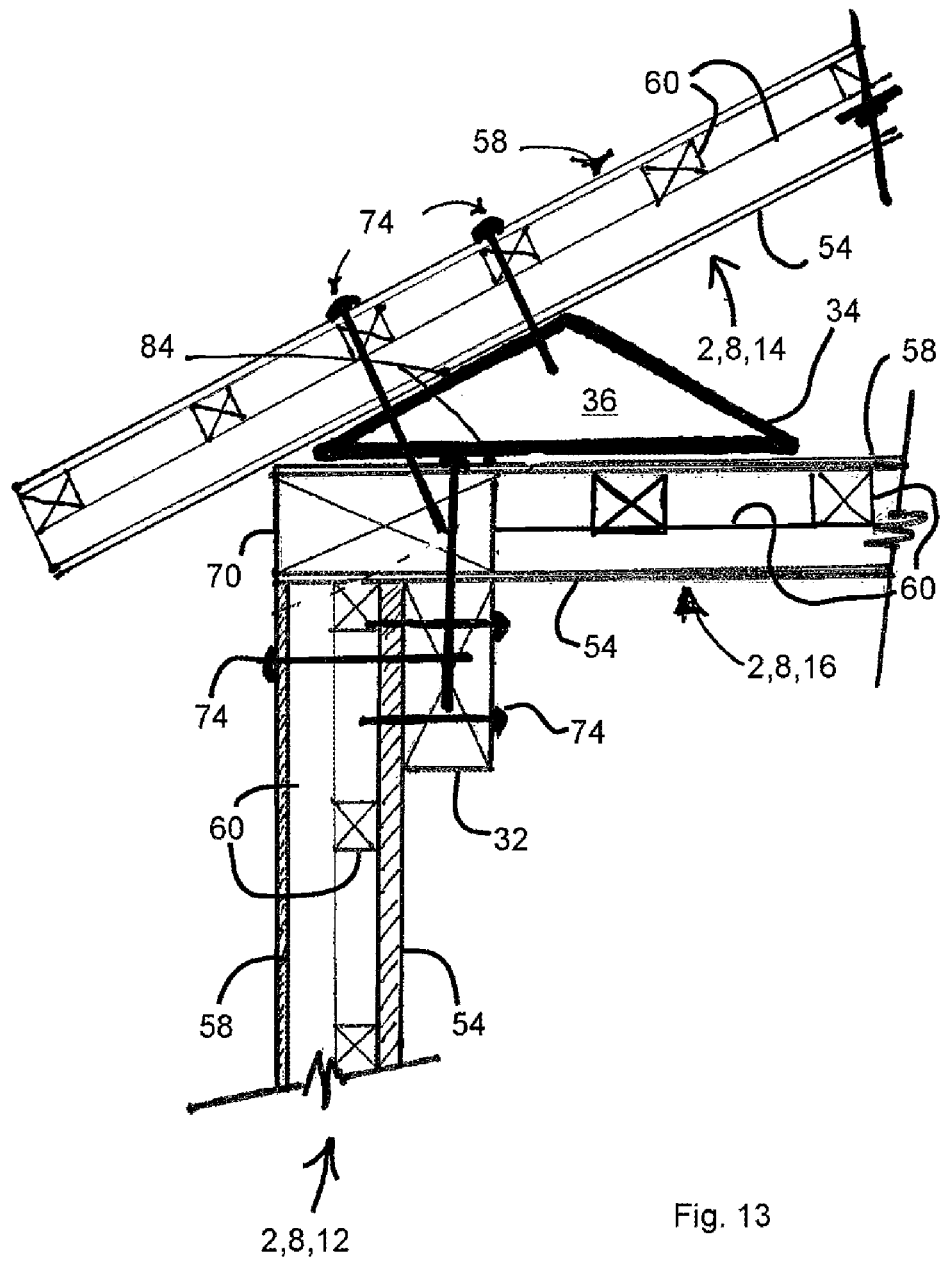
FIG. 13 is a partial sectional view of a of a wall, ceiling, and roof of a building according to the present invention, where the wall, ceiling, and roof are all single plenum panels.

Turning now to FIG. 13, a first embodiment of a wall 12/roof 14/ceiling 16 connection of a building 6 according to the invention is shown. In this embodiment the load bearing single plenum panel 2, 8 wall 12 is connected to a single plenum panel 2, 8 ceiling panel 16 and a single plenum panel 2, 8 roof 14.

A 2×4 or larger wall blocking 32 is attached to the top of the load bearing single plenum panel 2, 8 wall 12 continuously along its length. This wall blocking 32 is ideally attached from the inside of the building to the interior sheet 54 of the single plenum panel 2, 8 with screws 74 or other mechanical fasteners 74 but could also be attached from the exterior sheet 58 of the single plenum panel 2, 8. Ideally, the wall blocking 32 is also attached with adhesive 84.

The ceiling panel 16 can be made of either single plenum panels 2, 8 (shown) or multi plenum panels 4, 10 (shown in FIG. 12) and has edge blocking 70 of approximately 2×4 size. Screws 74 are then run through the ceiling panel 16 into the wall blocking 32 attached to the load bearing single plenum panel 2, 8 wall 12. Ideally, the connection is both mechanical and with adhesive 84. In contrast to the floor panel 18 edge blocking 70, which is preferably laterally adjacent to the wall panel 12, the ceiling panel edge blocking 70 in this embodiment is vertically above the wall panel 12.

The roof panel 14 is connected using the previously described continuous roof connector 34 that has been ideally previous attached to the roof panel 34 or the ceiling panel 16 with both mechanical and adhesive means. In attaching the roof panel 14 to the ceiling panel 16, ideally an adhesive connection 84 is established between any of the roof panel 14 and the ceiling panel 16 that have not previously be attached to the roof connector 34. The roof connector 34 is screwed into the roof panel 14. One screw 74 is ideally longer and screws into the 2×4 edge blocking 70 in the edge of the ceiling panel 16. The ceiling panel 16 can have a Mag/Ox bottom layer/interior sheet 54, or ¼" OSB/plywood and ¼" drywall or wood for ceiling tile or ornamented wood pattern.

Figure 14:
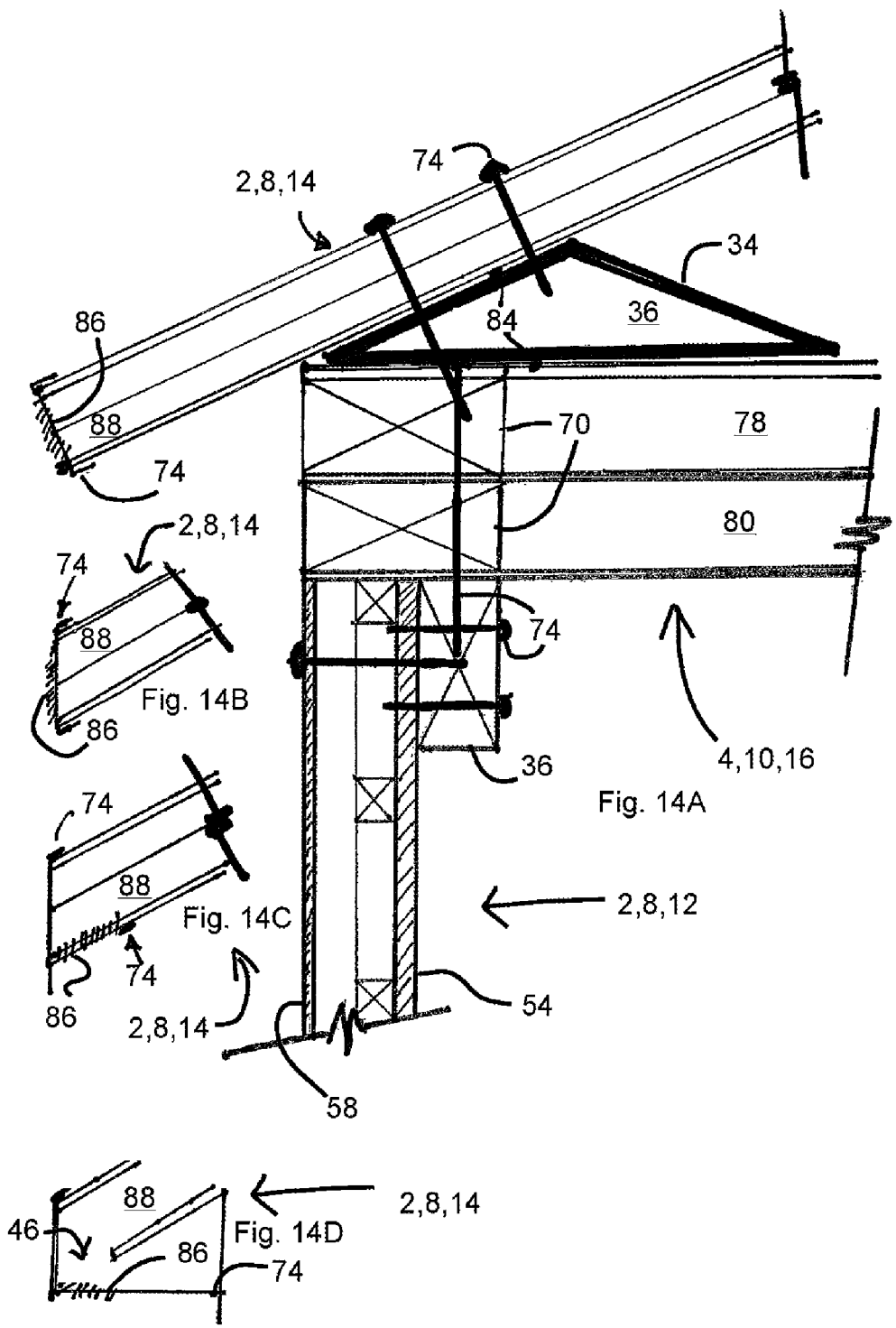
FIG. 14A is a partial sectional view of an alternate embodiment of FIG. 11, where both the wall and roof are single plenum panels and the ceiling is a multi-plenum panel and in FIGS. 14A to 14D, details of four embodiments of louvers are shown.

Turning now to FIG. 14A, a second embodiment of a wall 12/roof 14/ceiling 16 connection of a building 6 according to the invention is shown. In this embodiment the load bearing single plenum panel 2, 8 wall 12 is connected to a multi plenum panel 4, 10 ceiling 16 and single plenum panel 2, 8 roof 14. The multi plenum panel 4, 10 ceiling panel 16 (or ceiling-floor panel 16/18 for the multi-story building) has edge blocking 70 that is connected to 2×4 (or larger) wall blocking 32 that was preferably previously attached on the interior sheet 54 of the single plenum panel 2, 8 wall 12.

A 2×4 or larger wall blocking 32 is attached to the top edge of the load bearing single plenum panel 2, 8 wall 12 continuously along its length. The wall blocking 32 is ideally attached from the inside of the building 6 with screws 74 but could also be attached from the outside. Ideally, the wall blocking 32 is also attached with adhesive 84.

Screws 74 are then run through the top sheet 62 of the multi plenum 4, 10 ceiling panel 16, passing through the upper edge blocking 70, the middle sheet 64, the lower edge blocking 70, the bottom sheet 66, and into the wall blocking 32 attached to the load bearing single plenum 2, 8 panel wall 12. Ideally, the connection is both mechanical and with adhesive 82. In contrast to the floor panel 18 edge blocking 72, which is preferably laterally adjacent to the wall panel 12, the ceiling panel 16 edge blocking 72 in this embodiment is vertically above the wall panel 12. The roof panel 14 can now be connected.

The roof panel 14 is connected using the previously described continuous roof connector 34 that has been ideally previous attached to the roof panel 14 or the ceiling panel 16 with both mechanical and adhesive means 74, 82. In attaching the roof panel 14 to the ceiling panel 16, ideally an adhesive connection 82 is established between any of the roof panel 14 and the ceiling panel 16 that have not previously be attached to the roof connector 34. The roof connector 34 is screwed into the roof panel 14. One screw 74 is ideally longer and screws into the 2×4 edge blocking 72 in the edge of the ceiling panel 16.

Also shown in FIGS. 14A to 14D are four different embodiments of louvers or fascia or other permeable occlusions 88 that provide limited passage into the plenum 88 of the roof panel 14. These permeable occlusions 88 or end details could be accomplished with aluminum or vinyl and stapled 74 on the end of the single plenum panels 2, 8. The purpose of the fascia 88 is to provide a finished end of the single plenum panels 2, 8 and to also facilitate ventilation, while screening out insects. The end details could be attached at a terminal edge of the roof panel 14 plenum 88, or along a gap provided in the lower (interior) sheet 54 of the roof panel 14. Other types of permeable occlusions and similar locations may be used.

Figure 15:
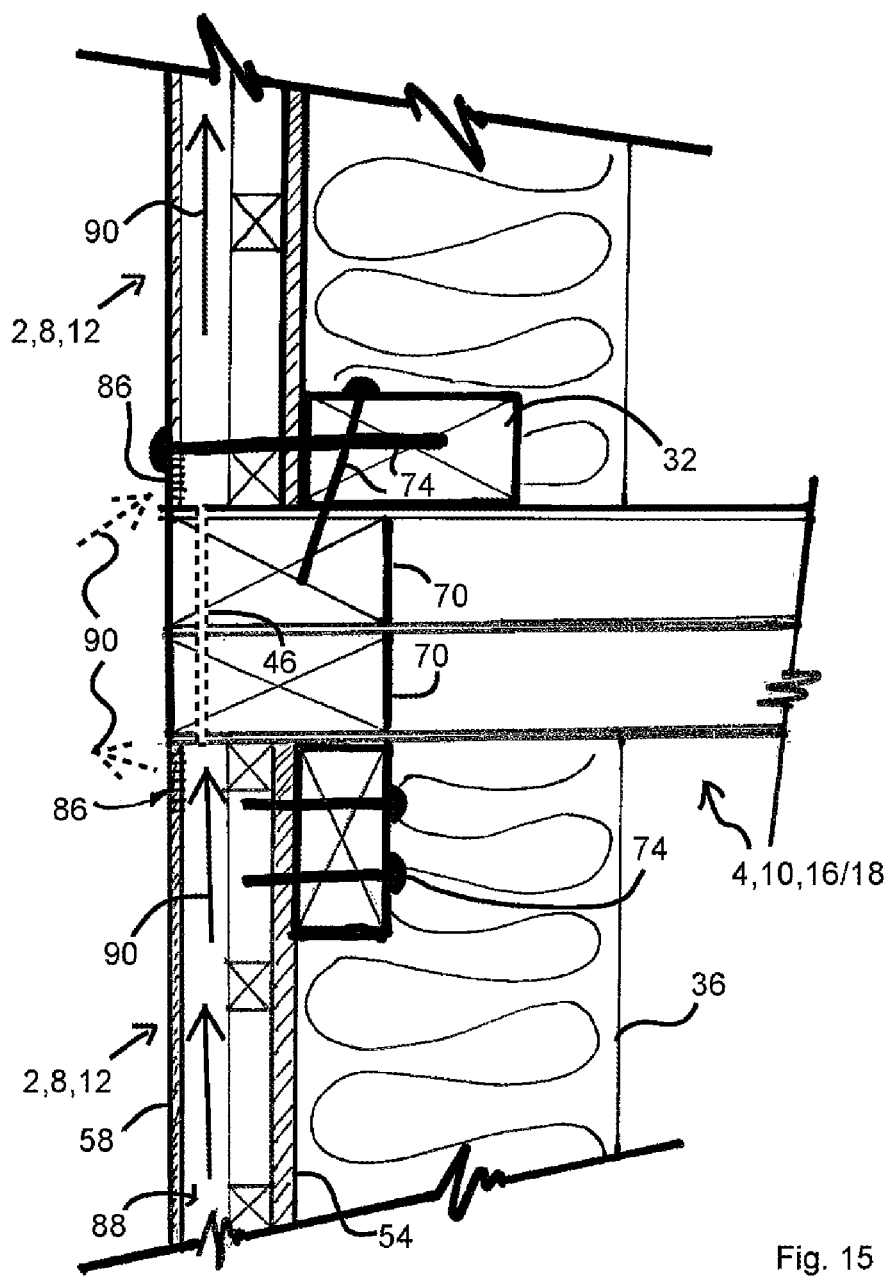
FIG. 15 is a partial sectional view of a wall and floor/ceiling of a multi-floor building according to the present invention, where the first and second level walls are both single plenum panels and the first level floor/second level ceiling is a multi-plenum panel.
Figure 16:
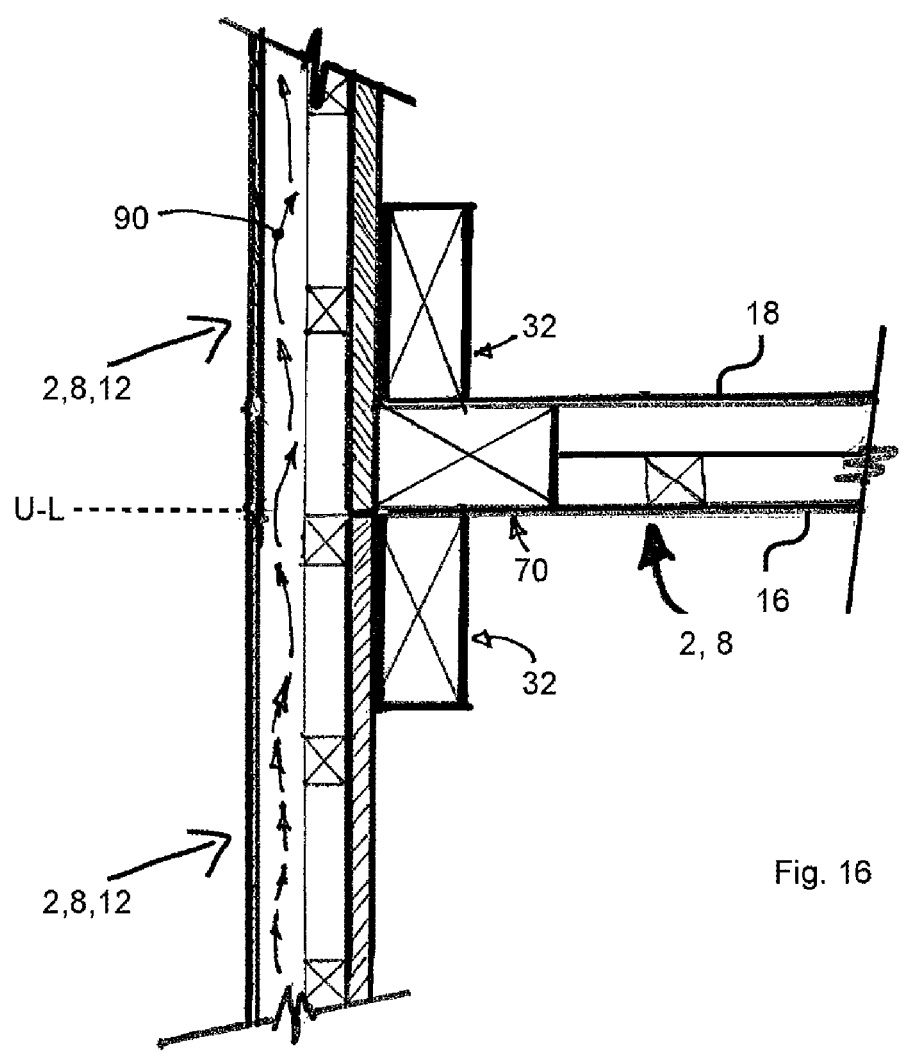
FIG. 16 is a partial sectional view of an alternate embodiment of FIG. 15, where the first and second level walls and the first level floor/second level ceiling are all single plenum panels, and the first and second level walls provide a continuous vertical ventilation path.
Figure 17:
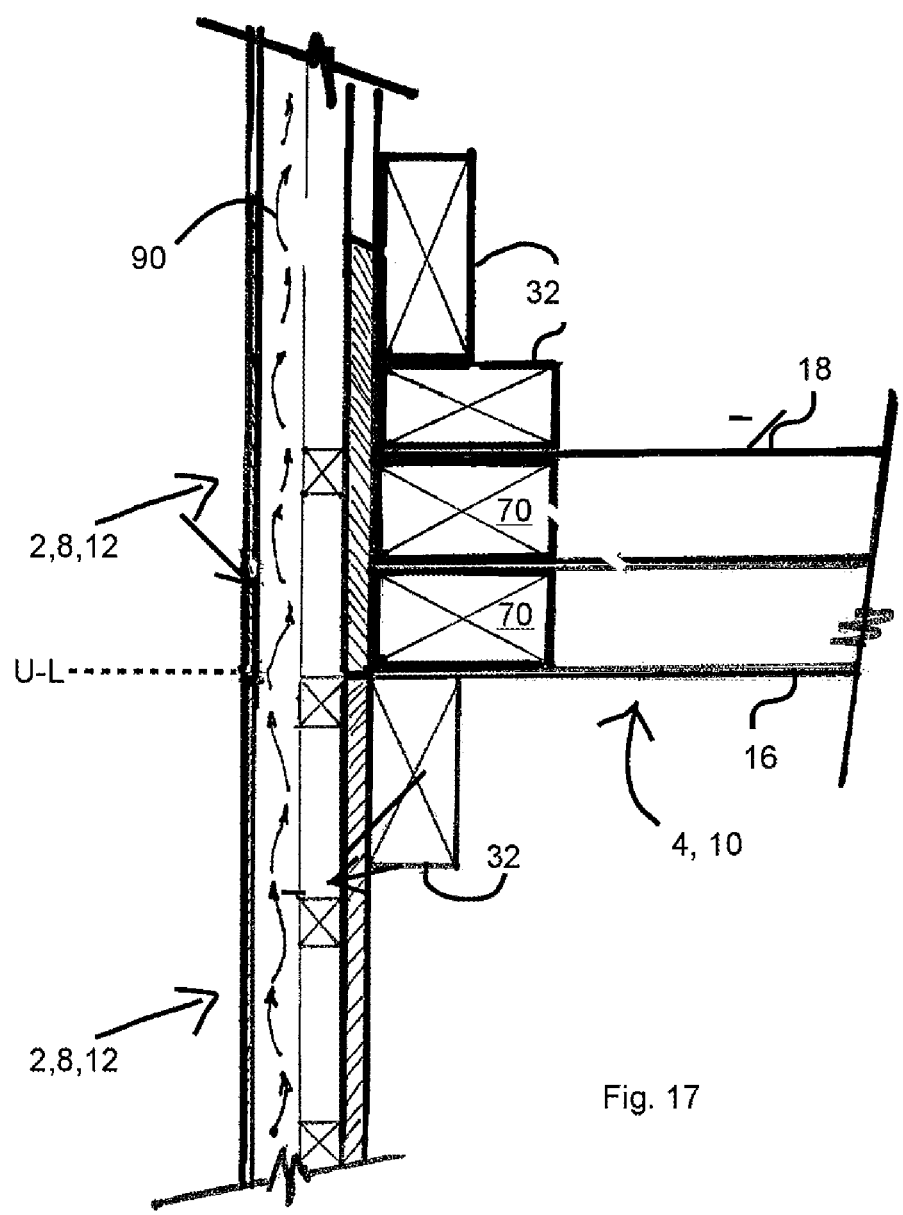
FIG. 17 is a partial sectional view of another alternate embodiment of FIG. 15, where the first and second level walls are both single plenum panels and the first level floor/second level ceiling is a multi-plenum panel, and the first and second level walls provide a continuous vertical ventilation path.

Turning now to FIGS. 15-17, three different embodiments are shown of wall 12 and ceiling-floor 16/18 attachments for multi-level buildings 6 according to the present invention.

In FIG. 15, an upper and a lower single plenum panel 2, 8 wall 12 are joined to a multi plenum panel 4, 10 ceiling-floor 16/18. The section shown is similar to FIG. 14A in that it shows the method of connecting ceiling panels 16 to the single plenum panel 2, 8 load bearing wall 12 by placing the ceiling-floor 16/18 edge blocking 70 vertically above the lower single plenum panel 2, 8 wall 12. This, in turn, has the upper single plenum panel 2, 8 wall 12 directly above the ceiling-floor 16/18 edge blocking 70.

A 2×4 or larger wall blocking 32 has been attached to the top of the lower load bearing single plenum panel 2, 8 wall 12 continuously along its length. This is ideally attached from the building 6 inside with screws 74 but could also be attached from the outside. Ideally, this attachment is also made with adhesive 84.

The ceiling-floor panel 16/18, having edge blocking 70 inserted therein, is then placed on top of the lower wall panel 12 and lower wall blocking 32 and (not shown) screws 74 are screwed down through the ceiling-floor panel 16/18 from the top and into the lower wall blocking 34. Ideally, the ceiling-floor panel 16/18 will also be attached to the lower wall blocking 32 with adhesive 84.

Next, a 2×4 upper wall blocking 32 is attached to the top of the multi-plenum panel 4, 10 ceiling-floor panel 16/18 and is inset so that the thickness of the single plenum panel 2, 8, upper wall 12 matches that of the single plenum panel 2, 8 lower wall 12 below. The interior sheet 54 of the upper and lower single plenum panels 2, 8 are load bearing, so they must be fit continuously. The load bearing interior sheet 54 of the upper wall panel 12 can be attached with screws 74 from the building interior or the building exterior (shown) through the upper wall blocking 32. Ideally, the upper wall panel 12 is also attached to the upper wall blocking 32 with adhesive 84. Vertical aligned vertical perforations 46 could be provided in the ceiling-floor panel 16/18 edge blocking 70 and the in the top, middle, and bottom sheets 62, 64, 66 of the multi-plenum panel. This would allow gasses from the plenum 88 of the lower wall panel 12 to pass upward through the vertically aligned vertical perforations 46 of the edge blocking 70 and sheets 62, 64, 66, and into the plenum 88 of the upper wall panel 12, allowing continuous vertical wall ventilation.

Alternatively or additionally, permeable occlusions 86 could be located in the upper portion of the exterior sheet 58 of the lower wall panel 12 and in the lower portion of the exterior sheet 58 of the upper wall panel 12, as shown. This venting gasses and in to the wall 12 plenums 88 though permeable occlusions 86 allows for a vertical movement of gasses through the plenum 88 of the wall panels 12, though not directly from the lower to the upper.

For a two story structure, the top of the upper wall panel 12 could then be as shown in FIG. 13 or 14A, where the ceiling and roof panels 16, 14 are connected to the wall panel 12.

Turning to FIG. 16, a second embodiment of a wall 12 and ceiling-floor 16/18 attachment for a multi-level building 6 is shown. In this embodiment, a load bearing single plenum panel 2, 8 wall 14 (either upper or lower unit panels 2 as shown, or continuous 8) is attached to single plenum panel 2, 8 ceiling-floor 16/18. A plane marking the level of the lower and upper wall panel 12 intersection is marked by the horizontal dashed line L-U. A lower single plenum panel 2, 8 wall panel 12 is assembled using methods previously described as a load bearing wall 12. Lower wall blocking 32 is preferably mechanically and adhesively attached adjacent to the top of the interior sheet 54 of the lower single plenum panel 2, 8 wall 12 to support a horizontal single plenum panel 2, 8 used for both the lower level ceiling 16 and the upper level floor 18. This horizontal single plenum panel 2, 8 has edge blocking 70 to facilitate mechanical and adhesive attachment to the lower wall blocking 32.

After installation of the horizontal single plenum panel 2, 8, an upper (vertically oriented) load bearing single plenum panel 2, 8 wall panel 12 is placed on and vertically aligned with the lower wall panel 12, as shown in FIG. 16. The upper wall panel 12 is preferably mechanically and adhesively attached to the edge blocking 70 and an additional upper wall blocking 32 is added to the second floor level. The upper wall blocking 32 is preferably also mechanically and adhesively attached to the edge blocking 70.

This embodiment allows the continuous and substantially unobstructed ventilation and air/gas flow 90 along the single plenum panel 2, 8 walls 12.

Turning next to FIG. 17, a third embodiment of a wall 12 and ceiling-floor 16/18 attachment for a multi-level building 6 is shown. Similar to the first embodiment shown in FIG. 15, this third embodiment includes upper and lower single plenum panel 2, 8 wall panels 12, and a multi plenum panel 4, 10 floor-ceiling panel 16/18, with the plane marking the level of the lower and upper wall panel 12 intersection marked by the horizontal dashed line L-U. But, similar to the second embodiment the upper and lower single plenum panel 2, 8 walls 12 are directly adjacent to one another and the edge blocking 70 for the ceiling-floor panel 16/18 is horizontally adjacent to the wall panel(s) 12, not vertically adjacent.

In this third embodiment, a lower single plenum panel 2, 8 wall panel 12 is assembled using methods previously described as a load bearing wall 12. Lower wall blocking 32 is preferably mechanically and adhesively attached to top of the interior sheet 54 sheet of the lower single plenum panel 2, 8 wall 12 to support a horizontal multi plenum panel 4, 10, which is used for both the lower level ceiling 16 and the upper level floor 18. This horizontal multi-plenum panel 4, 10 has edge blocking 70 to facilitate mechanical and adhesive attachment to the lower wall blocking 32.

After installation of the horizontal multi-plenum panel 4, 10, an upper (vertically oriented) load bearing single plenum panel 2, 8 wall panel 12 is placed on and vertically aligned with the lower wall panel 12, as shown in FIG. 17. The upper wall panel 12 is preferably mechanically and adhesively attached to the edge blocking 70 and an additional upper wall blocking 32 added to the second floor level. The upper wall blocking 32 is preferably also mechanically and adhesively attached to the edge blocking 70. The blocking shown in this third embodiment includes two upper wall blockings 32, one horizontal wall blocking 32 adjacent to the upper wall panel 12 and the multi-plenum panel 4, 10 ceiling-floor 16/18 and a second vertical wall blocking 32 adjacent to the upper wall panel 12 and the horizontal wall blocking 32. The extra upper wall blocking 32 could also be used for the second embodiment of FIG. 16 and vice versa.

This third embodiment also allows the continuous and substantially unobstructed vertical ventilation and flow of air/gas 90 along the single plenum panel 2, 8 walls 12.

Figure 18:
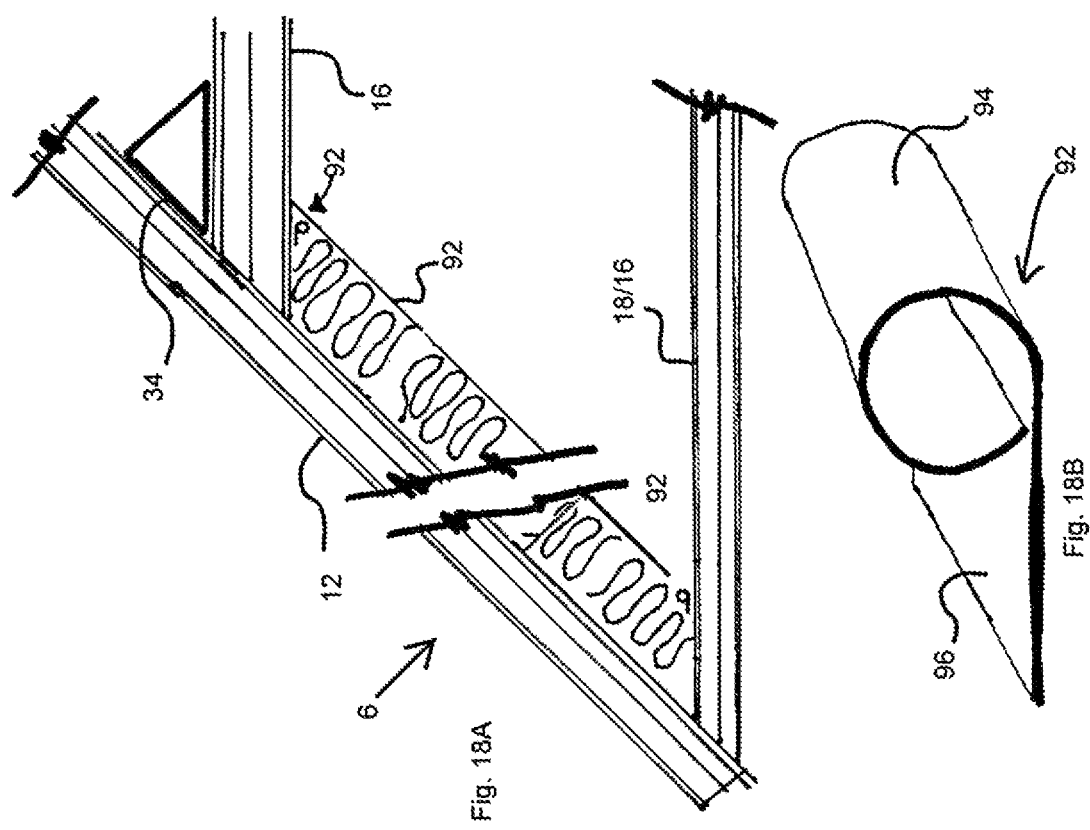
FIGS. 18A and 18B is a partial sectional view and a close-up perspective view of a device to facilitate installing insulation and drywall on an inclined single or multi plenum wall of a building according to the present invention.

Turning now to FIGS. 18A and 18B, a flanged circle guide device 92 is shown to aid installation of drywall and insulation 36 on the inside of inclined single plenum panel 2, 8 walls 12 or roofs 14.

The flanged circle guide device 92 can be extruded or formed from plastics, metal, vinyl, fiberglass, composites, and many other materials. A cross section has a circular portion 94 and a protruding flange portion 96 extending tangentially from the circular portion 94. It has a rounded edge and the circular portion 94 has a diameter anywhere from ½" to 6". The protruding flange portion 96 extends 2" to 8" from the circular portion 94. The flanged circle guide device 92 is manufactured in substantial lengths, such that it can be installed in continuous lengths anywhere from 4' to 40'.

The flanged circle guide device 92 is used for to retain batt insulation 36 on an inclined surface. This flanged circle guide device 92 is also used as a gauge for foam insulation 36 so that the foam insulation 36 is installed to a certain desired depth. This depth would be consistent with the insulation guides 98 discussed further in this description.

The flanged circle guide device 92 are installed with screws, staples or nails or other mechanical connectors 74 and/or adhesives 84 along the flange portion 96.

Figure 19:
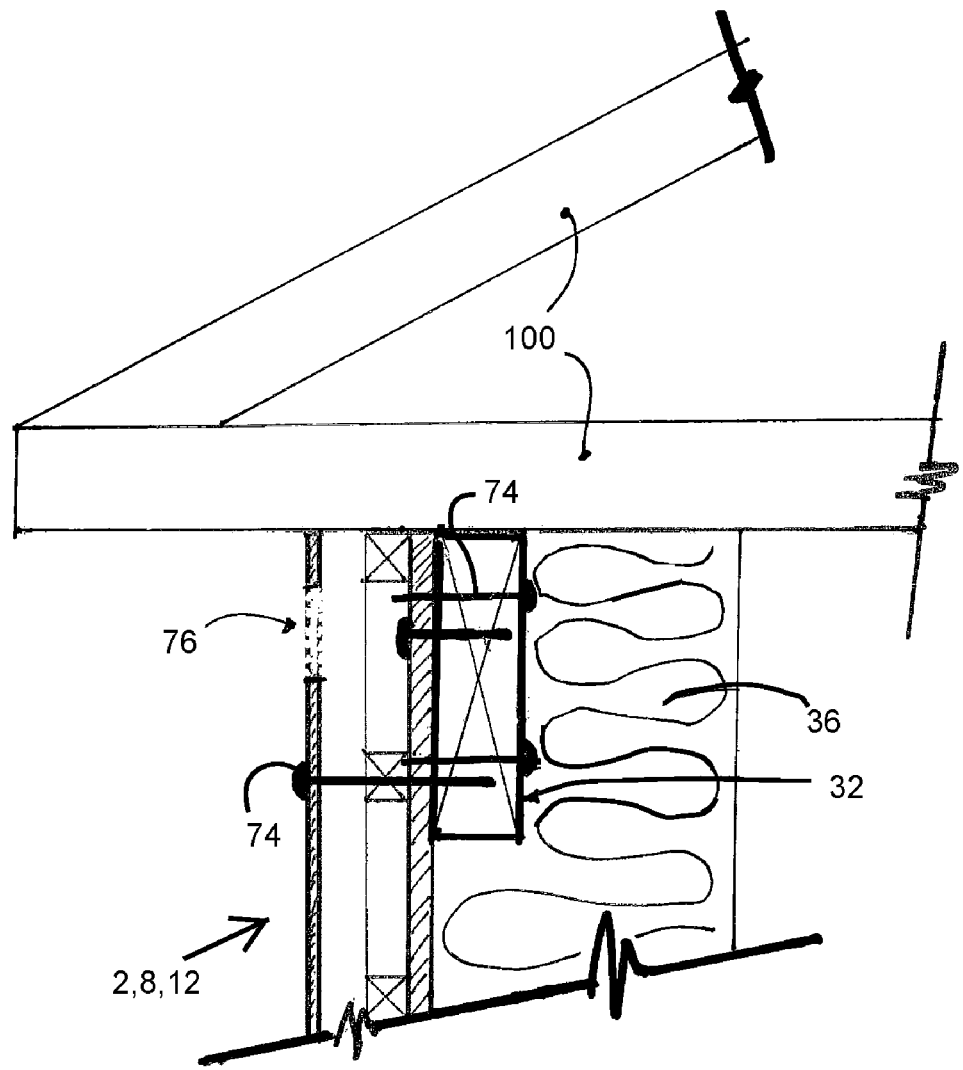
FIG. 19 is a partial sectional view of a of a wall and a roof according to the present invention, where the wall is a single plenum panel and the roof uses conventional trusses

Turning now to FIG. 19, a third embodiment of a wall 12/roof 14/ceiling 16 connection of a building 6 according to the invention is shown. In this embodiment the load bearing single plenum panel 2, 8 wall 12 is connected to a roof 14 and ceiling 16 of conventional construction building 6 (with trusses 100).

This embodiment shows three different methods of connecting the top wall blocking 32 to the single plenum panel 2, 8 wall 12 to facilitate the installation of the ceiling 16 and roof 14 panels (in the embodiments of FIGS. 11 and 12) or trusses 100 and rafters of the embodiment of FIG. 19.

Three different methods of screwing the top wall blocking 32 are shown—a first method where the screw 74 passes through the complete single plenum panel 2, 8 from the outside of the building 6 with the head of the screw 74 seated on the outer surface of the exterior sheet 58 and the tip of the screw 74 in the wall blocking 34, a second method where the screw 74 passes through a connector hole 76 through the exterior sheet 58 of the single plenum panel 2, 8 from the outside of the building 6 with the head of the screw 74 seated on the inner surface of the inner plenum facing surface of the interior sheet 54, and the third, and likely easiest method where the screw passes from the wall blocking 32 to the load bearing interior sheet 54 of the panel 2, 8 with the head of the screw 74 seated on the wall blocking 32. One, two, or all three of the methods may be used in this and other embodiments of wall blockings 32.

The top wall blocking 32 is attached to the load bearing interior sheet 54 of the single plenum panel 2, 8 with screws 74 in one or more of three methods described above, ideally in conjunction with adhesive 84. The wall blocking 32 can be 2×4, 2×6, and 2×8 or other dimensions such as 4×6 or 4×8. The wall blocking 32 will be preferably hidden by the insulation 36 which is installed later.

In the embodiment shown in FIG. 19, the ceiling 16 and roof 18 construction is conventional and a truss 100 is shown to be attached to the top of the single plenum panel 2, 8 wall 14 and the wall blocking 32. The truss 100 could be toe-nailed in, but most likely would be attached with metal clips, sometimes called "hurricane clips" for a better connection and one that can offset uplift, or some other mechanical connector 74.

It is also noted that a permeably occluded 86 upper terminal gap may be provided in the exterior sheet 58 (as shown in FIG. 15) of this and other wall panels 12 at the wall 12/ceiling 16/roof 14 connections to allow warm air flow 90 to exit the plenum 88. Alternatively a fluid connection, through vertical perforations, for example, can be made between the upper portion of the plenum 88 of the wall panel 12 and the lower edge of an above single plenum panel 2, 8 roof 14.

Figure 20:
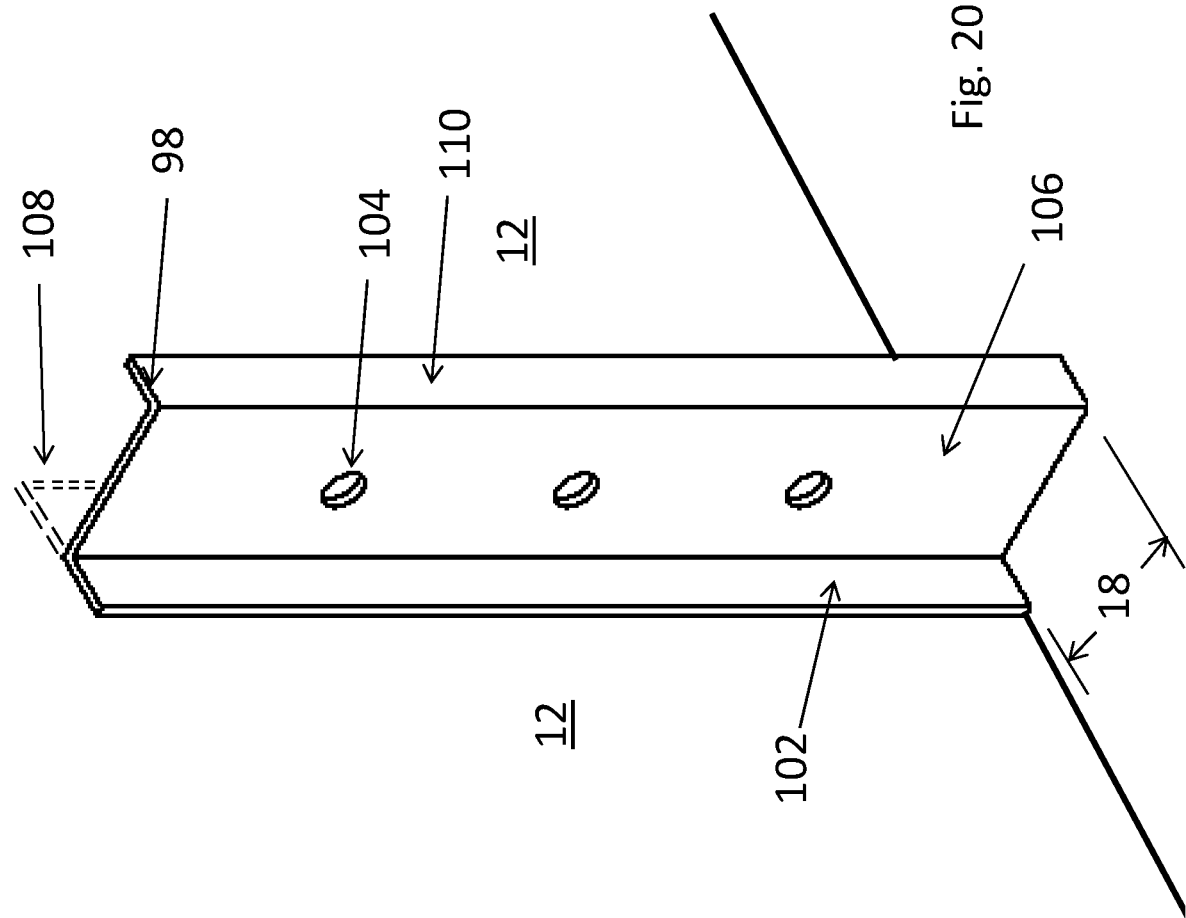
FIG. 20 is a perspective view of an insulation guide according to the present invention.

Turning now to FIG. 20, an insulation guide or gage 98 is shown. The insulation guide 98 is used to install either batt or foam insulation 36 against a flat surface. The depth of the insulation guide 98 would match either the thickness of the batt insulation 36 or the desired depth of the foam insulation 36. The rear face or expanse 102 of the insulation guide 98 would be stapled or nailed to the adjacent vertical flat surface, which is shown here as a wall 12, for a vertical orientation of the insulation guide 98.

Other non-vertical orientations for the insulation guide 98 could be for a ceiling 16 in the horizontal orientation or for a sloped surface, such as the inside wall 12 of a so called "cape cod" style house 6. It is anticipated that there are situations where the insulation guide 98 and/or the flanged circle guide device 92 shown in FIGS. 18A and 18B above could be used to aid in installing insulation 36 in a frameless building 6 constructed of single and multi-plenum panels 2, 4, 8, 10.

Holes or chases 104 are preferably provided in the transverse expanse 106 of the insulation guide 98 at intervals for the trades to install plumbing, heating, electrical, data wires, communication and other services and utilities as would be commonly installed and hidden in the walls 12. The chases 104 could be rounded or chamfered so that a doughnut would not have to be installed for wire installation as would be required if the edges of the chases 104 were sharp.

The insulation guide 98 can be made of extruded plastic, vinyl, aluminum, composite or any other material that could be extruded or made continuously. The insulation guide 98 can also be made from bent metal or formed from a variety of materials including vinyl, plastic, aluminum, corrugated products, carbon fiber, fiberglass, composites, or any planer materials.

The insulation guide 98 is installed to the wall 12 or ceiling 16 surface with staples or nails 74. It can be cut horizontally or vertically as necessary to avoid obstacles such as blocking 34, 72. Although the insulation guide 98 may stretch from floor 18 to ceiling 16, it is not necessary that it do so.

For foam insulation 36 applications, the insulation guide 98 will serve as the guide for the trimming of the foam insulation 36 after application.

For batt insulation 36, the guides or gauges 98 would preferably be installed at a certain increments along the wall 12 or ceiling 16 determined by the width of the insulation batts 36. For foam insulation 36 applications, the insulation guides 98 would preferably be installed at an increment less than the length of the cutting/trimming device for foam insulation 36.

Figure 21:
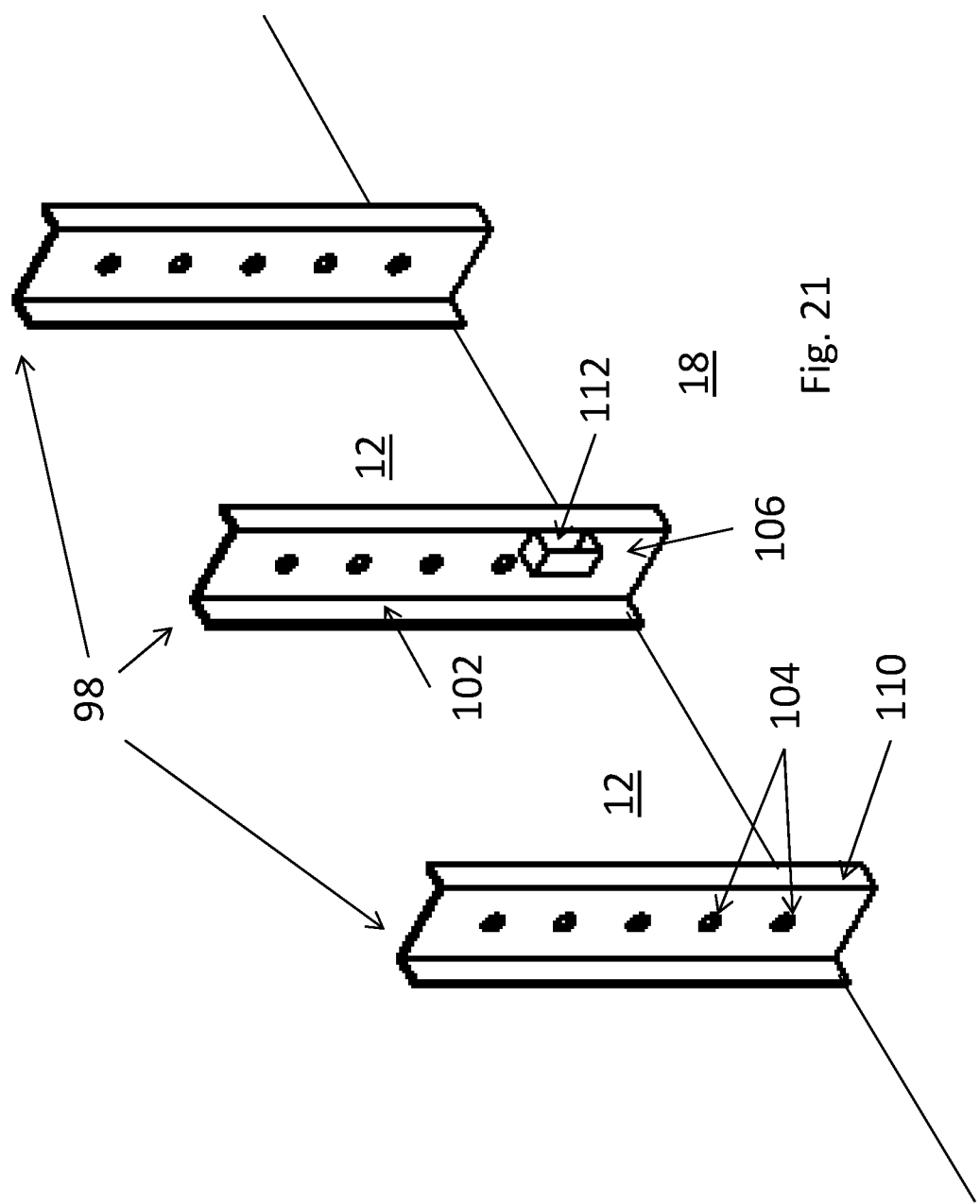
FIG. 21 is a perspective view of three installed insulation guides, including an electric box on the middle depicted insulation guide, according to the present invention.
Figure 22:
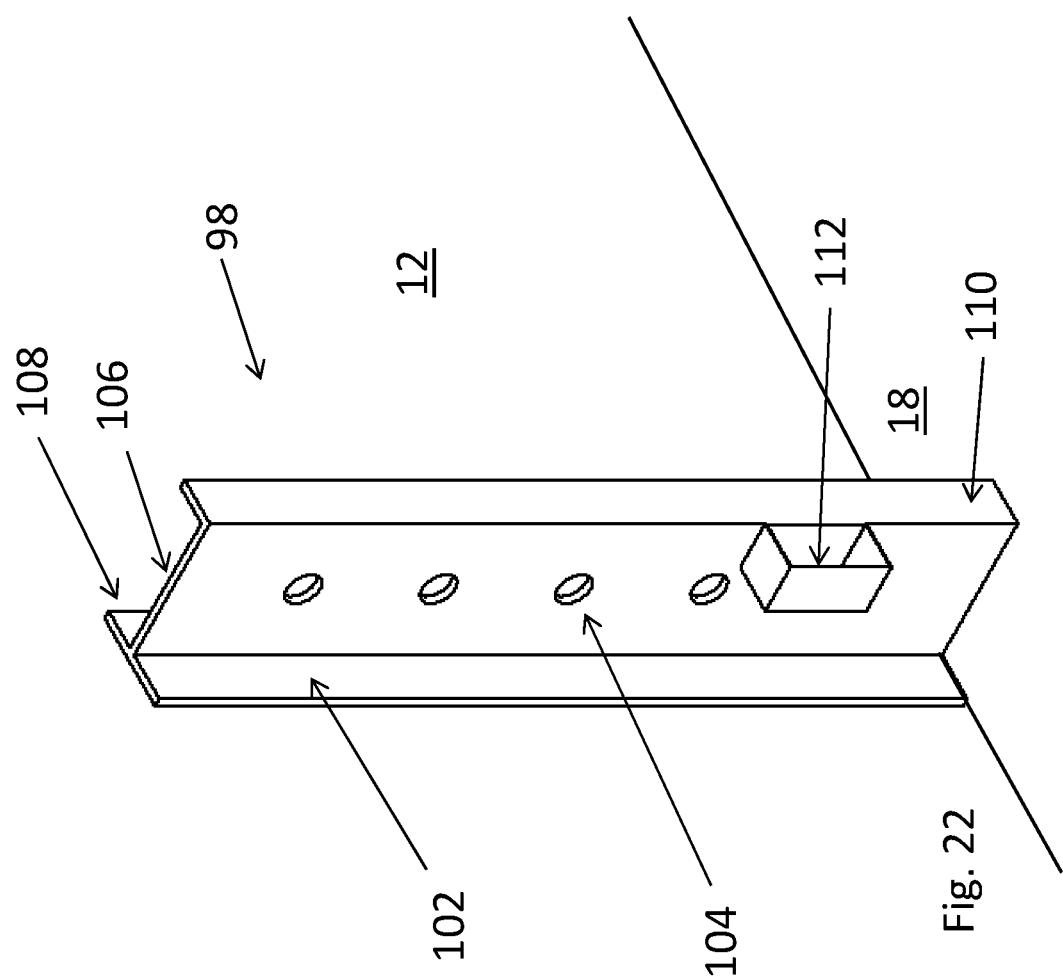
FIG. 22 is a perspective view of an installed insulation guide with a "T" wall flange and an electric box according to the present invention.

An optional "T" shape flange 108—shown in FIG. 22 and in dotted lines in FIG. 20—can be incorporated to the rear expanse 102 for stability if necessary. Similarly, the front expanse 110 may be T shaped as well, but will normally have a single flange extending from the transverse expanse 106 in an opposite direction as the flange extending from the rear expanse 102 (see FIG. 21). It is to be noted that the insulation guides 98 normally do not carry any load of the structure 6. Indeed, there may be a gap provided between the upper edge of the insulation guide 98 and the ceiling 16 to allow wide wire harnesses or pipes through. Additionally, there may be a gap between the lower edge of the insulation guide 98 and the floor 18 to allow passage of wide wire harnesses or pipes. Finally, there may also be a complete break along the vertical length of the insulation guide 98 to allow for passage of wide wire harnesses or pipes. Any of these scenarios would substantially prevent any load being carried by the insulation guides 6.

Turning now to FIG. 21, and embodiment is shown where numerous insulation guides or gauges 98 are installed along a wall 12 (three shown). In the middle insulation guide 98 an electric box 112 is attached for an electrician to install an electrical outlet. Electrical or data boxes 112 can be attached to the transverse expanse 106 or side of the insulation guides 98 as needed.

Turning next to FIG. 22, a view of an insulation guide having a "T" shaped flange 108 on the rear expanse 102 is shown. This drawing is similar to the middle insulation guide 98 of FIG. 21, but the insulation guide 98 depicted in this drawing also has the optional "T" shaped flange 108, which can be used for added rigidity when required. The electrical/data box 112 is also shown installed on the insulation guide 98.

Figure 23:
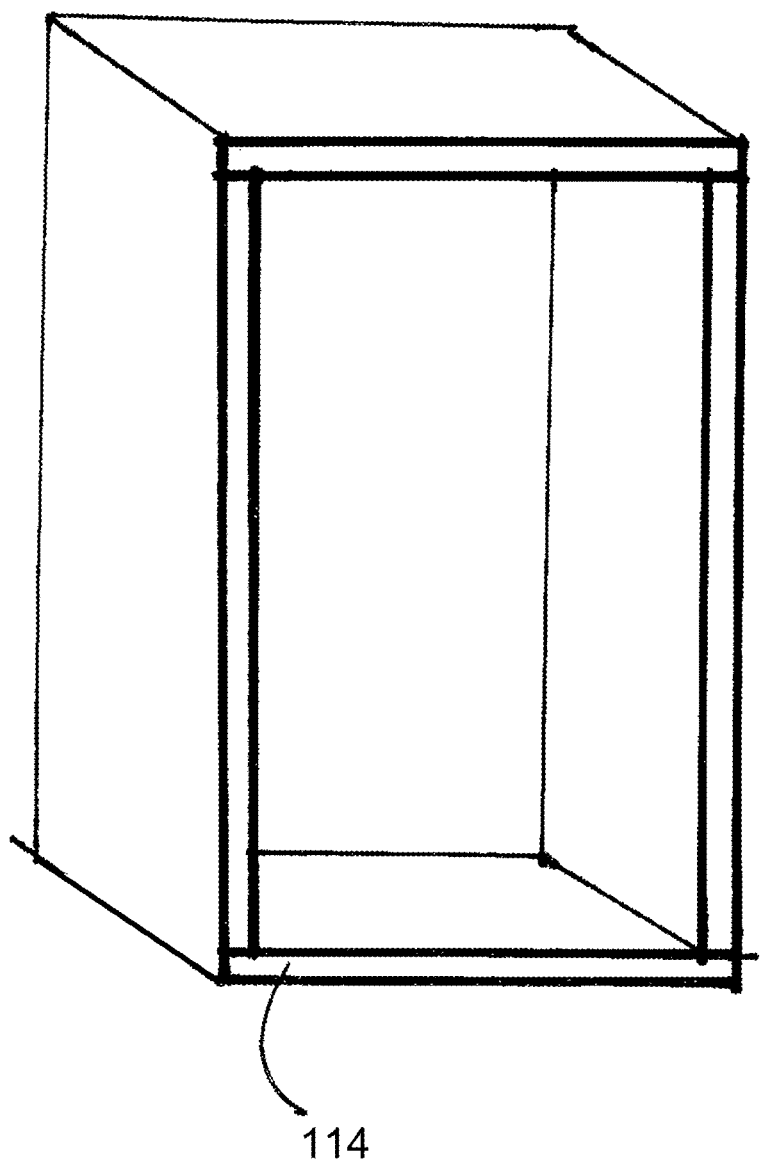
FIG. 23 is a simplified perspective view of a door or window frame box according to the present invention.
Figure 24:
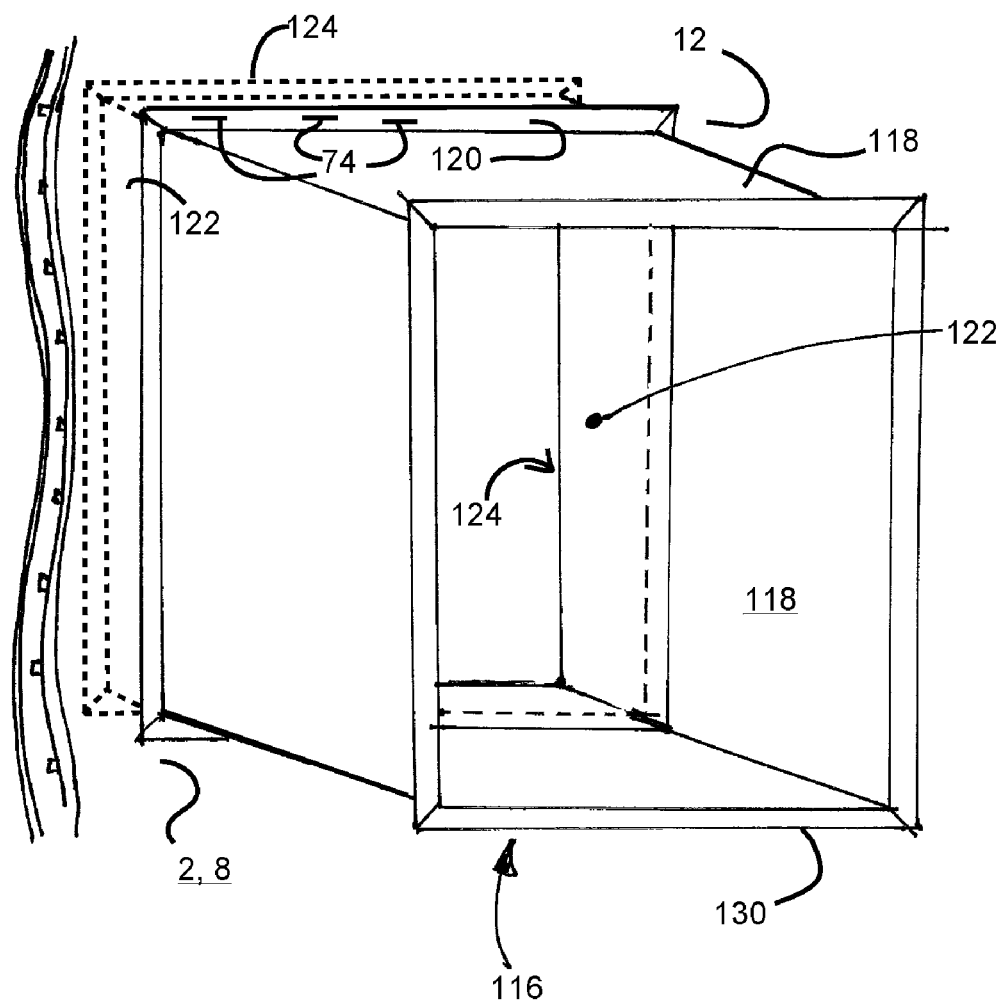
FIG. 24 is a perspective view of another embodiment of the door or window frame box according to the present invention.
Figure 25:
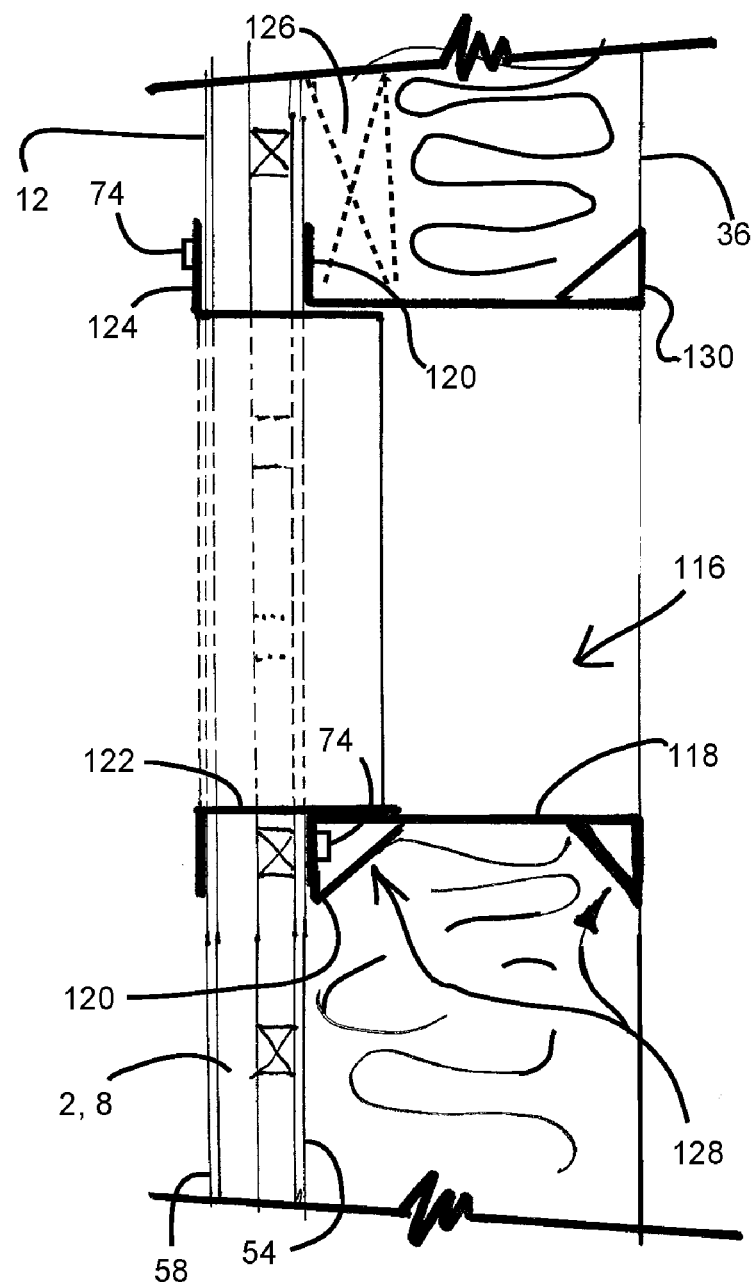
FIG. 25 is a partial sectional view of the door or window frame box according to FIG. 24 installed in a single plenum panel wall.

FIGS. 23-25 describe embodiments for installing windows 20 and doors 22 into the unit and continuous load bearing single plenum panel 2, 8 walls 12.

Turning first to FIG. 23, this figure shows a simple method of providing for the framing and installation of windows 20 or doors 22 in the load bearing single plenum panel 2, 8 wall 12. The desired opening is first cut in the wall 12. A box 114 of the desired rough opening is then attached to the inside of the single plenum panel wall with screws or nails. This design is made of nominal 2" lumber and with a depth as required.

Turning next to FIG. 24, a second embodiment for window 20 and door 22 installation is described. In this embodiment, windows 20 and doors 22 are installed in a load bearing single plenum panel 2, 8 wall 12 using a nested shell 116 with a depth desired for insulation. The entire nested shell 116 opening can be pre-made, especially for certain standard rough openings of windows 20 and doors 22 and used as appropriate. Alternatively, the nested shell 116 can be made in various lengths and cut and assembled as required for the desired opening.

The desired opening is cut through the single plenum panel 2, 8 for the window 20 or door 22. An interior shell 118, either as a single unit or in sections, is then installed through the opening or, as shown an interior flange 120 is stapled 74 to the outer surface of the interior sheet 54 of the wall panel 12 (the surface shown in the Figure). Only three staples 74 are shown to maintain clarity of the drawing. This interior shell 118 is the portion of the nested shell 116 that extends into the interior of the building 6.

An exterior shell 122 is then installed form the outside and fits inside the interior shell 118 previously installed. The exterior shell 122 has an exterior flange 124 (shown in dashed lines) which is stapled to the outer surface of the exterior sheet 58 of the wall panel 12 (outer surface facing away in the drawing). The joint between the exterior flange 124 and the wall panel 12 to the can be caulked, sealed or taped as desired to be waterproof, or flashing can be installed at a later time when the window 20 or door 22 is installed. The exterior shell 122 can interlock with the interior shell 118 or otherwise be mechanically or adhesively secured one to the other.

Turning next to FIG. 25, a cross section of the second embodiment for window 20 and door 22 installation, described in FIG. 24, is shown.

An optional shell blocking 126 can be installed across the top of the opening should it be required or desired for extra strength.

If more stability to the nested shell 116 is required, then flange tabs 128 could be included at intervals of 4" to 12" as shown. As can be seen, the interior shell 118 extends back into the building 6 as far as the insulation 36 and drywall. As can also be seen, the exterior shell 122 extends through and preferably 1" to 3" past the hole in the single plenum panel 2, 8. In the innermost portion of the interior shell 118, a trim flange 130 extends out from the interior shell 118. The trim flange 130 could be attached to the drywall mechanically or adhesively to the inner and/or outer surface of the drywall.

Turning next to FIGS. 26A-29, these drawings show multiple mechanical connectors or fasteners 74 that are specially designed for fastening single and double plenum panels 2, 4, 8, 10, as described above.

Turning to FIGS. 26A-26D, a toothed screw 132 is shown which allows an load bearing interior sheet 54 of a single plenum panel 2, 8 wall 12 to be directly fastened to a supporting structure (other panel or blocking, for example), without a pre-drilled access connector hole 76 in the exterior sheet 58 of the single plenum panel 2, 8 wall 12.

The FIGS. show four views of the toothed screw 132: a top view (FIG. 26A), a partial side view with the shank 134 of the toothed screw 132 omitted (FIG. 26B), a partial side view with the front and rear cutting teeth 136 omitted (FIG. 26C), and a bottom view (FIG. 26D). In the partial side view of FIG. 26B, the toothed screw 132 is shown with an enlarged flat head 138 having with cutting teeth 136 fixedly attached to and extending downward from the head 138 parallel to the shank 134. The cutting teeth 136 are 2 to 16 in number, and preferably 2 to 4 in number. The cutting teeth 136 are of a length equal to the thickness "$t$" of the exterior sheet 58 of the single plenum panel 2, 8 wall 12, which is the first layer of the panel wall 12 to be penetrated.

The partial side view of FIG. 26C shows the toothed screw 132 orientation while the partial side view of 26B shows one embodiment of the cutting teeth 136. This particular example has four cutting teeth 136, also shown in the bottom view of FIG. 26D.

The diameter of the top head 138 is as determined for the application and can be anywhere from ¼" to 3". The diameter of the screw shank 134 would be as required for strength.

The top view of FIG. 26A shows a star drive 140, but other screw drives 140, including hex, square, Torx, and Phillips may be used.

Figure 28:
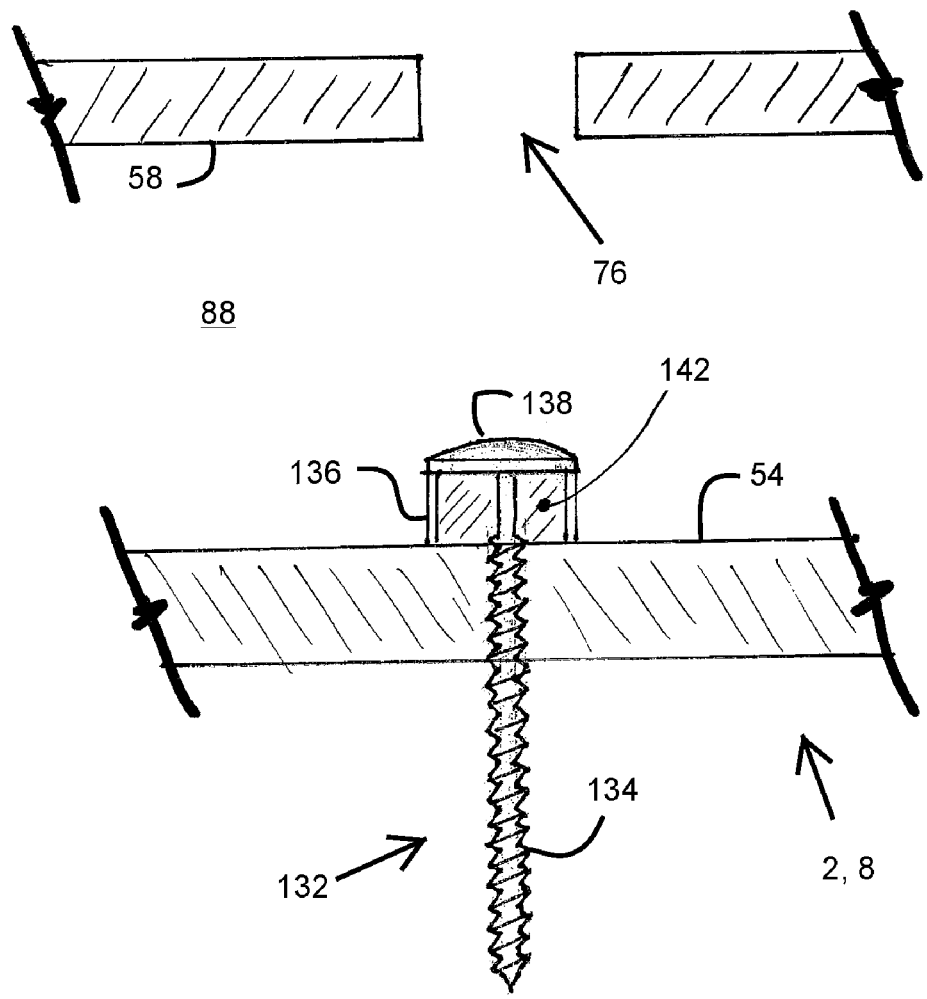
FIG. 28 is a second partial sectional view, temporally after the view of FIG. 27, of the self-seating toothed screw according to FIGS. 26A to 26D being seated in a single plenum panel.

Turning to FIGS. 27 and 28, the operation of the toothed screw of FIG. 26A-26D is shown. In the figures, the upper sheet in the drawing is preferably the exterior sheet 58 of the single plenum panel 2, 8 and the lower sheet in the drawing is preferably the interior sheet 54 of the single plenum panel 2, 8. As shown in FIG. 27 the toothed screw 132 is first driven into the exterior sheet 58 of a single plenum panel 2, 8, preferably without benefit of a pre-drilled connector hole 76.

As can be seen, the depth "$t$" of the cutting teeth 136 is substantially the same thickness "$t$" of the exterior sheet 58. To continue operation of the toothed screw 132, the toothed screw 132 continues to be driven downward into the exterior sheet 58 until the cutting teeth 136 contact the exterior sheet 58. At this point, continued rotation of the toothed screw 132 causes the cutting teeth 136 to cut into the exterior sheet. As the toothed screw 132 is rotated further, the cutting teeth 136 cut entirely through the exterior sheet 58 and a wood plug 142 (formed from the cut out portion of the exterior sheet 58) is seated in the head 138 of the toothed screw 132. At this point, a connector hole 76 has been automatically provided in the exterior sheet 58 by operation of the toothed screw 132, and the toothed screw 132 is no longer restrained by the exterior sheet 58 and may progress downward into the interior sheet 54, as shown in FIG. 28.

In FIG. 28, the toothed screw 132 is shown after it has been directly screwed in into the interior sheet 54 all the way down until the cutting teeth 136 are contacting the interior sheet 54. However, because the wood plug 142 fills the cavity in the screw head 138, it spaces and blocks the cutting teeth 136 from advancing further into the interior sheet 54. In effect, the wood plug 142 acts as a washer to self-seat the toothed screw 132 onto the interior sheet 54 of the single plenum panel 2, 8. On the opposite side of the interior sheet 54 from the toothed screw head 138 would be some type of structural support (e.g., a blocking 32, 56, 70) for the single plenum panel 2, 8 to attach to the structure 6.

With the disclosed self-seating toothed screw 132, no special tools are required, other than perhaps an extended screw drill bit.

Figure 29:
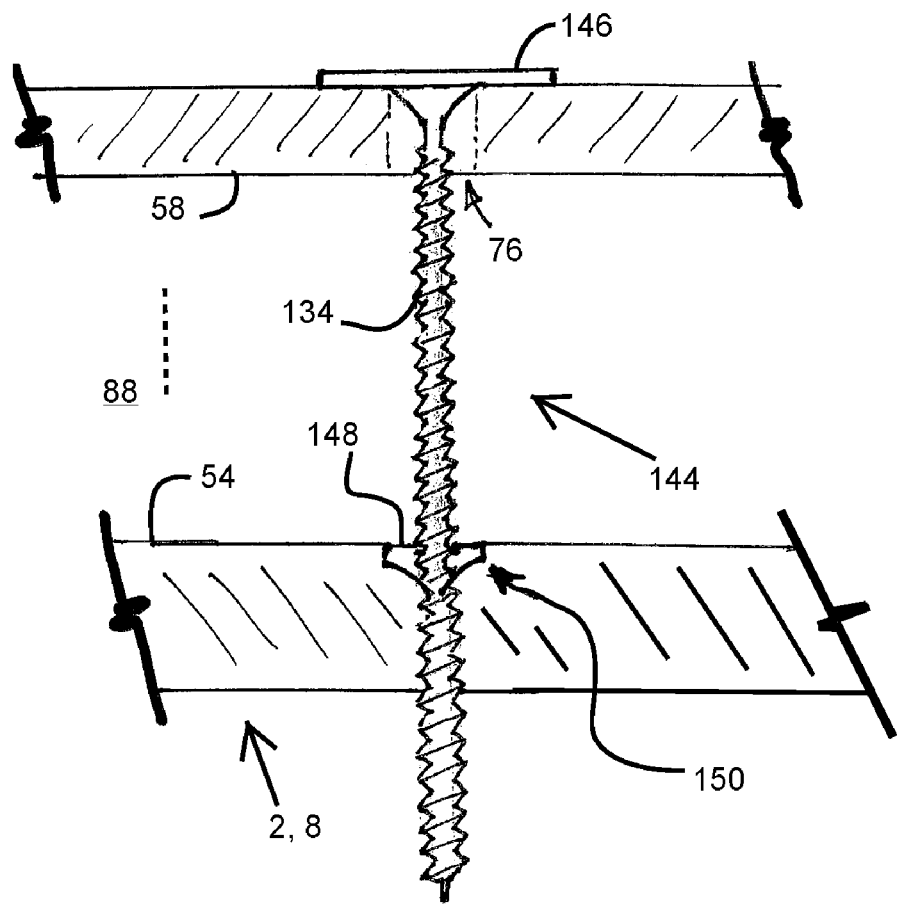
FIG. 29 is a partial sectional view of double-head screw seated in a single plenum panel according to the present invention.

Turning next to FIG. 29, a second mechanical connector 74 or fastener, in the form of a double-head screw 144, is disclosed to connect single plenum panels 2, 8 to supporting structures without predrilled access connector holes 76. Similar to FIGS. 27 and 28, the upper sheet in the figure is an exterior sheet 58 of a single plenum panel 2, 8 and the lower sheet is an interior sheet 54 of a single plenum panel 58. As shown in the Figure, a double headed screw 144 is fully sunk into a single plenum panel 2, 8. The double headed screw 144 has a larger diameter flat upper or "top" head 146 at a terminal end of the double headed screw 144 and has an intermediate head 148, with a twisted bit base 150, spaced at a distance from the top head 146. The distance between the top of the intermediate head 148 and the bottom of the larger top head 146 is the same as the distance from the inner surface of the interior sheet 54 and the outer surface of the exterior sheet 58.

Because of the spacing between the two heads 146, 148, when the double headed screw 144 is screwed into the single plenum panel 2, 8, the twisted bit portion 150 of the intermediate head 148 will first screw through the exterior sheet 58 and continue downward. The shank 134 of the double headed screw 144 will screw through the interior sheet 54 (and into a blocking 32, 56, 70, or some other support of the structure) and as the twisted bit 150 of the intermediate head 148 begins to drill into the interior sheet, the larger top head 146 will seat on the outer surface of the exterior sheet 58, will substantially close off the just formed connector hole 76 and will preferably provide a compressive force on the exterior sheet 58.

Figure 30C:
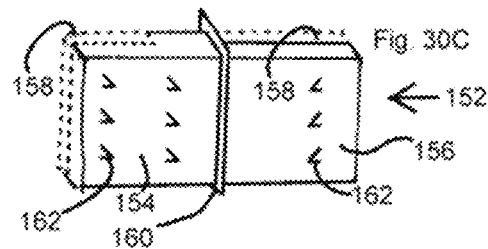
FIGS. 30A to 30C are partial see through and exploded partial perspective views of insertion connecting blocks connecting two adjacent single plenum panels and a perspective view of the insertion connecting block.
Figure 30B:
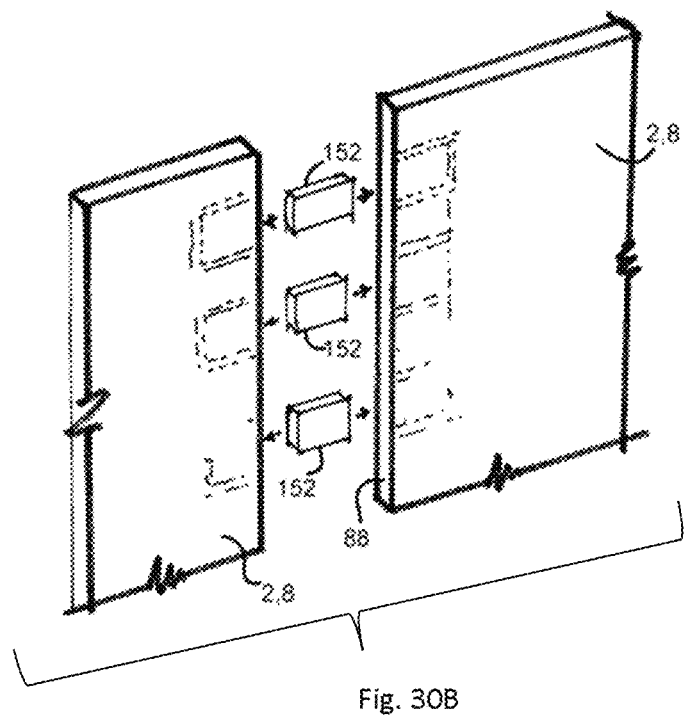
Figure 30A:
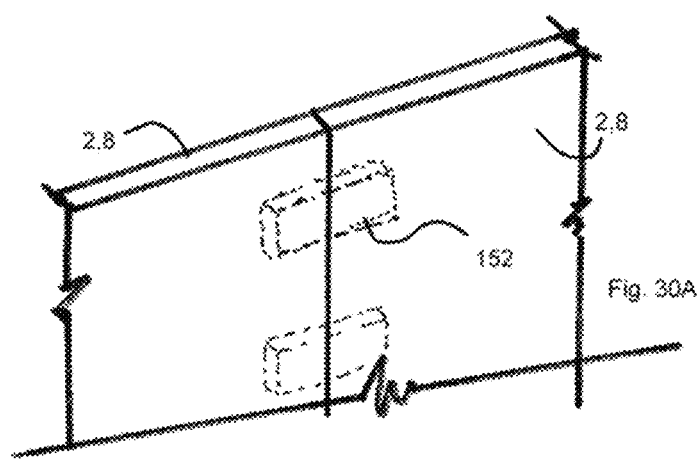

Turning now to FIGS. 30A to 31C, a first and second method of securely connecting adjacent single plenum panels 2, 8 with coupling blocks 152 are shown. These methods will also work with multi-plenum panels 4, 10 (not shown). The coupling blocks 152 will aid in constructing a building 6 out of unit panels 2, 4 without a frame, while maintaining the structural integrity and strength benefits of the single and multi-plenum panels 2, 4. Solid coupling blocks 152 are shown in FIGS. 30A-30C and hollow coupling blocks 152 are shown in FIG. 31A-31C, but are otherwise substantially the same. The coupling blocks 152 have a thickness that is preferably either the same as the interior clear dimension between the sheets 54, 58 of a single plenum panel 2 or the thickness of the clearing between one sheet 54, 58 and a matrix member 60. The coupling blocks 152 are easily inserted into the plenum 88 of each panel 2, 4 in the field and easily attached using mechanical and/or adhesive methods, such as screws 74 and/or glues 84. The length of the coupling blocks 152 are determined by the matrix dimensions and strength requirements.

Optional variations of the solid coupling blocks 152 are shown in FIG. 31C. When inserting in panels 2 having matrix members 60, depending on the spacing of matrix members, the edge of the panel 2 on one side may have a full clearance between the two sheets 54, 58 (for at least a minimal distance), and the edge of the panel 2 on the opposing side will have a reduced clearance, part of the clearance being occupied by one matrix member running parallel to the edges of the panels 2 being coupled. To maximize contact area between the two sheets 54, 58 of the two panels 2, the coupling block 152 of FIG. 31C has a full clearance side 154, which has a thickness equal to the clearance between the two sheets 54, 58, and a matrix clearance side 156, which has a thickness equal to the distance between a matrix member 60 and the sheet 54, 58 the matrix member 60 is not directly attached to. The portion removed 158 from the matrix clearance side 156 is substantially equal to the height of the matrix member 60 from the sheet 54, 58 it is attached to. The full clearance side 156 could also have a portion removed 158 along a portion of its length, especially the portion that is inserted first into the plenum 88. In this way, the full clearance side 154 of the coupling block 152 could also fit between at least one matrix member 60 and its opposing sheet 54, 58 while also filling the full clearance between the matrix member 60 and the edge of the panel 2.

Additionally, the coupling block 152 of FIG. 31C has a raised center guide 160 which helps to quickly center the coupling blocks 152, with respect to length, so equal lengths of the coupling blocks 152 are in both panels 2, when securing the coupling blocks 152 in the respective panels 2. Also, the coupling block 152 of FIG. 31C has a plurality of cleats or raised protrusions 162 with help to frictionally lock the coupling blocks 152 in place once inserted, without the need for further mechanical fasteners 74 or adhesives 84. Only nine cleats 162 are shown in FIG. 30C to maintain clarity, but preferably the number would be significantly higher, the cleats 162 be located on all sides of the coupling blocks that would contact sheets 54, 58 or matrix members 60, and the cleats 162 would be angled toward the raised center guide 160 (or where a raised center guide would be if one was not present)—which would cause the coupling blocks 152 to dig into the adjacent sheets 54, 58 and lock into place after being inserted into the plenum 88 of the two panels 2, locking the two panels 2 together.

The solid coupling blocks 152 can be made of wood, wood fiber, aluminum or other metals, plastics, composites, carbon fiber, fiberglass, bent metal or other materials.

The hollow coupling blocks 152 of FIGS. 31A-31C can be made of wood, wood fiber, aluminum or other metals, plastics, composites, carbon fiber, fiberglass, bent metal or other materials. It is anticipated the blocks could be also extruded or formed from these materials. The variations of FIG. 30C can also be made with the hollow coupling blocks 152.

Although a horizontal connection is shown, the same method could be utilized for a vertical connection as would be required at the gable ends of a home 6.

Figure 32C:
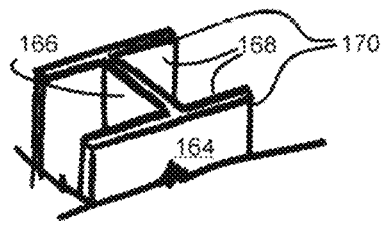
FIGS. 32A to 32C are partial see through and exploded partial perspective views of H connectors connecting two adjacent single plenum panels and a partial perspective view of the H connector.
Figure 32B:
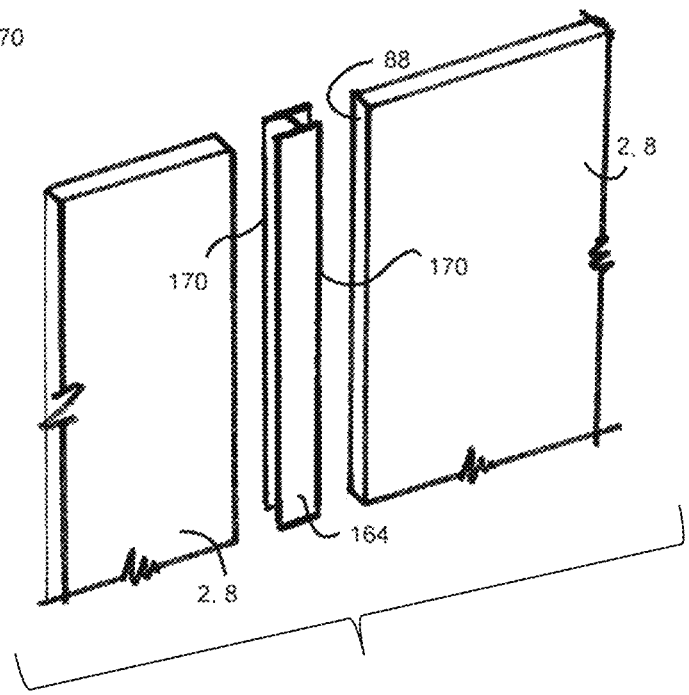
Figure 32A:
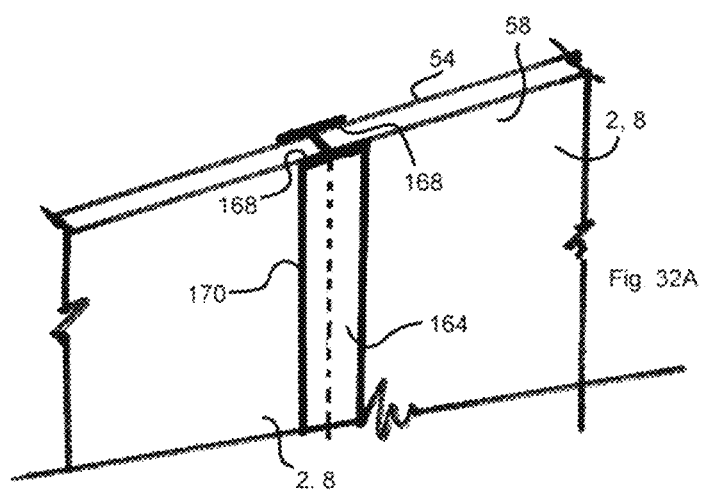

Turning now to FIGS. 32A-33C a first and second method of securely connecting adjacent single plenum panel with "H" shaped couplers 164 are shown. In FIGS. 32A-32C "H" couplers 164 with a solid mid-portion 166 is shown, and in FIGS. 33A-33C "H" couplers 164 with a mid-portion 166 with perforations 46 is shown. These H couplers 164 can be the full length of the single plenum panel 2 or (not shown) can be shorter clips of desired length using several to connect the two adjacent panels 2, or (not shown) could be longer than the full length of the single plenum panel 2 and connect more than two adjunct panels 2 together (two adjacent panels on a first level and two adjacent panels 2 on a second level directly above the first two panels 2). The H coupler 164 is inserted in the field and attached using mechanical 74 and/or adhesive 84 methods.

The perforated 46 H couplers 164 facilitate complete ventilation between the adjacent panels 2.

The dimensions and thickness of the H couplers 164 are determined by strength requirements. Although the H couplers 164 are shown with smooth engaging surfaces 168 on the parallel opposing capping portions 170, engaging surfaces 168 could also be ribbed, rough, or rigged, with the ridges angled inward toward a the mid portion. Additionally, one or many barbs or cleats 162 could be provided on the engaging surfaces 168, preferably with the barbs or cleats angled inwardly and back toward the mid portion, such that the H couplers 164 were easy to slide on the panel 2, but where trying to remove the H coupler 164 would cause the barbs or cleats 162 to dig into the surface of the engaged sheet 54, 58—in a similar fashion to the optional cleats 162 used in the coupling blocks in FIG. 30C.

The coupling blocks 152 and H couplers 164 can be made of wood, wood fiber, aluminum or other metals, plastics, composites, carbon fiber, fiberglass, bent metal or other materials. It is anticipated that embodiments of each 152, 164 could be also extruded or formed from these materials.

Although a horizontal connection is shown, the same method could be utilized for a vertical connection as might be required at the gable ends of a home.

In the embodiment shown in FIGS. 32A-33C, the mid-portion 166 of the H coupler 164 spaces the parallel capping portions 170 from one another such that engaging surfaces 168 of the capping portions 170 engage the outer surfaces of the interior and exterior sheets 54, 58 of each of the adjacent panels 2. That is, the two engaging surfaces 168 on the respective capping portions 170 face one another.

In another embodiment (not shown), a shorter mid-portion 166 would space the parallel capping portions 170 such that their engaging surfaces 168 are on the opposite side, and they 168 engage the inner surfaces of each of the interior and exterior sheets 54, 58 of adjacent panels.

In a further embodiment (not shown), two spaced end caps 170 would be positioned at each end of the mid-portion 166 such that the end caps 170 engaged both the inner and the outer surfaces of each of the interior and exterior sheets 54, 58 of each adjacent panel 2.

In a still further embodiment, the H couplers 164 instead of just being linier (like a lower case "L"), could can be formed in a "T" shape or a "+" shape to connect three adjacent or four adjacent panels 2 respectively. The H couplers 164 could be used alone, or with the coupling blocks 152.

Figure 34B:
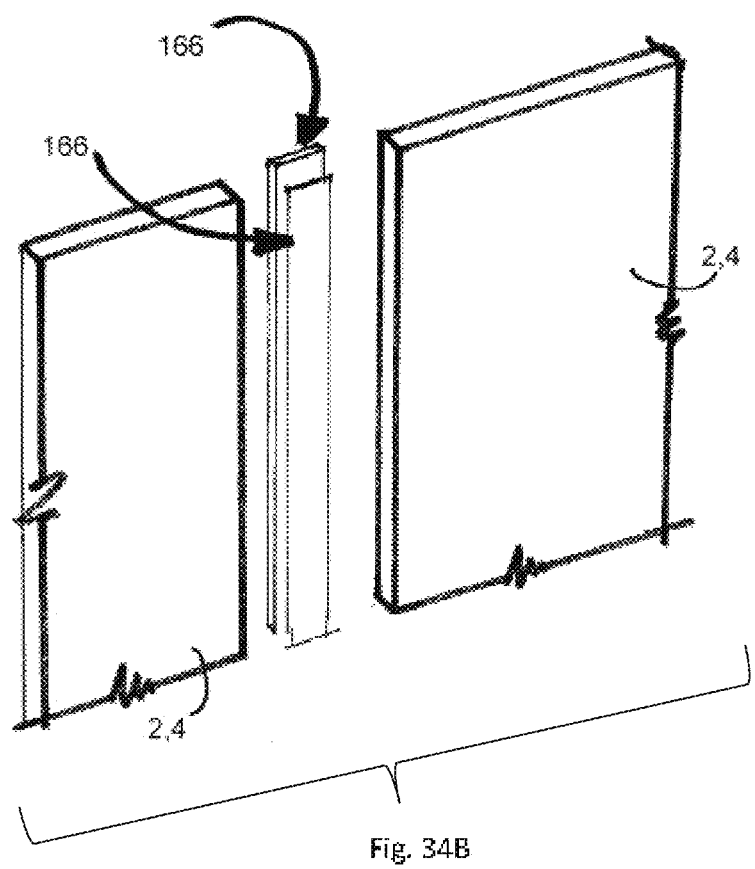
FIGS. 34A and 34B are partial see through and exploded partial perspective views of a further embodiment for connecting adjacent single plenum panels to one another with blocking and a ridged/tensile strip.
Figure 34A:
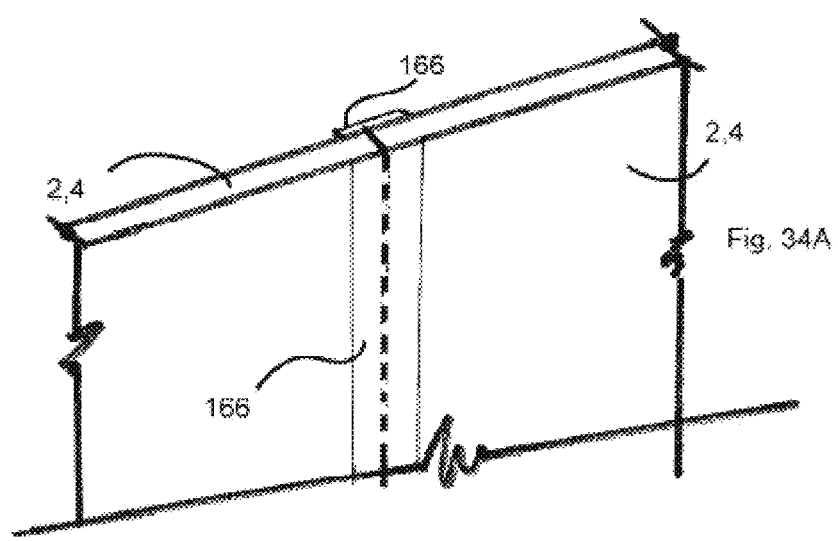

Turning next to FIGS. 34A-34B, an embodiment for connecting adjacent panels using two methods is shown. A first method uses panel blocking 172, which is inserted into the plenum 88 of the single plenum panel 2, or, as shown, is attached exterior of one of the two sheets 54, 58, covering the seam between the two adjacent single plenum panels 2, or is used on both sides of the panel 2 (attached to the exterior of both sheets 54, 58, covering the seam on both sides). The second method uses rigid/tensile strips 174, which can be attached to the exterior surface to either side of the single plenum panel 2, covering the seams, or used on both sides. The two methods can be combined, such as shown FIGS. 34A and 34B, where the panel blocking is attached to one side of the panels seam and the tensile strip 174 is attached to the other side.

The panel blocking 172 and tensile strips 174 are easily installed in the field and attached using mechanical 74 and/or adhesive 84 methods.

The panel blocking 172 is ideally placed on the exterior surface of the load bearing interior sheet 54 of the single plenum panel 2, since it would be hidden by insulation 36 installed later.

The tensile strip 174 is anticipated to be of minimal thickness with fibrous strength as well as ridged strength. The strip is applied in the field with adhesives or installed and activated with an additional field treatment such as for a fiberglass or carbon fiber strip. If both panel blocking 172 and tensile strip 174 methods are used in combination at the same side of a panel/panel seam, preferably the tensile strip 174 would be attached first and the 172 blocking attached over the tensile strip 174.

The dimensions and thickness of the panel blocking 172 and the tensile strip 174 connectors are determined by strength requirements. They could be the full length of the single plenum panel 2, or just part of the length, and could each 172, 174 be of different length. For example, the tensile strip 174 could be attached from one edge of the seam to the other, and the panel blocking 172 could be attached of the tensile strip 174 and cover just half of length of the seam.

The panel blocking 172 connector can be made of wood, wood fiber, aluminum or other metals, plastics, composites, carbon fiber, fiberglass, bent metal or other materials. It is anticipated the panel blocking 172 could be also extruded or formed from these materials.

The tensile strip 174 connector is probably a thin strip of aluminum or other metal, plastic, reinforced plastics, composites, fiberglass, carbon fiber or other suitable material.

Although a horizontal connection is shown, the same method could be utilized for a vertical connection as might be required at the gable ends of a home 6.

Figure 35A:
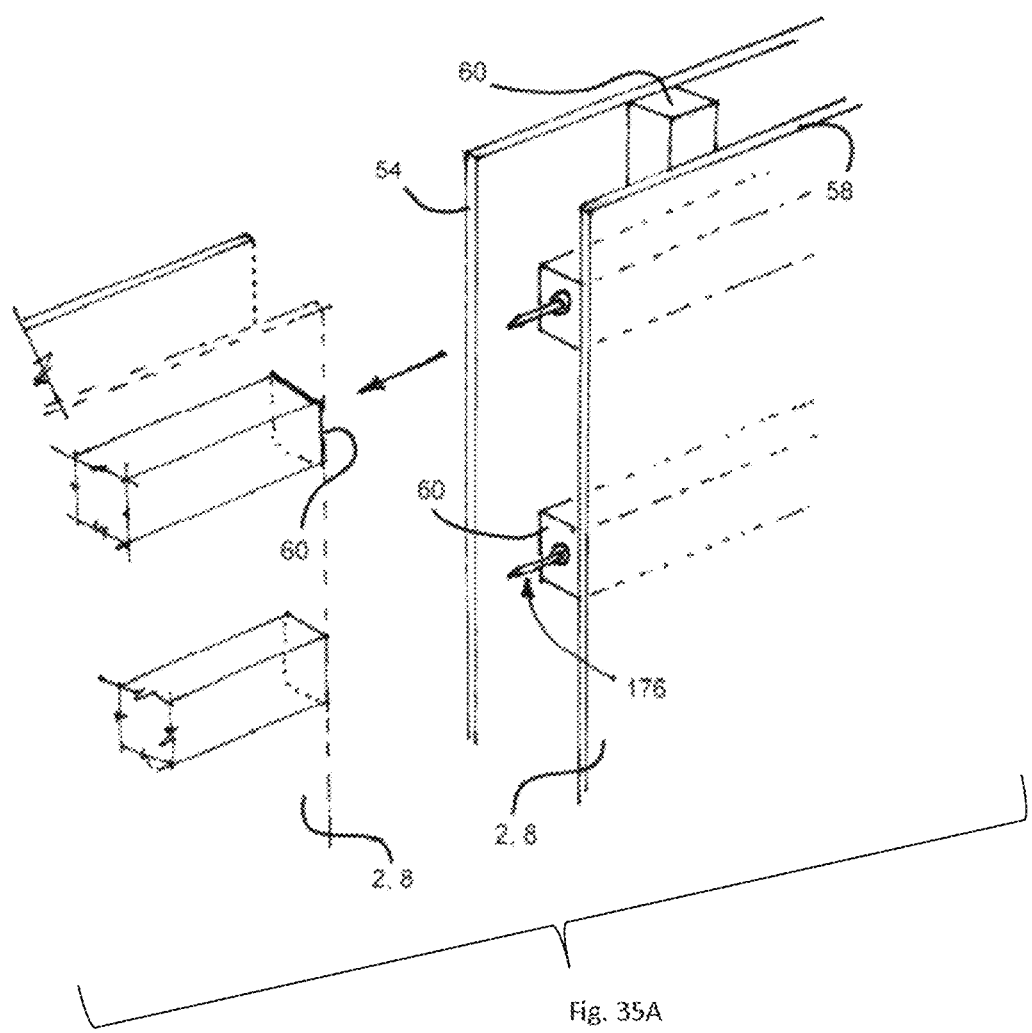
FIGS. 35A and 35B is a partial perspective view of a method of joining two adjacent single plenum panels via spikes and an up close partially see through perspective view of a spike.
Figure 35B:
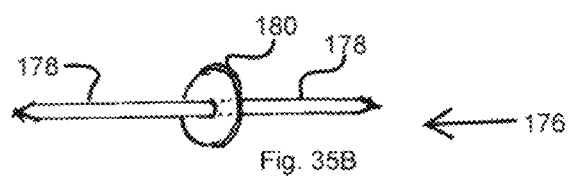

Turning next to FIGS. 35A and 35B, a quick method of mechanically connecting spacing structural elements 26/matrix members 60 of adjacent single plenum panels 2 is shown using spikes 176 that are ideally initially installed in the edges of the matrix members 60.

Adjacent single plenum panels 2 are thus connected in the field by the movement of a first panel 2 toward an already installed second single plenum panel 2 (shown by arrows in the FIG. 35A) by means of applying pressure probably by hammering a wood block to lock the adjacent single plenum panels 2 together. The spikes 176 could be attached in the field, but are ideally preinstalled in the factory.

A design of a possible spike 176 is shown in FIG. 35B. The dimensions and thickness of the spike 176 connectors are determined by strength requirements. Though the spike shanks 178 shown are smooth, they could also be ribbed, twisted, or barbed. The spike also has a midline plate 180 used to aid in forcing a spike 176 into a matrix member 60 and seating the spike shank 178 at a given depth in the matrix member 60.

The spikes 176 can be made of metals including aluminum, strong plastics, composites, or other materials.

Although a horizontal connection is shown, the same method could be utilized for a vertical connection as might be required at the gable ends of a home.

Although embodiments of the connectors 152, 164, 172, 174, 176, and methods of connection in FIGS. 30A-35B are for shown for single plenum panels 2, the connectors and variations of the connectors may be used for multi-plenum panels 4. For example, a variation of the H couplers 164 for the multi-plenum panels 4 could resemble an H coupler 164, except with a transvers engaging edge bisecting the midportion 166, with the transverse engaging edge engaging a top or bottom surface of the middle sheet 64 of the multi plenum panels 4. Alternatively, a second variation of the H coupler 164 would resemble an H coupler 164 with two closely spaced transvers engaging edges bisecting the midportion 166 of the H coupler 164. The two transverse engaging edges would be spaced apart at a distance approximately equal to the thickness of the middle sheet 64 of the multi-plenum panel 4, and when installed, one transverse engaging edge would engage a top surface of the middle sheet 64 of the multi-plenum panel 4, and one transverse engaging edge would engage a bottom surface of the middle sheet 64 of the multi plenum panel 4. Additionally, coupling blocks 152 can be easily inserted in one or both of the plenums 78, 80 of the multi-plenum panel 4 to connect two adjacent multi plenum panels 4. These connectors could also be used to securely connect a single plenum panel 2 adjacent to a multi-plenum panel 4 as part of, for example, a same wall 12, floor 18, roof 14, or ceiling 16.

Figure 36:
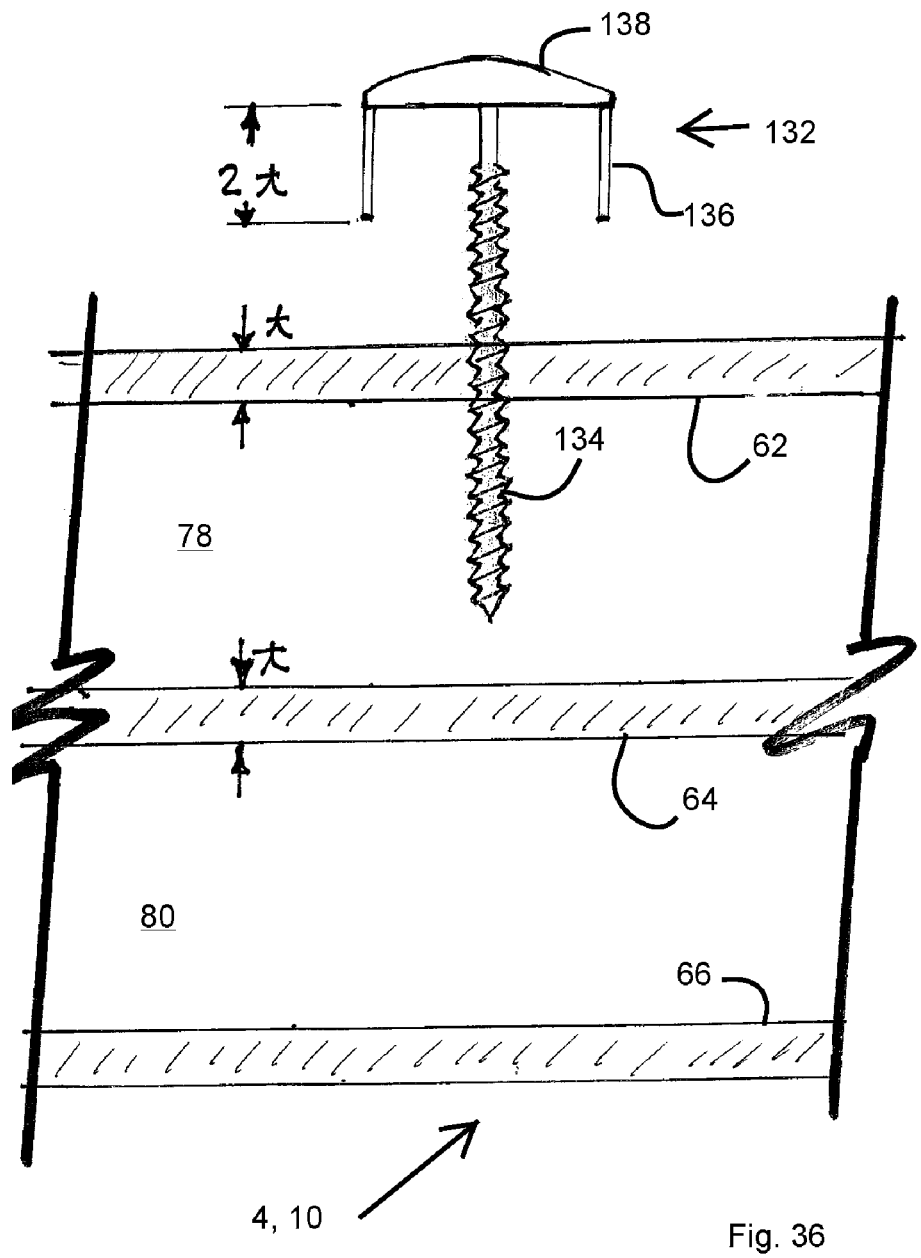
FIGS. 36 and 37 two temporally spaced partial sectional views of a three layer self-seating long toothed screw for multi plenum panels according to the present invention.
Figure 37:
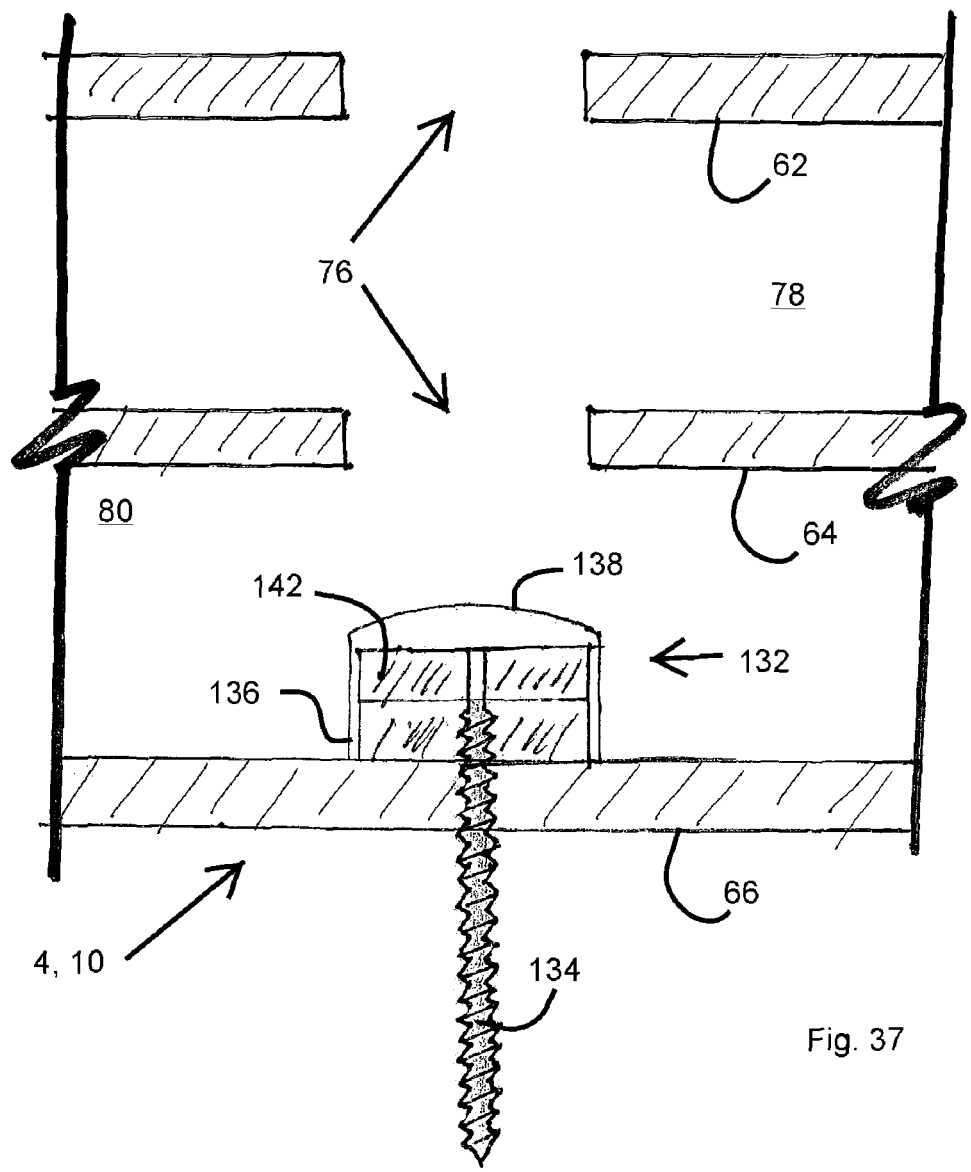

Turning now to FIGS. 36 and 37 a self-sealing long-toothed screw 132 for multi-plenum panels 4, 10 is shown, which is similar to the toothed screw 132 for single plenum panels 2, 8 described above in FIGS. 26A to 28. The length of the teeth 136 on the long tooth screw 132 is substantially equal to the sum of the thickness of the top and middle sheet 62, 64 of the multi-plenum panel 4, 10. Though the top and middle sheets 62, 64 are shown as being the same thickness ("$t$"), and thus the length of the long teeth shown is 2 $t$, other variations are possible. For example, the middle sheet 64 could be wider or thinner than the top sheet 62, but the length of the long teeth 136 would still be the sum of the two thicknesses, whatever that may be.

The long toothed screw 132 operates in a similar manner as the toothed screw 132 of FIGS. 26A to 28, except the long toothed screw 132 will cut through both the first and middle sheets 62, 64 before being seated on the inner surface of the bottom sheet 66.

Turning next to FIGS. 38A to 39B, multiple embodiments of methods to ventilate attic spaces when using the single or multi plenum panels 2, 4, 8, 10 are described.

Although the single plenum panels 2, 8 and the multi-plenum panels 4, 10 provide ventilation in excess of code requirements, in some cases, it may be desirable or necessary to ventilate the adjacent attic space. It is possible some officials may have a strict interpretation of governing official provision, such as International Residential Code (IRC) R806.1—ventilation required for enclosed attics and enclosed rafter space.

One method to provide additional ventilation of attic space constructed of single and multi-plenum panels 2, 4, 8, 10 is to remove a ¾" ventilation strip along the edge of the interior or bottom sheet of the single or multi-plenum panels 2, 4, 8, 10 before they are installed. This can be done in the factory or on site. Alternatively, the panels can be built originally with the, for example, ¾" gap, without the need to remove material later.

Figure 38A:
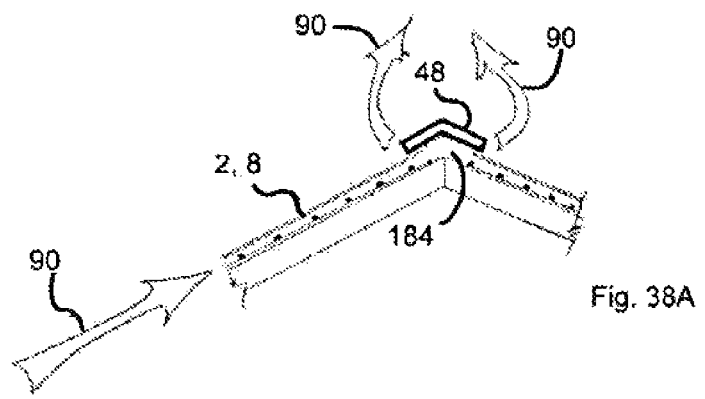
FIG. 38A is a sectional view of a roof arrangement constructed with single plenum panels with a continuous ridge vent.
Figure 38B:
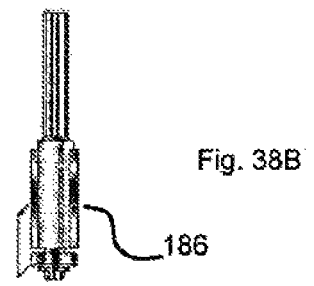
FIGS. 38B and 38C are exemplary router bit designs which could form/cut a ventilation strip according to one embodiment of the present invention.

This ventilation strip 182 would preferably be used in conjunction with an open continuous ridge vent 48. The continuous ridge vent 48 is preferable, as it would provide an escape for moist air 90 that may migrate into the attic space. A sketch of a continuous ridge vent 48 with the single plenum panels 2, 8 is shown in FIG. 38A. Also shown is a ridge gap 184 allowing air flow 90 from the two panel plenums 88 to exit into the ridge vent 48. Other venting, such as whirly birds and horizontal vents from the vertical wall of the attic and perforations in the interior sheet 54 of the panel 2 could also be used.

Figure 38C:
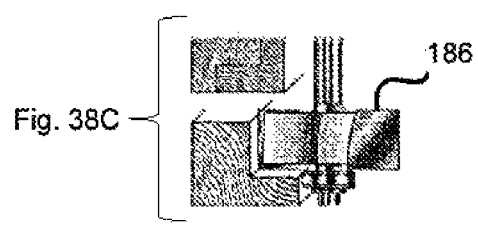

The following example describes the ventilation strip 182 method used with a single plenum panel 2, 8. For median homes 6, this would normally be approximately 10 unit panels 2 that a ventilation strip 182 would be cut into. A router bit 186 set to remove the thickness of the interior sheet 54 (¼", ⅜" or other thickness of the sheet) and set to remove a depth of ¾" is used along the long edge of panels 2, 8. This would provide the ventilation described in IRC R806.1. As shown in FIG. 38C, these panels 2, 8 would then be assembled well clear of insulation 36 blown or installed in the attic. This would not be applicable with insulation 36 applied to the roof panels 14.

Turning to FIG. 39A, this figure shows a router 188 removing the ¾" ventilation strip 182 along the long edge of the interior sheets 54 of a single plenum panel 2. As mentioned above, the ventilation strip 182 can be cut before or after assembly of the panel 2, at the factory or at the jobsite. Alternatively, one of the sheets 54 of the single plenum panel 2 could be originally sized ¾" shorter than the other sheet 58, thus automatically creating the ventilation strip 182 once the panel 2 is assembled.

Turning next to FIG. 39B, shows the interior of an attic formed unit single plenum panels 2, with the ventilation strip 182 running the length of the attic space. Though not shown, panels 2 with perforated interior sheets 54 may be used in addition or alternatively to the ventilation strips to increase ventilation in enclosed spaces.

Turning next to FIGS. 35 and 36, multiple router bits which could be used to cut the strip are shown. It is understood that strips greater than or less than ¾" in size could be used depending on the desired amount of increased ventilation.

Turning next to FIGS. 40A-47B, multiple embodiments for securely joining adjacent panels 2, 4 together is discussed. Single and multi-plenum panels 2, 4 are normally installed adjacent to one another. In many or most cases, it is desirable to utilize a method of interconnecting the panels 2, 4 in the methods already described in the incorporated patents, with offset interior spacing structural elements 26 (preferably matrix members 60 for single plenum panels 2 and blocks 68 or other separators for multi-plenum panels 4). These interconnections provide for the transfer of stresses to adjacent panels. There may be instances where the interlocking offset feature may not be used.

In addition to interconnecting panels 2, 4 for structural purposes, with offset interior spacing structural elements 26, adjacent sheets 24 in adjacent panels 2, 4 can also be interconnected to one another. Such interconnected sheets 24 would preferably act to transfer stresses as well as fluidly/gaseously sealing the sheets 24 and plenums 78, 80, 88, preferably with minimal obstruction to the plenum 78, 80, 88. Interconnecting sheets 24 between adjacent panels 2, 4 would also check possible warping in the sheets 24.

The following methods can be used at the joints 190 of the single and multi-plenum panels 2, 4, among other methods. These methods can be similar for all sheets 24 in a single or multi-plenum panel 2, 4, or can vary with each sheet 24.

Additionally, these methods can be used with or without the already disclosed offset matrix members 60 or blocks 68, and various means of connecting adjacent panels disclosed herein.

Figure 40A:
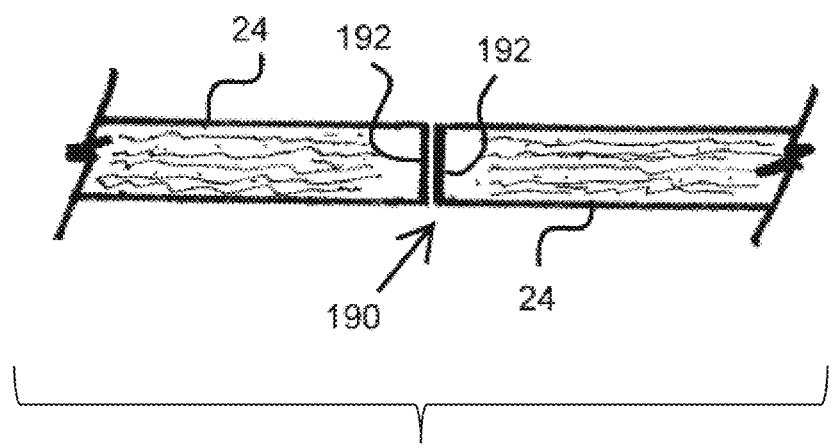
FIG. 40A is a diagrammatic cross section of two adjacent sheets of two adjacent single or multi-plenum panels with a block edge to edge joint.

In FIG. 40A, two sheets with block edges are just joined edge 190 to edge 190.

Figure 40B:
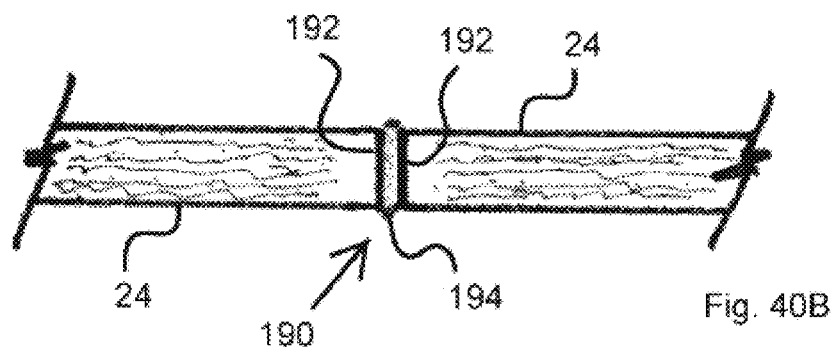
FIG. 40B is a diagrammatic cross section of two adjacent sheets of two adjacent single or multi-plenum panels with a block edge to edge joint with a compressed foam gasket.

In all methods, a sealer such as a foam strip can preferably be utilized. Most usually, it would be adhered to one face on a first sheet 24 and pressed against another, preferably coplanar, face on an abutting sheet 24. Similarly, as shown in FIG. 40B, a gasket 194 of vinyl, plastic, foam, etc. that is extruded or formed compressible, preferably hollow, solid can be utilized in the joint. Additionally, an impermeable tape can be applied to the joints on the faces of the panel joints.

Figure 41A:
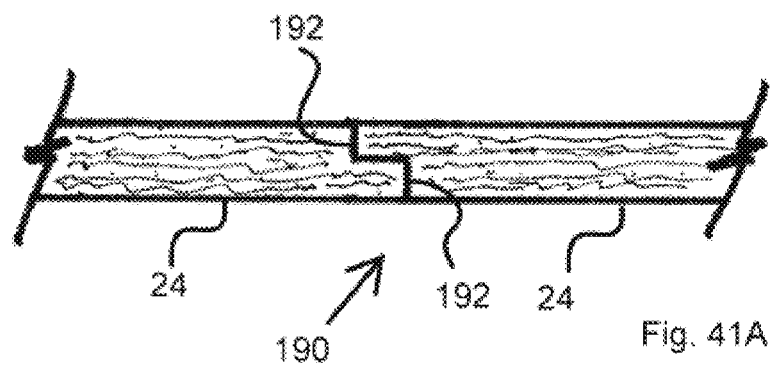
FIG. 41A is a diagrammatic cross section of two adjacent sheets of two adjacent single or multi-plenum panels with an overlap/shiplap joint.

Turning to FIG. 41A an overlap or shiplap joint 190 can be formed by the two sheet 24 edges 192. This provides an increase surface area of attachment while also providing an edge to prevent horizontal movement.

Figure 41B:
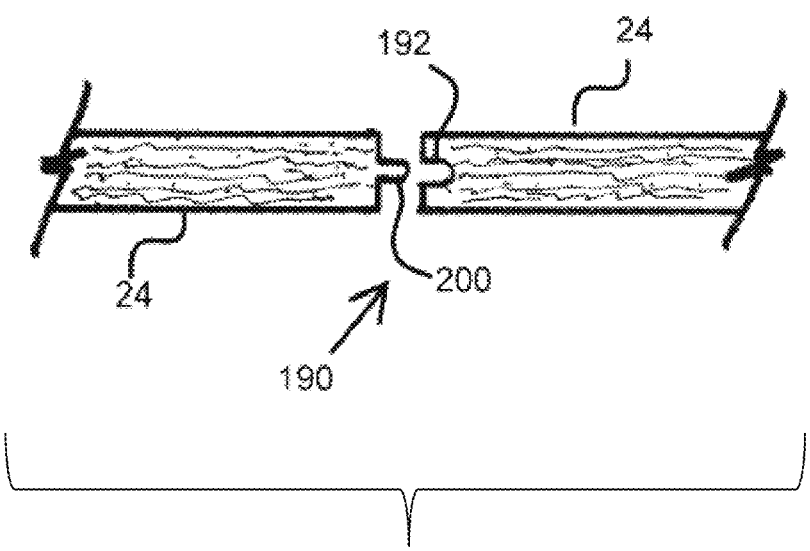
FIG. 41B is a diagrammatic cross section of two adjacent sheets of two adjacent single or multi-plenum panels with a tongue and groove joint.

Turning to FIG. 41B a tongue and grove joint 190 can be formed by the two sheet 24 edges 192. This provides a significant increase in surface area of attachments, and resists movement in two vertical directions and one horizontal direction. A drawback is that a small tongue 200 may be more liable to break.

Figure 42A:
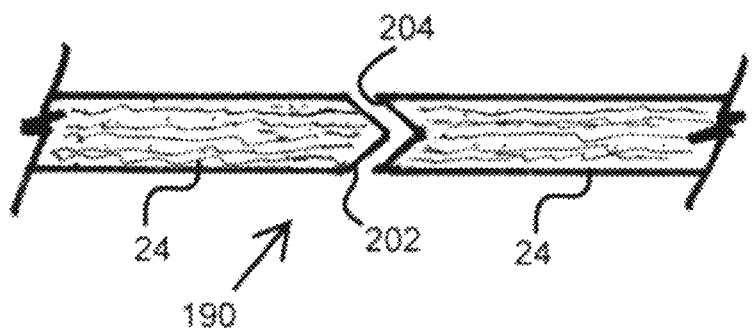
FIG. 42A is a diagrammatic cross section of two adjacent sheets of two adjacent single or multi-plenum panels with a V and V groove joint.
Figure 42B:
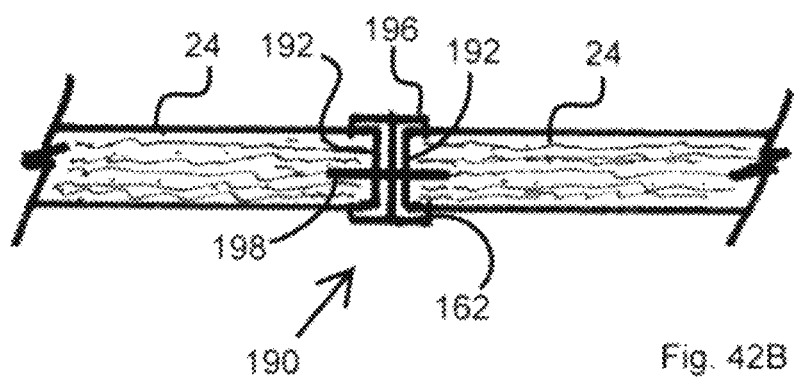
FIG. 42B is a diagrammatic cross section of two adjacent sheets of two adjacent single or multi-plenum panels with block edge to edge clip joint.

Turning to FIG. 42A, a V with V grove joint 190 can be formed by the two sheet 24 edges 192. The convex V 202 self-centers in the concave V grove, providing increased surface area of attachment, and preventing movement in two vertical directions and one horizontal direction, while likely being more structurally robust than the tongue and grove joint shown in FIG. 41B As shown in FIG. 42B, separate clips 196 or external elements can be used to join adjacent sheets 24. A sealer can be used with the clip 196, and the clip 196 can have multiple teeth or cleats 162 in each top and bottom surface of each side to cleat lock the clip 196 onto the respective sheet 24 edge 192 when forced on the edge 192. The clips 196 could also have one or more horizontally extending and preferably ribbed, toothed, or barbed elements 198 projecting from the vertical surface of the clip 196. Such horizontally extending elements 198 would puncture the face of the edge 192 of the sheet 24, and extend horizontally into the sheet 24 when the clip 196 was pressed onto the side edge 192 of the sheet 24.

Figure 43A:
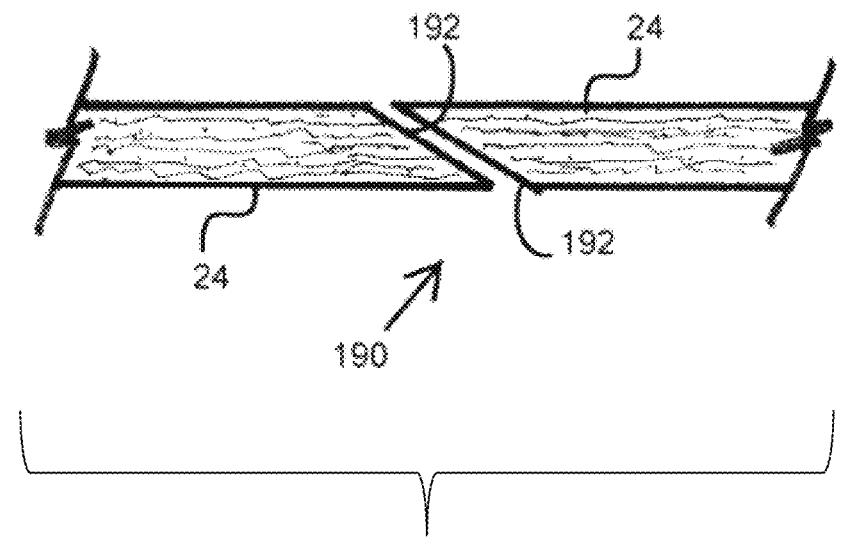
FIG. 43A is a diagrammatic cross section of two adjacent sheets of two adjacent single or multi-plenum panels with a miter joint.

Turning to FIG. 43A, a miter joint 190 can be formed by the two sheet 24 edges 192. This provides an increased surface area of attachment, but does not prevent horizontal movement as well as other joints.

Figure 43B:
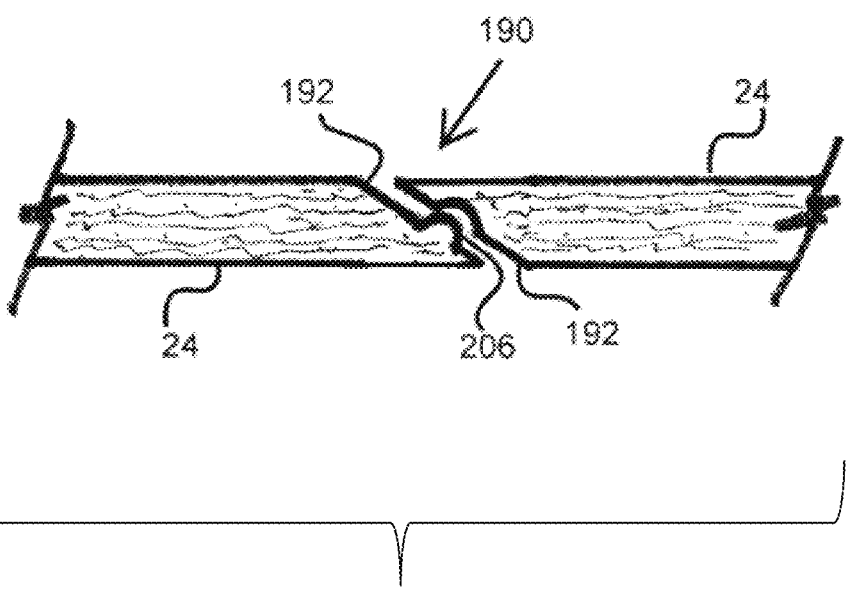
FIG. 43B is a diagrammatic cross section of two adjacent sheets of two adjacent single or multi-plenum panels with a miter joint with a snap lock feature having a convex element on one miter edge and a mating concave element on the other miter edge.

Turning to FIG. 43B, a miter with snap/lock feature joint 190 can be formed by the two sheet 24 edges 192. This provides the increased surface area of a miter joint, but the snap lock feature 206 also aids in resisting horizontal motion in both directions once the snap lock 206 is engaged.

Figure 44:
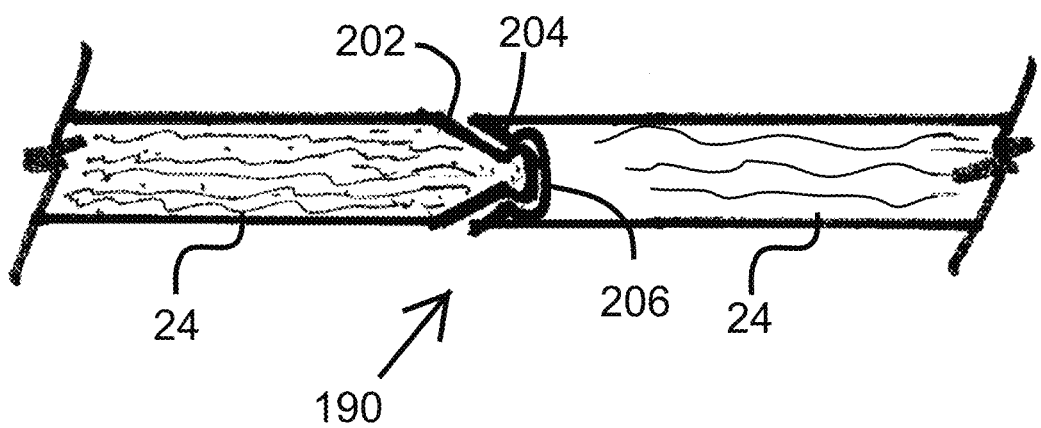
FIG. 44 is a diagrammatic cross section of two adjacent sheets of two adjacent single or multi-plenum panels with a V and V groove joint with a snap lock feature.

Turning to FIG. 44, a miter with snap/lock feature joint 190 can be formed by the two sheet 24 edges 192. This provides the increased surface area of a miter joint, but the snap lock feature 206 also aids in resisting horizontal motion in both directions once the snap lock 206 is engaged.

Figure 45:
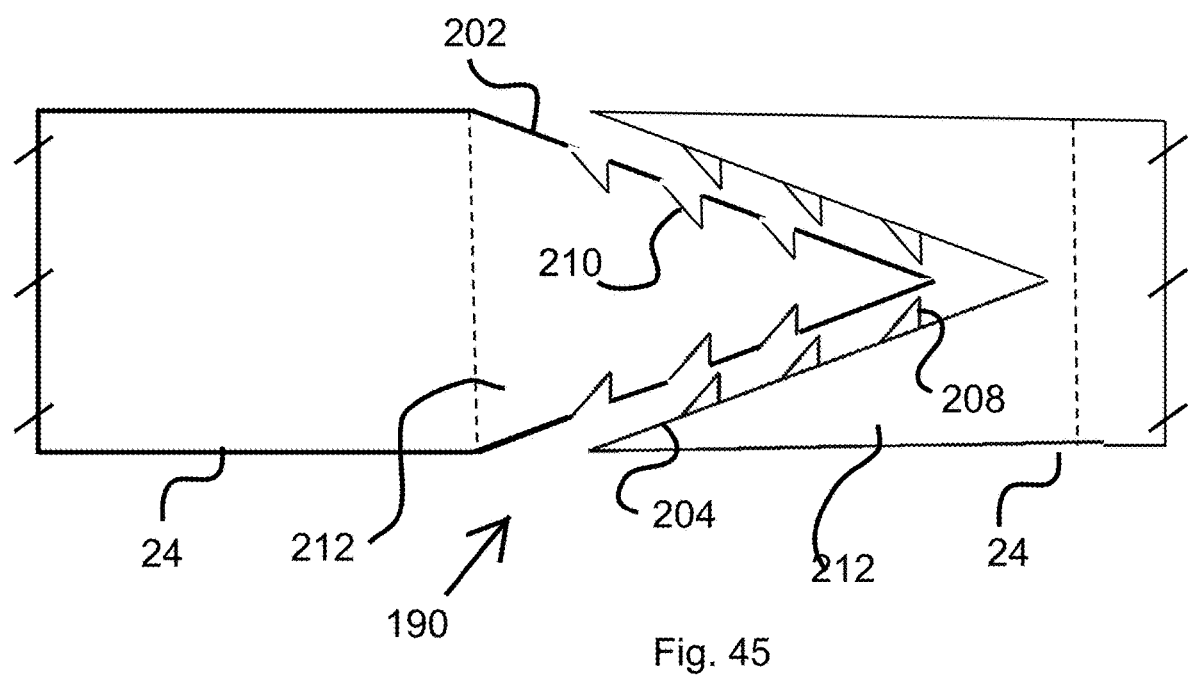
FIG. 45 is a diagrammatic cross section of two adjacent sheets of two adjacent single or multi-plenum panels with a V and V groove joint with a plurality of convex elements or teeth on the V groove and a mating plurality of concave element notches on the V.
Figure 46:
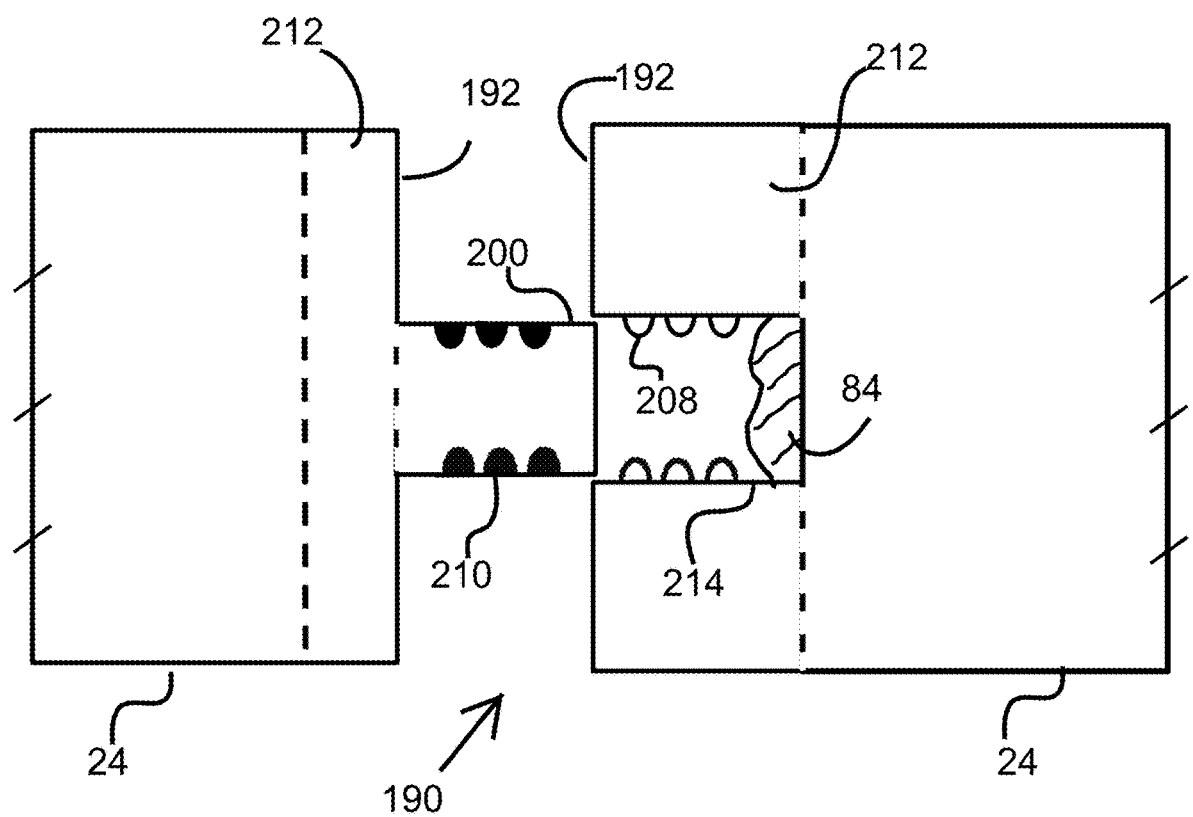
FIG. 46 is a diagrammatic cross section of two adjacent sheets of two adjacent single or multi-plenum panels with a tongue and groove joint with plurality of concave element recesses on the top and bottom of the tongue and a mating plurality of convex element ribs in the groove, and a sealant and/or adhesive and/or gasket on the inner vertical wall of the groove.

Turning to FIG. 45, the joints can be both secured to one another and sealed by the use of small teeth or projections 208 or other shaped convex mechanical attachment elements that could be tooled on both a tongue and groove joint and the V-V joint, for example. These projections 208 would grip the adjacent sheet 24 when joined, providing integrated mechanical connection, and also help to fluidly/gaseously seal the joint 190.

The projections 208 can also be made out of vinyl, plastic, metal or other material and applied individually or as a unit to the male or female edge 192 of the joint 190. The edge 192 with the projections 208 would then attach and seal to the adjacent sheet 24 edge 192 when joined. Additionally, the projections 208 could be applied to both male and female sides of the joint 190, either offset so that opposing projections 208 do not interact as the two sheets 24 are joined, or aligned so that opposing projections 208 pass over one another and interlock as the sheet 24 edges 192 are joined. FIG. 45 shows teeth like projections 208 on a convex V 202 and mating recesses 210 on the concave V grove 204.

Additionally, the V with V grove and the tongue and groove joint, for example, can also incorporate rib like projections 208 and mating recesses 210 whereby the projections 208 and recesses 210 would mesh when joined to attach adjacent sheets 24 and substantially fluidly/gaseously seal them.

The mechanical attachment elements could be formed into the edges, unitary with the sheet and out of the same material as the sheet. Alternatively, structures 212 with mechanical attachment elements (such as projections 208 and recesses 210) could be attached onto the blocked or V/V grove edges 192. The dashed lines in FIGS. 48 and 49 indicating one potential location where the structures 212 could be attached. Alternatively, the convex projection elements 208 (e.g., each separate tooth) could be made of different material than the sheet and attached separately to one or both of the male or female edge, with or without concave mating recess elements 210 disposed on the other of the male or female edge.

Preferably concave recesses 210 (e.g., notches) are present on one or both edges with mating convex projections 208 (e.g., teeth) on the other or both edges, but projections 208 could be used alone. For example, a V groove 204 edge 192 with teeth projections 208 could be used with a convex V 202 edge 192 that does not have any notches or recesses 210. Alternatively, a convex V 202 edge 192 with teeth projections 208 could be used with a V groove 204 edge 192 that does not have any notches or recesses 210. Or both a V groove 204 edge 192 and a convex V 202 edge 192 could have teeth projections with neither having any notches or recesses 210.

In a further embodiment, both the male and female edges 192 could have interlocking projections 208, such that when, for example, a tooth projection 208 on a convex V 202 edge 192 pushed past a tooth projection 208 on a V groove 204 edge, the two teeth projections 208 would interlock with each other and mechanically attach the two edges 192 together.

Additionally, the projections 208 and recesses 210 could be narrow, less than 3 mm wide, or moderate size, 3-50 mm wide, or could even be substantially be as wide as the length of the abutting edge 192 of the panel 2, 4.

Additionally, the teeth/ribs or other projections 208 can be disposed on one non-vertical edge 192, and preferably a mating notch or other recess 210 can be disposed on an abutting non-vertical edge 192 of a sheet 24 of an adjacent panel 2, 4. For example, an overlapping half of a shiplap joint could have one or more rib projections 208, and an overlapped half of a shiplap joint could have one or more mating recesses 210. Once the panels 2, 4 are secured to the underlying housing structure 6, the mating elements 208, 210 would provide a mechanical horizontally interlocking joint 190.

Additionally, one or more horizontally extending convex elements on one sheet can mate with one or more horizontally defined interior concave elements—such as the tongue and grove joint of FIG. 41B. Such a mating of horizontally aligned concave and convex elements on abutting edges of adjacent panels provides for a mechanically vertically interlocking joint Turning to FIG. 46, a further embodiment of adjacent edge 192 attachments are shown with a tongue and grove arrangement. In this embodiment concave recesses 210 are disposed preferably on opposing upper and lower surfaces of a male portion of a first edge 192, e.g., the tongue 200, and mating rib projections 208 are disposed in opposing upper and lower surfaces of a female portion of a second edge 192, e.g., the grove 214.

Foam, gel, or other adhesive 84 and/or watertight, and preferably at least initially liquid or malleable substance inserted in space between two adjacent edges (as shown in the Figure by substance on inner vertical wall of the grove 214). The adhesive 84 could alternatively or additionally be applied to the inner ribs 208, recesses 210, vertical surfaces/surfaces with no projections 208 or recesses 210, or some combination thereof. Alternately a hollow flexible, resiliently compressible, and preferably hollow gasket 194 could be used instead of or in addition to the adhesive 84. The gasket 194 itself could be adhesive 84.

Figure 47A:
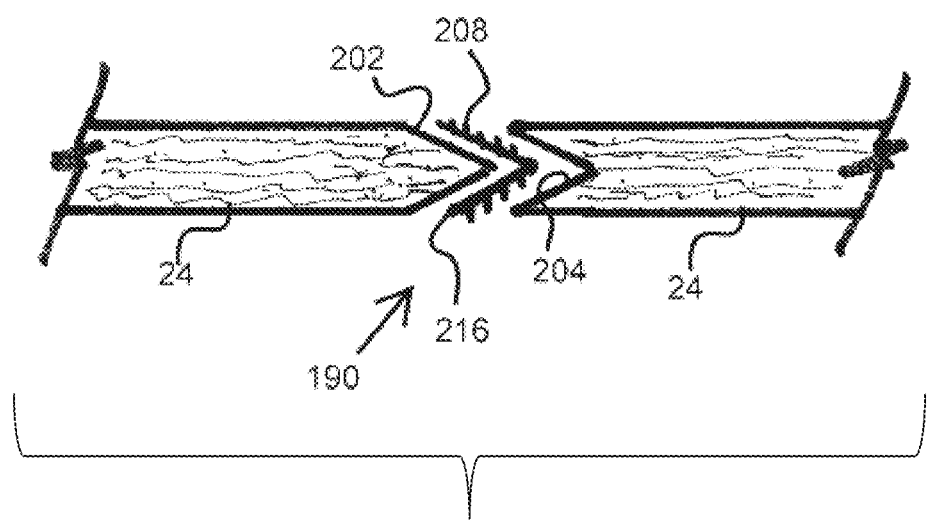
FIG. 47A is a diagrammatic exploded cross section of two adjacent sheets of two adjacent single or multi-plenum panels having a V and V groove joint with a compressible teeth insert attached to the to the male V, with the teeth extending from the surface of the male V.
Figure 47B:
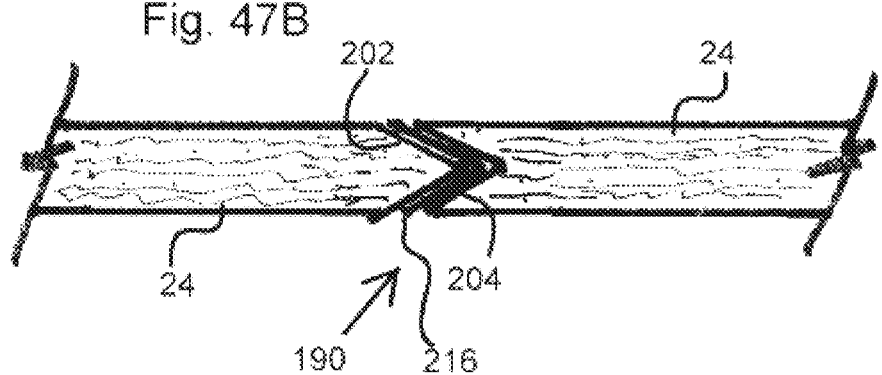
FIG. 47B is a diagrammatic cross section view of a V and V groove joint of FIG. 47A.

Tuning next to FIGS. 47A and 47B, a further embodiment is shown. In this embodiment an edge insert 216 is attached to the edge(s) 192 of one or both of the adjacent sheets 24. The edge insert 216 would preferably have compressible "teeth" projections 208 that would both grasp the adjacent sheet 24 and provide an air barrier to prevent air from passing from or to the plenum 88 through the joint 190. In the embodiment shown, the edge insert 216 is adhered to the convex V 202 edge 192 of a V and V groove joint 190. This edge insert 216 would most likely be produced with vinyl, but could also be made out of metal, plastics or similar materials. In another version of this embodiment, a first compressible teeth projection 208 insert 216 would be adhered to the convex V 202 edge 192, with the teeth extending from the surface of the convex V 202 edge 192, and a second compressible teeth projection 208 insert 216 would be adhered to the V groove 204 edge 192, with the teeth projections 208 extending from the surface of the V groove 204 edge 192. When pressed together, the two compressible teeth projection 208 inserts 216 would interlock, providing increased surface area for the seal, and increased friction and mechanical locking to secure the edges 192 to one another. Glues 84 and/or other chemical and mechanical 74 adhesives and/or sealants can be used in addition to the compressible teeth projections 208 insert 216.

While various embodiments of the present invention have been described in detail, it is apparent that various modifications and alterations of those embodiments will occur to and be readily apparent those skilled in the art. However, it is to be expressly understood that such modifications and alterations are within the scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items while only the terms "consisting of" and "consisting only of" are to be construed in the limitative sense.

REFERENCE NUMBERS

2 Single Plenum Panel, Unit Single Plenum Panel
4 Multi-Plenum Panel, Unit Multi-Plenum Panel
6 Home, House, Building
8 Continuous Single Plenum Panel
10 Continuous Multi-Plenum Panel
12 Wall
14 Roof
16 Ceiling
18 Floor
20 Windows
22 Doors
24 Sheet
26 Spacing Structural Elements
28 Foundation
30 Sill Plate
32 Wall Blocking
34 Roof Connector
36 Insulation
38 Roof Adjacent Surface
40 Ceiling Adjacent Surface
42 Inner Building Facing Surface
44 Ridge
46 Perforations
48 Vent
50 Vertical Flange
52 Wall Facing Surface
54 Interior Sheet
56 Sill Plate Blocking
58 Exterior Sheet
60 Matrix Members
62 Top Multi-Plenum Panel Sheet
64 Middle Multi-Plenum Panel Sheet
66 Bottom Multi-Plenum Panel Sheet
68 Spacing Blocks For Multi-Plenum Panel
70 Edge Blocking
72 Joists
74 Mechanical Connectors
76 Connector Holes
78 Top Plenum
80 Bottom Plenum 82 Rim Joists
84 Adhesive
86 Permeable Occlusions
88 Single Plenum Panel Plenum
90 Air Flow
92 Flanged Circle Guide Device
94 Circular Portion
96 Flanged Portion
98 Insulation Guides
100 Trusses
102 Inner Expanse Of Insulation Guide
104 Chase (Hole In Insulation Guide)
106 Transverse Expanse Of Insulation Guide
108 T Shape Flange
110 Front Expanse Of Insulation Guide
112 Electric/Data Box
114 Box (Door/Window Box)
116 Nested Shell
118 Interior Shell
120 Interior Flange
122 Exterior Shell
124 Exterior Flange
126 Shell Blocking
128 Flange Tabs
130 Trim Flange
132 Toothed Screw
134 Shank, Screw
136 Teeth, Screw
138 Head, Screw
140 Drive, Screw
142 Wood Plug
144 Double Headed Screw
146 Top Head
148 Intermediate Head
150 Twisted Bit Base
152 Coupling Blocks
154 Full Clearance Side
156 Matrix Clearance Side
158 Removed Portion
160 Raised Center Guide
162 Cleats
164 H Couplers
166 H Coupler Mid Portion
168 Engaging Surface
170 Capping Portions
172 Panel Blocking
174 Rigid/Tensile Strip
176 Spikes
178 Spike Shank
180 Midline Plate
182 Ventilation Strip
184 Ridge Gap
186 Router Bit
188 Router
190 Joint
192 Edge
194 Gasket
196 Clips
198 Horizontally Extending Elements
200 Tongue
202 Convex V
204 Concave V Grove
206 Snap Lock
208 Projections
210 Mating Recesses
212 Structure
214 Grove of Tongue and Grove
216 Edge Insert Wherefore I claim:

1. A method of constructing a building comprising:
attaching a first panel to a second panel via a roof connector via both mechanical and adhesive fixation;
attaching a third panel to the first panel;
attaching a fourth panel to one of the first and second panels;
wherein the first panel forms part of a vertical wall, the second panel forms part of a roof, and the third panel forms part of a first horizontal floor, and the fourth panel forms part of a first horizontal ceiling;
each panel has one or more plenums extending there through;
the building is built without conventional framing lumber used in studs, joists, rafters, or trusses;
the roof connector is an elongate continuous structural member having a length at least substantially as long as one of an edge of the first panel and a roof/ceiling edge;
the roof connector has a triangular cross section;
the roof connector is one of extruded, formed, and folded;
the roof connector is constructed from one of aluminum, a non-aluminum metal, plastic, wood fiber, carbon fiber, fiberglass, magnesium oxide, sheet metal, and composites of and a combination of any thereof; and
each of the first panel, the second panel, the third panel, and the fourth panel include a respective first sheet and second sheet, the first sheet being parallel to the second sheet, a first plurality of spacing structural elements, fixedly attaching the first sheet to the second sheet, a first plenum defined by a first spacing between the first sheet and the second sheet, the first plurality of spacing structural elements being formed such that a first plurality of spaced apart unobstructed pathways are created in the first plenum for air to move in a first direction from at least one edge of each of the first panel, the second panel, the third panel, and the fourth panel to at least one of an opposite and an adjacent edge of each of the first panel, the second panel, the third panel, and the fourth panel.

2. The method of claim 1 wherein at least two of the first panel, the second panel, the third panel, and the fourth panel further include a respective third sheet, which is parallel to the second sheet, a second plurality of spacing structural elements, fixedly attaching the third sheet to the second sheet, a second plenum defined by a second spacing between the third sheet and the second sheet, the second plurality of spacing structural elements being formed such that a second plurality of spaced apart unobstructed pathways are created in the second plenum for air to move in the first direction from at least one edge of each of the at least two of the first panel, the second panel, the third panel, and the fourth panel to at least one of an opposite and an adjacent edge of each of the at least two of the first panel, the second panel, the third panel, and the fourth panel.

3. The method of claim 1 wherein the building is constructed of continuous size panels.

4. The method of claim 1 wherein the building is constructed of unit size panels.

5. The method of claim 1 wherein the building is constructed of a combination of continuous and unit size panels.

6. The method of claim 1 wherein the roof connector has a vertical flange.

7. The method of claim 1 wherein the roof connector is an isosceles triangle.

8. The method of claim 1 wherein the roof connector is a non-isosceles triangle.

9. The method of claim 1 wherein the spacing structural elements are made of wood.

10. The method of claim 1 wherein the spacing structural elements are made of wood fiber.

11. The method of claim 1 wherein the spacing structural elements are made of aluminum.

12. The method of claim 1 wherein the spacing structural elements are made of a non-aluminum metal.

13. The method of claim 1 wherein the spacing structural elements are made of plastic.

14. The method of claim 1 wherein the spacing structural elements are made of carbon fiber.

15. The method of claim 1 wherein the spacing structural elements are made of fiberglass.

16. The method of claim 1 wherein the spacing structural elements are made of bent metal.

17. The method of claim 1 wherein the spacing structural elements are made one of a combination and composites of two or more of wood, wood fiber, aluminum, a non-aluminum metal, plastic, carbon fiber, fiberglass, and bent metal.

18. The method of claim 1 wherein a fifth panel is attached to the first panel;
   wherein the fifth panel is positioned below the first panel;
   wherein the fifth panel forms part of a vertical wall, the first panel forms part of a vertical wall, and the third panel forms part of a first horizontal floor and a second horizontal ceiling.

19. The method of claim 18 wherein a sixth panel is attached to the fifth panel;
   wherein the sixth panel forms part of one of a second horizontal floor and a second horizontal floor and a third horizontal ceiling.

20. A building constructed according to the method of claim 1.

* * * * *